United States Patent
Rossi

(10) Patent No.: US 11,393,275 B2
(45) Date of Patent: *Jul. 19, 2022

(54) SYSTEMS AND METHODS FOR PERFORMING AUTOMATED FASTENER SELECTION

(71) Applicant: INDIE LLC, Reston, VA (US)

(72) Inventor: Adam Rossi, Oakton, VA (US)

(73) Assignee: INDIE LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/915,540

(22) Filed: Jun. 29, 2020

(65) Prior Publication Data

US 2020/0327767 A1 Oct. 15, 2020

Related U.S. Application Data

(63) Continuation of application No. 16/175,798, filed on Oct. 30, 2018, now Pat. No. 10,699,511.

(60) Provisional application No. 62/642,908, filed on Mar. 14, 2018.

(51) Int. Cl.
| | |
|---|---|
| *G07F 11/00* | (2006.01) |
| *G07F 9/02* | (2006.01) |
| *H04N 5/247* | (2006.01) |
| *G06F 3/0482* | (2013.01) |
| *G06F 3/04847* | (2022.01) |

(52) U.S. Cl.
CPC ............ *G07F 11/007* (2013.01); *G07F 9/023* (2013.01); *G06F 3/0482* (2013.01); *G06F 3/04847* (2013.01); *H04N 5/247* (2013.01)

(58) Field of Classification Search
CPC .... G06F 3/0482; G06F 3/04847; H04N 5/247
See application file for complete search history.

(56) References Cited

U.S. PATENT DOCUMENTS

| | | | |
|---|---|---|---|
| 4,146,150 A | 3/1979 | Low | |
| 5,054,627 A | 10/1991 | Gregory | |
| 5,137,340 A | 8/1992 | Cugley | |
| 5,283,865 A | 2/1994 | Johnson | |
| 5,444,749 A | 8/1995 | Nambu | |
| 5,969,317 A * | 10/1999 | Espy | ........................ G06K 9/00 235/378 |

(Continued)

*Primary Examiner* — Timothy R Waggoner
(74) *Attorney, Agent, or Firm* — Kenealy Vaidya LLP

(57) ABSTRACT

Systems and methods that perform automated selection and delivery of a fastener. The system or apparatus may include a fastener inventory portion that retains a plurality of fasteners; a user delivery portion; a transfer assembly that affords physical transport of a fastener selection from the fastener inventory portion to the user delivery portion; a fastener attribute assembly that inputs desired fastener attribute data (DFA data) regarding a desired fastener; a computer system that interfaces with the fastener attribute assembly to input the DFA data; maps the DFA data to at least one fastener candidate; determines a fastener selection amongst the at least one fastener candidate; determines a number of discrete units of the desired fastener that comprise the fastener selection; and controls the transfer assembly to retrieve the fastener selection from the fastener inventory portion and physically transport the fastener selection to the user delivery portion.

20 Claims, 62 Drawing Sheets

(56) References Cited

U.S. PATENT DOCUMENTS

| | | | |
|---|---|---|---|
| 6,065,911 A * | 5/2000 | Almblad | G05B 19/4207 409/83 |
| 6,604,681 B1 | 8/2003 | Burke | |
| 6,650,225 B2 | 11/2003 | Bastian | |
| 7,010,498 B1 | 3/2006 | Berstis | |
| 7,086,558 B1 | 8/2006 | Pixley | |
| 7,155,166 B2 | 12/2006 | Swan | |
| 7,165,695 B2 | 1/2007 | Choi | |
| 7,266,515 B2 | 9/2007 | Costello | |
| 7,422,135 B2 | 9/2008 | Kvalheim | |
| 7,478,060 B2 | 1/2009 | Goldsmith | |
| 7,890,878 B2 | 2/2011 | Bass | |
| 7,949,568 B2 | 5/2011 | Fano | |
| 8,245,150 B2 | 8/2012 | Katter | |
| 8,473,098 B2 | 6/2013 | Lock | |
| 8,479,996 B2 | 7/2013 | Barken | |
| 8,706,291 B2 | 4/2014 | Burger | |
| 9,150,345 B2 | 10/2015 | Thongjitti | |
| 9,514,385 B2 | 12/2016 | Thompson | |
| 2001/0056385 A1 * | 12/2001 | Timms | G06Q 10/087 705/26.1 |
| 2002/0033884 A1 | 3/2002 | Schurr | |
| 2002/0116298 A1 | 8/2002 | Kamon | |
| 2002/0138374 A1 * | 9/2002 | Jennings | G06K 9/6204 705/29 |
| 2003/0036980 A1 | 2/2003 | Wren | |
| 2004/0095380 A1 | 5/2004 | Bass | |
| 2005/0182692 A1 | 8/2005 | Woos | |
| 2005/0216120 A1 | 9/2005 | Rosenberg | |
| 2006/0178944 A1 | 8/2006 | Katter | |
| 2008/0290107 A1 | 11/2008 | Lock | |
| 2009/0012704 A1 | 1/2009 | Franco | |
| 2009/0228795 A1 | 9/2009 | Bass | |
| 2010/0249991 A1 | 9/2010 | Asano | |
| 2013/0138243 A1 | 5/2013 | Freeman | |
| 2014/0001199 A1 * | 1/2014 | Bruck | G07F 11/44 221/131 |
| 2014/0058559 A1 | 2/2014 | Haynes | |
| 2014/0124524 A1 | 5/2014 | Cooper | |
| 2014/0222195 A1 | 8/2014 | Bruck | |
| 2014/0355838 A1 | 12/2014 | Miyakoshi | |
| 2015/0026018 A1 | 1/2015 | Nimiya | |
| 2015/0378585 A1 | 12/2015 | Bass | |

\* cited by examiner (Example fastener structure)

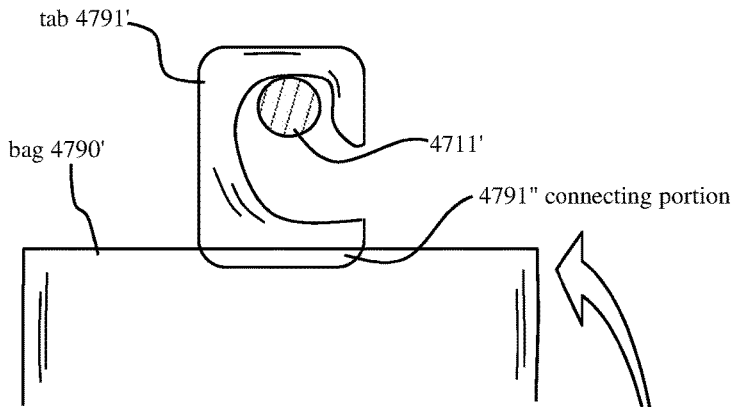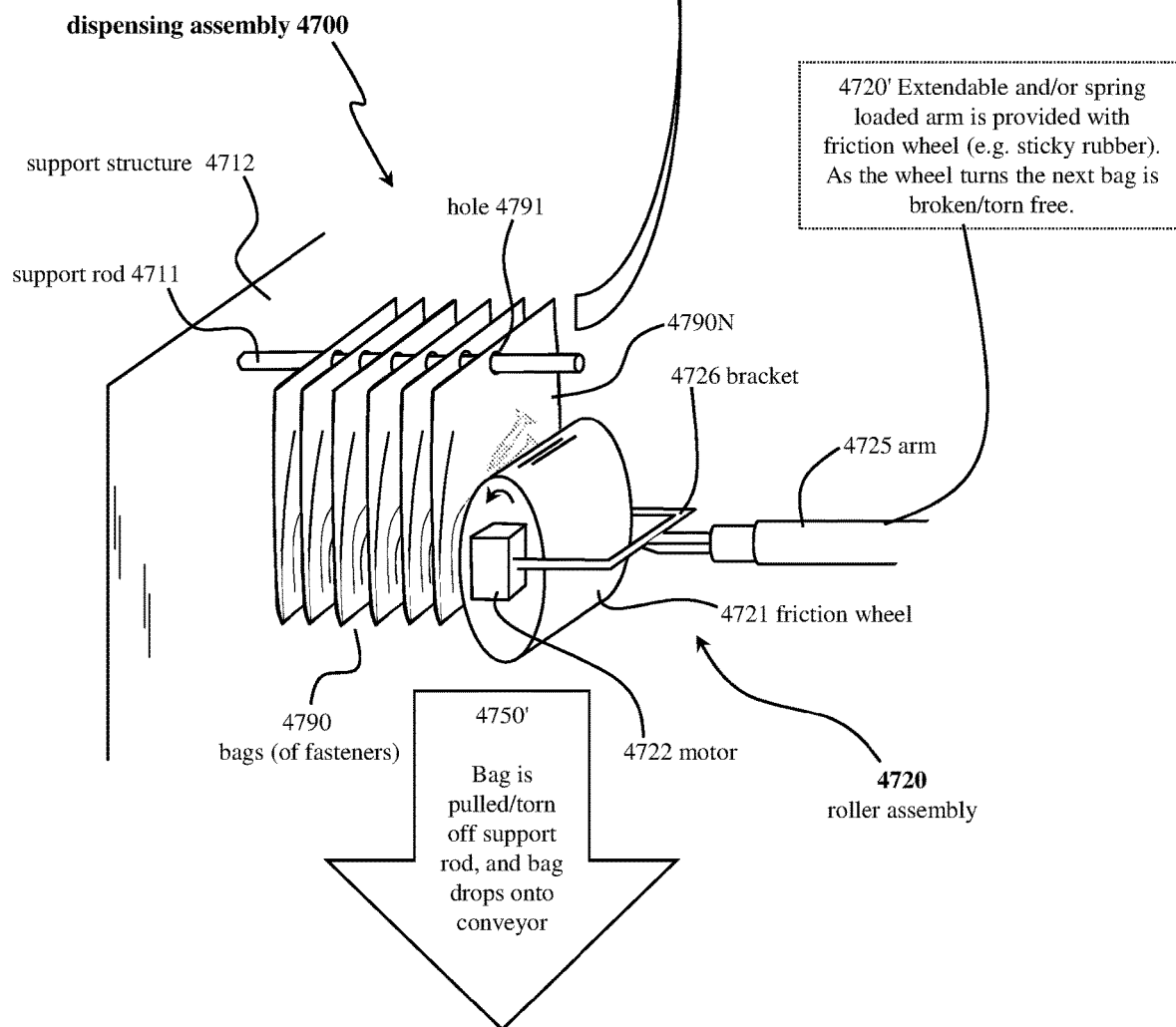
Fig. 47

4980 washer
4910 sleeve
4911 sleeve sidewall

4900' Washers in a sleeve 4910 may be dispensed using carousel dispenser of Fig. 51, for example sleeve sidewall 4911
4915 interior volume
4910 sleeve

SYSTEMS AND METHODS FOR PERFORMING AUTOMATED FASTENER SELECTION

RELATED APPLICATIONS

The application claims priority to and is a continuation patent application of U.S. patent application Ser. No. 16/175,798 filed Oct. 30, 2018. Such U.S. patent application Ser. No. 16/175,798 claims priority to U.S. Provisional Patent Application 62/642,908 filed Mar. 14, 2018, the content of which is incorporated herein by reference in its entirety. The content of such U.S. patent application Ser. No. 16/175,798 is incorporated herein by reference in its entirety.

FIELD OF THE INVENTION

The systems and methods described herein relate to automated fastener selection, including automated systems and methods for selecting fasteners including screws, nuts, and bolts, for example.

BACKGROUND

Mechanical fasteners such as screws, nuts, and bolts, for example, are widely used by a substantial number of persons for a substantial number of uses. However, the often associated task of locating necessary fasteners, for a particular project for example, often involves time-consuming and inefficient search amongst often hundreds of fasteners—until the desired fasteners are located, if indeed the desired fastener can be located.

Therefore, technical improvements and solutions are needed to overcome these shortcomings. The systems and methods of the present disclosure provide such improvements and solutions.

SUMMARY

Systems and methods that perform automated selection and delivery of a fastener. The system may include an apparatus that includes a fastener inventory portion that retains a plurality of fasteners; a user delivery portion; a transfer assembly that affords physical transport of a fastener selection from the fastener inventory portion to the user delivery portion; a fastener attribute assembly that inputs desired fastener attribute data (DFA data) regarding a desired fastener; a computer system that interfaces with the fastener attribute assembly to input the DFA data; maps the DFA data to at least one fastener candidate; determines a fastener selection amongst the at least one fastener candidate; determines a number of discrete units of the desired fastener that comprise the fastener selection; and controls the transfer assembly to retrieve the fastener selection from the fastener inventory portion and physically transport the fastener selection to the user delivery portion.

BRIEF DESCRIPTION OF THE DRAWINGS

The present disclosure will be better understood on reading the following detailed description of non-limiting embodiments thereof, and on examining the accompanying drawings, in which:

FIG. 47 is a diagram showing a further dispensing assembly, in accordance with at least one embodiment of the disclosure.

DETAILED DESCRIPTION

Hereinafter, aspects of the systems and methods of the disclosure will be described in accordance with various embodiments.

In accordance with at least one embodiment of the disclosure, the systems and methods of the disclosure relate to automated fastener selection.

The disclosure is directed to an "Automated Fastener Selection" (AFS) system and related processing to provide "fasteners" to a customer. For example, the AFS system may be disposed in a retail environment to provide fasteners, such as screws, bolts, and nuts to a customer. The AFS system of the disclosure addresses the problem of wasted time to find a particular needed fastener. In versions of the disclosure, the AFS system may be in the form of a kiosk or vending machine type arrangement.

With the invention, the customer interfaces with the AFS system to select the particular desired fastener (and number of fasteners) through a suitable user interface with the AFS system. The user interface might be in the form of a GUI (graphical user interface) by which the customer searches and selects a particular fastener based on "specs" of the fastener, such as size or type, for example.

In accord with aspects of the disclosure, the customer may set a fastener (that the customer wants to replace) in a suitable tray, such as a V-shaped tray. The tray holds the fastener in a predetermined orientation. The AFS system then takes a picture of the particular fastener—and maps the picture (i.e. image) to a known fastener via data (in a database of the system). In such processing performed by the AFS system, other attributes of a fastener may be utilized such as size, weight and/or distance attributes.

Relatedly, once the particular desired fastener is identified, the AFS system may access and deliver the requested fastener to the customer in an automated manner. For example, the AFS system accesses the particular desired fastener (for example a bolt) in inventory, retrieves the fastener, and transports the fastener to a location for retrieval by the customer—such as a retrieval tray in the kiosk. Alternatively, the AFS system may provide specific directions to the customer for pickup of the desired fastener, i.e. such as from a particular bin in the retail environment.

The systems and methods of the disclosure include various other features as described in the following disclosure.

Figure 1:
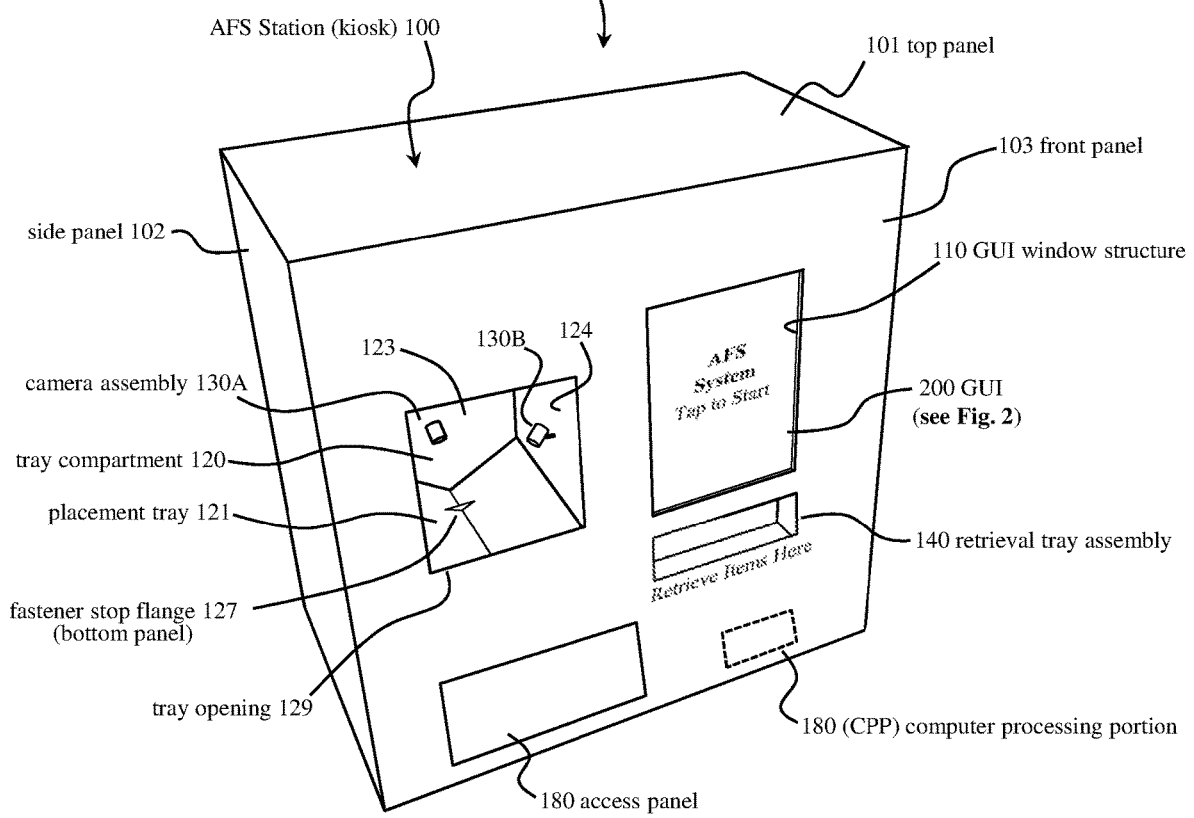
FIG. 1 is a diagram showing an AFS (automated fastener selection) system, in accordance with at least one embodiment of the disclosure.

FIG. 1 is a diagram showing an AFS (automated fastener selection) system 10, in accordance with at least one embodiment of the disclosure. In a manner described in detail below, the AFS system 10 provides the structure and operation to identify a desired fastener, map the identity of the desired fastener to matching fasteners in inventory—thereby providing a "fastener selection", and physically transport the fastener selection to a retrieval tray on a kiosk (or at another location) for retrieval by the user.

As shown, the AFS system includes an AFS station or apparatus 100. In particular, the AFS system 10 might be in the form of a kiosk to be placed in a retail environment. It is appreciated that the AFS system 10, as shown, might be placed in a variety of environments as may be desired. In accord with the embodiment of FIG. 1, the AFS station 100 is in the shape of a box-like structure. The station 100 includes a top panel 101 and opposing side panels 102 (right side panel not shown). While also not shown, the AFS station 100 may be provided with a back panel and a bottom panel so as to provide structural strength and provide a suitable container for housing the various components disposed within and mounted upon the AFS station 100.

As described in detail below, the AFS system 10 includes a tray compartment 120. The tray compartment 120, in particular, includes a placement tray 121. The placement tray 121 might be accessed via a tray opening 129. The placement tray 121 may be constituted by a bottom panel that is divided into two opposing angled surfaces. The tray compartment 120 is provided to receive a desired fastener that a user wishes to duplicate. In other words, as described above, a scenario in which the AFS system 10 may perform includes a user approaching the AFS system 10 with a particular desired fastener in his or her possession. The fastener might be a screw, bolt, nut, or some other desired fastener. In this scenario, the user wishes to purchase more of the particular fastener. Upon approaching the AFS system 10, the user places the desired fastener upon the placement tray 121.

As noted above, the placement tray 121 includes a bottom panel that is divided into two opposing angled surfaces. By such design, the two opposing angled surfaces form a V-shaped channel into which a user may position the desired fastener. In particular, the V-shaped channel, constituted by the opposing sides of the placement tray 121, provide a stable support into which the desired fastener may be seated—and thereby preventing rolling of the desired fastener. As shown, the placement tray 121 may extend the length of the tray compartment 120. In other words, the placement tray 121 may cover the extent of a bottom surface of the tray compartment 120.

The AFS system 10 as shown in FIG. 1, also includes a plurality of cameras disposed in the tray compartment 120. In the embodiment of FIG. 1, two cameras are disposed in the tray compartment 120. One camera 130A may be disposed at a far wall 123 of the tray compartment 120. A second camera 130B may be disposed on a sidewall 124 of the tray compartment 120. In accordance with embodiments of the disclosure, the two cameras, disposed in the tray compartment 120, may input images of a particular desired fastener disposed upon the placement tray 121. As described in various detail below, the position of the two cameras 130A, 130B may be stably fixed vis-à-vis the placement tray 121. In other words, the position of the two cameras may be statically disposed relative to the placement tray 121. Such static disposition provides for effective calibration of the cameras for effective processing of images respectively input by the two cameras. In particular, such static disposition, relative to placement tray, allows the distance between each camera and the placement tray 121, with the desired fastener in the placement tray, to be known. As a result, processing based on images input by the two cameras 130A, 130B may effectively be used to determine the size of the desired fastener disposed on the placement tray 121. Various calibration techniques may be utilized.

In accordance with at least some embodiments, a fastener stop flange 127 may be utilized to further control and maintain the position of a desired fastener placed into the tray compartment 120 by a user. More specifically, the fastener stop flange 127 provides a stop against which the desired fastener might be positioned by the user.

Accordingly, the structure of the tray compartment 120 and the various components disposed in the tray compartment 120 provides an environment to effectively input images of a desired fastener. Hand in hand with such structure, the AFS system 10, as shown in FIG. 1, includes various other components.

As shown, the AFS system 10 includes a graphical user interface (GUI) window structure 110. The GUI window structure 110 supports a GUI 200, in accordance with at least one embodiment of the disclosure. Illustratively, the GUI 200 may be in the form of a display screen. Further details of the GUI 200 are described below in detail. Relatedly, the AFS system 10 includes at least one computer processor (shown in phantom in FIG. 1 as computer processing portion (CPP) 180) to control the various operations of the AFS system 10. Operations of the AFS system 10, as shown in FIG. 1, may vary dependent on varying scenarios. In accord with one embodiment of the disclosure in one scenario, a user approaches the AFS station 100 and places a desired fastener into the tray compartment 120 as described above. The GUI 200 may display a suitable prompt such as "Tap to start". Such prompt may provide an effective way for the system to be aware of engagement and to initiate processing for a desired fastener. However, in other embodiments, the system 10 may be provided with a suitable motion detector that detects motion observed in the tray compartment 120. In other words, the system 10 might detect the motion associated with a desired fastener being placed in the tray compartment 120 and, as a result, be "aware", i.e. react to such input data, to initiate processing for the desired fastener.

Upon processing being initiated by the AFS system 10, for a desired fastener, the system 10 may work in a relatively autonomous manner, in accordance with at least one embodiment of the disclosure. To explain, upon the system 10 being made aware of a desired fastener placed in the tray compartment 120, the system may automatically input images of the desired fastener. As described above, such images might be input by one or more cameras disposed in the tray compartment 120. It is appreciated that data regarding a particular desired fastener, placed in the tray compartment 120, is not limited to image data input by cameras. Rather, various other types of data, such as weight data via a suitable scale regarding a particular desired fastener, might also be input by the system 10 and utilized by the system to determine attributes of a particular fastener. Further details are described below.

Based on the data that is input regarding a particular desired fastener, the system 10 (and in particular one or more computer processors of the system 10) map the input data, regarding the desired fastener, so as to try and determine an identity of the particular desired fastener. Once the identity of the particular fasteners determined, the system 10 then associates the identified fastener with a stock of fasteners in an inventory associated with the AFS system 10. In some embodiments of the disclosure, the AFS system 10 might indeed be a single standalone kiosk as is shown in FIG. 1. Such single standalone kiosk is thus provided to hold the desired inventory required by the particular environments in which the kiosk 100 is placed. For example, a single standalone kiosk, with necessarily limited inventory, might be utilized in an environment where there is demand for only a limited or set number of fasteners. For example, such an environment, i.e. venue, might be a shop floor or an assembly floor in which only a limited, predetermined number of bolts, nuts and/or other fasteners are used by workers in the particular environment. In such situation, the AFS station 100 might include an inventory of only a few screw types (of a particular diameter) with each type being available from the AFS station 100 in varying lengths. A limited number of nuts, matching the available screws, may also be disposed in the inventory of the AFS station 100, in this particular example.

However, it is appreciated that such example regarding the illustrated size of the AFS station 100 of FIG. 1 is merely illustrative. As more substantial inventory of fasteners is required for a particular environment, i.e. venue, the size and complexity of an AFS system of the disclosure may vary in coordination with such demand. That is, the size of the AFS station 100 may be varied based on the desired inventory of fasteners to be housed within the station. Additionally, in a manner as described below, the AFS system 10 might be composed of a plurality of modules that are connected together so as to afford needed operation of the AFS system 10.

As described the AFS system 10 provides structure and operation to identify a desired fastener, map the identity of the desired fastener to matching fasteners in inventory, which constitute a fastener selection, and physically transport the fastener selection to a location for retrieval by the user.

With further reference to FIG. 1, the GUI 200 provides an interface between a human user and a computer processor that allows the user to interface with the AFS system 10, in accordance with at least one embodiment. It is appreciated that in some embodiments the AFS system may indeed not require such a GUI and/or interface with a human user. In such a situation, the human user might simply place a desired fastener into the tray compartment 120—such resulting in a predetermined number of the desired fasteners (i.e. a fastener selection retrieved from inventory) being delivered to the user. Such delivery may simply be in the form of the system retrieving the fastener selection from inventory (within the AFS station 100) and delivering the fastener selection to a retrieval tray assembly such as tray 140, illustratively shown in FIG. 1.

However, it is appreciated that in various embodiments of the disclosure, interface between the system 10 in the human user (such as utilizing a suitable GUI) may be desired for a variety of purposes. In particular, such interface might be needed for the system to input the amount/quantity needed of the particular desired fastener. Additionally, as described further below, the AFS system 10 might allow variations of a particular desired fastener placed into the tray compartment 120. For example, a screw might be placed into the tray compartment 120 and the AFS system 10 determine the identity of that screw. The "identity" may include a particular part number unique to the desired fastener. Alternatively, and more likely in a typical scenario of the AFS system 10, the identity of a particular fastener might be constituted by attributes of such fastener. Such attributes might include the length of the fastener, characteristics of the head of the fastener, the size thread of the fastener, the density or threads per inch (TPI) of the fastener, the color of the fastener, and/or a wide variety of other attributes that might be associated with a particular fastener.

In one example, in operation of the AFS system 10, the user may simply be prompted to input a quantity of the identified fastener, as noted above. However, in other embodiments, operation of the AFS system 10 might provide for the user to select variations of an identified fastener. For example, once a sample fastener (placed in tray 121) is identified with a particular thread size, operation of the system 10 might allow for the user to select a different length of the identified fastener. For example, the identified fastener (placed in the tray compartment 120) might be a screw with 8-32 size thread and a length of 1 inch. The user might be prompted, via the GUI 200, to vary the length and select a length of 1.5 inches. As a result, the system 10 would retrieve a desired number of 8-32 size thread screws 1.5 inches long. Such "fastener selection" may be retrieved from inventory using a suitable mechanical system and delivered to the retrieval tray assembly 140 of FIG. 1. For example, a suitable mechanical delivery system is described below with reference to FIG. 10, in accordance with at least one embodiment of the disclosure.

As shown, the AFS station 100 may also be provided with one or more access panels 180. Such access panels 180 might be utilized, as desired, so as to provide access to the various components stored within the interior of the AFS station 100. In particular, and access panel might be utilized to access and replenish inventory housed within the AFS station 100. Additionally, access panels might be provided and utilized to access any number of other components of the AFS system 10 including mechanical components of a transfer assembly that delivers a fastener selection from inventory to a retrieval location and/or computer processing components.

Various further details of operation of the AFS system, in accordance with various embodiments of the disclosure, are described below.

Figure 2:
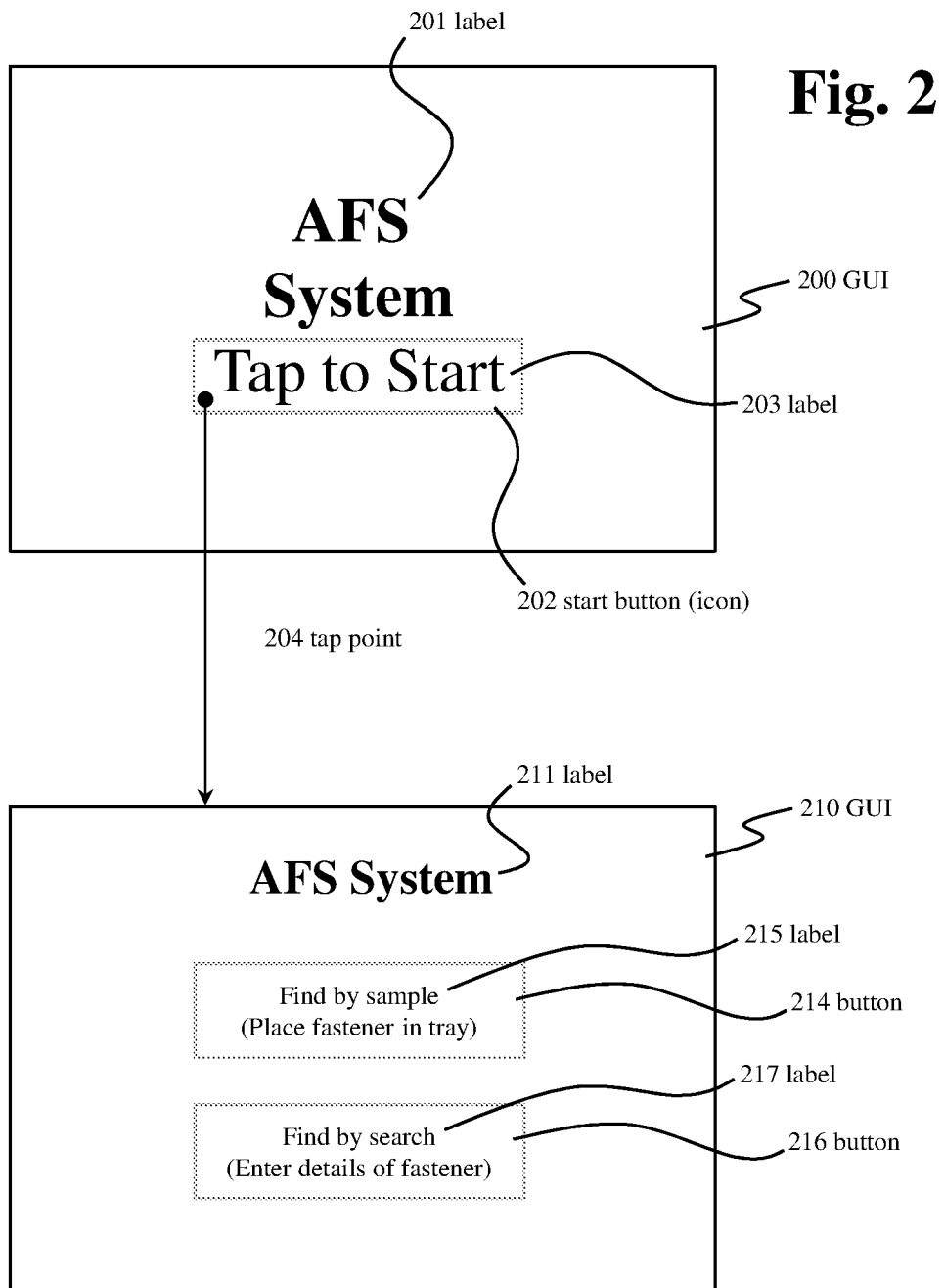
FIG. 2 is a diagram showing aspects of a GUI, in accordance with at least one embodiment of the disclosure.

FIG. 2, as noted above, is a diagram showing aspects of a GUI 200, in accordance with at least one embodiment of the disclosure. In particular, the GUI 200 of FIG. 2 may be constituted by a GUI displayed on the AFS station 100 of FIG. 1. The GUI 200 may include a label 201 so as to identify it as an "AFS system". The GUI 200 may also include a start button or icon 202 as shown in FIG. 2. The start button 202 may be provided with a suitable label 203. In the example of FIG. 2, the label 203 is simply constituted by the text "Tap to Start". Accordingly, the GUI 200 of FIG. 2 is simply provided to initiate processing, by a user, of the system—such as in the situation of a fastener being placed upon placement tray 121 shown in FIG. 1. In operation, a user taps the start button 202, such as at a tap point 204. As a result of the tap at point 204, in this example, the AFS system 10 generates a GUI 210.

As shown in FIG. 2, the GUI 210 includes various indicia related to determining the identification of a requested fastener presented by a user, i.e. a customer. The GUI 210 may be presented on a kiosk 100, such as that shown in FIG. 1. The GUI 210 includes a label 211 such as "AFS system". Further, the GUI 210 includes a plurality of buttons including the button 214 and the button 216. The button 214 may include text such as "find by sample" that includes instructions such as instructing the user to place the sample fastener in the tray. Accordingly, the button 214 is provided in a common scenario of use of the invention, in which the customer places a requested fastener, i.e. a sample, in the tray compartment 120 as shown in FIG. 1. Also, embodiments of the disclosure may include functionality to address the situation in which the user does not possess a physical sample of a desired fastener. In such a situation, the user taps the button 216 that is provided with a suitable label 217 such as "find by search". Such button 216 may include indicia indicating that the user will be requested to enter details of the requested fastener. Various further details of various functionality provided by the system of the disclosure, GUIs provided to implement such functionality, and processing performed to provide such functionality are described further below.

Figure 3:
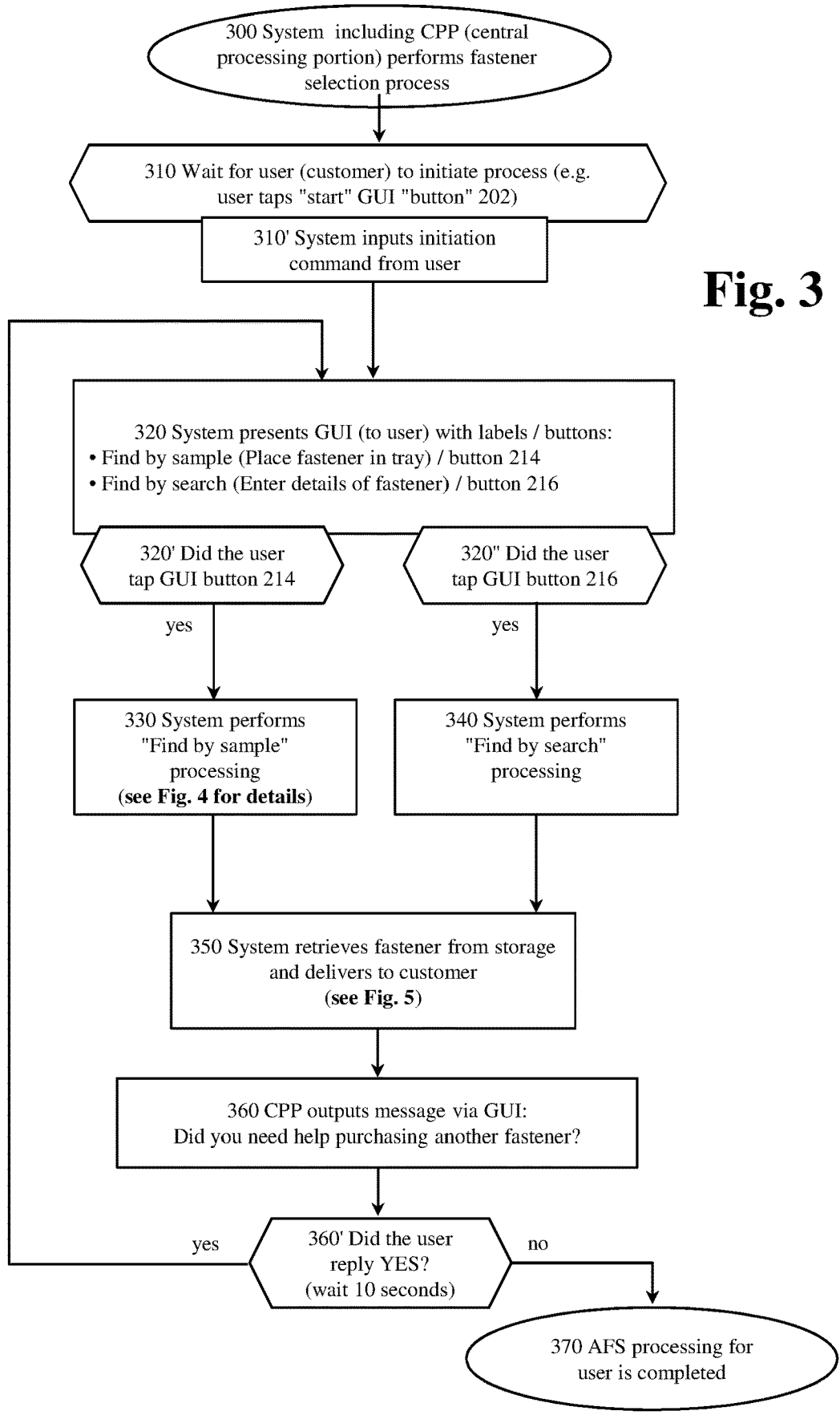
FIG. 3 is a flowchart showing details of a fastener selection process that may be performed by the AFS system of FIG. 1, in accordance with at least one embodiment of the disclosure.

FIG. 3 is a flowchart showing details of a fastener selection process that may be performed by the AFS system 10 of FIG. 1, in accordance with at least one embodiment of the disclosure. In particular, the "system performs fastener selection process" is initiated in step 300 and passes to step 310. In step 310, the system waits for user input to initiate processing. For example, in one embodiment, the system might wait for the user to tap the "start" GUI button 202 of the GUI 200 of FIG. 2. Accordingly, as reflected in step 310', at a point in time the system inputs a suitable initiation command from the user. As a result, the processing passes to step 320.

In step 320, the system presents a GUI to the user with suitable labels and buttons to provide the user with desired functionality. In particular, such GUI might be in the form of the GUI 210 shown in FIG. 2. Accordingly, such GUI may include the button 214 to provide the functionality of identification of a fastener based on a sample—that is "Find by Sample" processing in which the user places a fastener in the tray compartment 120, for example. Also, the GUI may include the button 216 to provide functionality for identification of a fastener based on a search, in which the user enter details of the fastener. Step 320' of FIG. 3 reflects decision processing that the user tapped the GUI button 214. Step 320' a FIG. 3 reflects decision processing that the user tapped the GUI button 216.

In the situation that the user tapped the button 214, the processing passes from step 320' to step 330. In step 330, the system performs "find by sample" processing. Details of such processing are described in further detail below with reference to FIG. 4. In the alternative, in the situation that the user tapped the button 216, the processing passes from step 320" to step 340. In step 340, the system performs "find by search" processing. In such "find by search" processing, the user interfaces with the AFS system 10 (via a GUI) so as to enter various attributes of a particular fastener that the user desires more of such fastener.

After the processing of either step 330 or the processing of step 340, the process of FIG. 3 passes to step 350. In step 350, the system retrieves the particular requested fastener from storage and delivers the fastener to the user, i.e. customer. Further details of the processing of step 350 are described below with reference to FIG. 5.

In the situation of the "find by sample" processing, the system thus identifies the particular fastener that the user has placed in the tray compartment 120. Such fastener effectively provides a sample that the system utilizes to determine a match—so that the user may obtain/purchase more of the "sample" fastener. As described above and otherwise herein, the CPP (central processing portion) may provide functionality such that the user may vary one or more attributes of a provided sample—such that the system then determines if fasteners are in inventory to fulfill the sample fastener with the variances input by the user. In particular, the variance might be constituted by the length of a particular screw, for example. That is, the sample screw might be 1 inch long, and the desired "fastener selection" be two inches long. Of course, the particular quantity of fasteners in the fastener selection may well be varied by the user.

After the processing of step 350, the process passes to step 360. In step 360, the CPP outputs a communication to the user—to determine if the user wishes to purchase another fastener. For example, the CPP might output a message via the GUI with the text "Did you need help purchasing another fastener?". Then, in related step 360', the CPP determines whether the user replied yes. If the determination of step 360' is yes, then the processing returns to step 320. In step 320, processing is performed in the manner and functionality as described above.

On the other hand, if no in step 360', then processing for the particular user is completed. As a result, the process passes from 360' to step 370. Step 370 reflects that AFS processing for the particular user is completed. As reflected in step 360', it is appreciated that a particular wait time might be utilized by the system—such that if no response is input by the system, from the user, then a default setting is activated. The default setting might simply be "no" in which case processing passes to step 370 by default.

Figure 4:
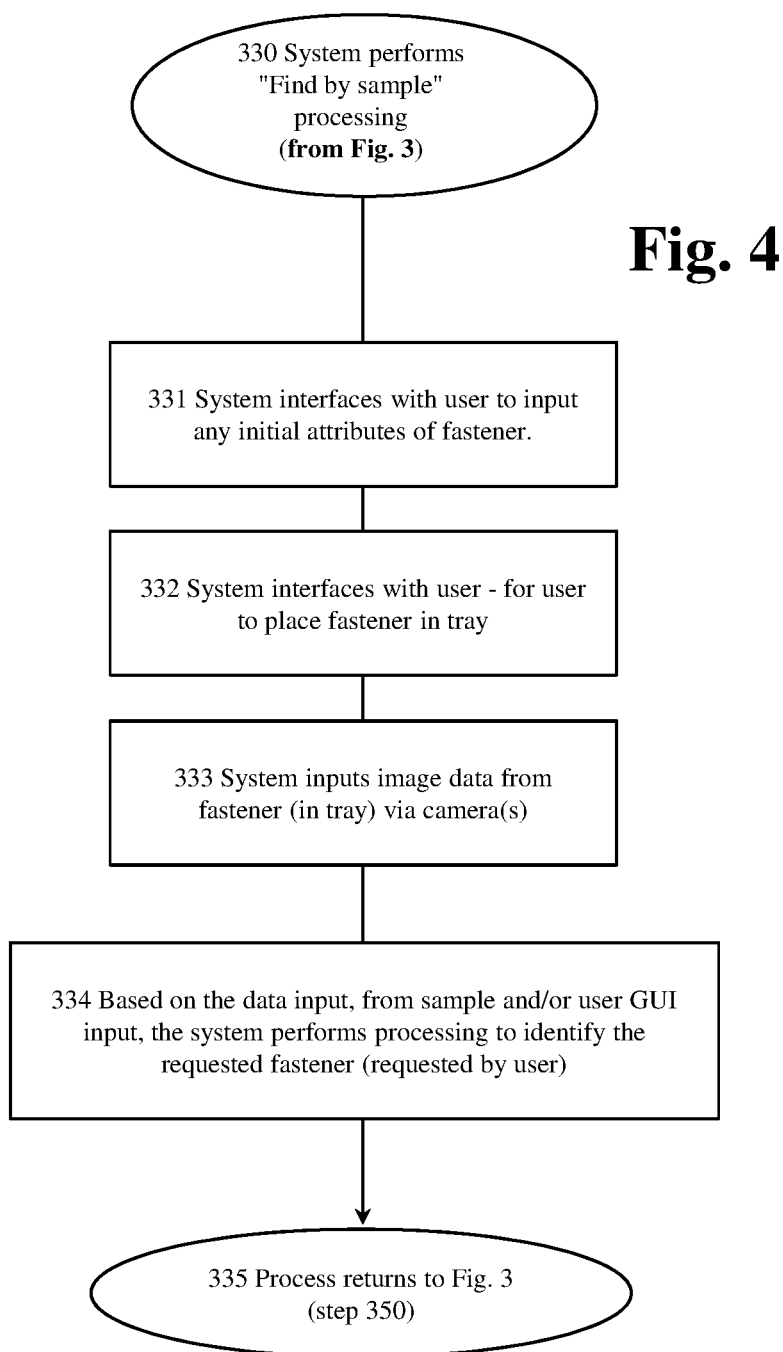
FIG. 4 is a flowchart showing the "system performs find by sample processing" step of FIG. 3, in accordance with at least one embodiment of the disclosure.

FIG. 4 is a flowchart showing the "system performs find by sample processing" step 330 of FIG. 3, in accordance with at least one embodiment of the disclosure. FIG. 4 is provided to show and summarize high-level processing performed by the system. That is, various additional details are described below with reference to the additional drawing figures, such as FIG. 22.

Accordingly, as shown in FIG. 4, the process starts in step 330 and passes to step 331. In step 331, the system interfaces with the user to input any initial attributes of the fastener. For example, the user might interface with the system so as to allow the system to constrain any search, resulting from the observed data, to a particular type of fastener. For example, the user might specify, through interface with the system, that the user is wanting to purchase a screw. Given this initial input data, the system is then able to more effectively process the sample once that sample is placed into tray compartment 120. Accordingly, such approach and methodology allows the system to perform more efficiently and effectively with less computer resources than if the system was not so constrained. After the processing of step 331, process passes to step 332. In step 332, system interfaces with the user so as to advise the user to place the fastener in the tray, such as in the placement tray 121 of FIG. 1.

After the processing of step 333, in the example of FIG. 4, the process passes to step 334. In step 334, based on the input data, from the sample and/or user GUI input, the system performs processing to identify the requested fastener, i.e. the fastener that the user wishes to purchase. After step 334, the process passes to step 335. In step 335, the process returns to FIG. 3. In particular, the processing passes to step 350 of FIG. 3.

It is appreciated that the linearity illustratively shown in FIG. 4 between steps 331, 332, and 333 may be adjusted either through hard coding of the system and/or through user selection.

Accordingly, the processing reflected in step 332 and 333 might indeed be performed before the processing of step 331. In particular, such reordering of processing may be desired and/or needed in the situation that images input of the sample fastener are not dispositive of any particular "candidate fasteners" that might fulfill the user's request. In other words, the system might not have enough information to find a fastener, in inventory, based upon the input image(s) alone. On the other hand, multiple candidate fasteners might be identified, in inventory, based on the sample fastener. Accordingly, interface with the user by the system may be needed so as to further limit and identify candidate fasteners—so as to determine a particular fastener selection.

Figure 5:
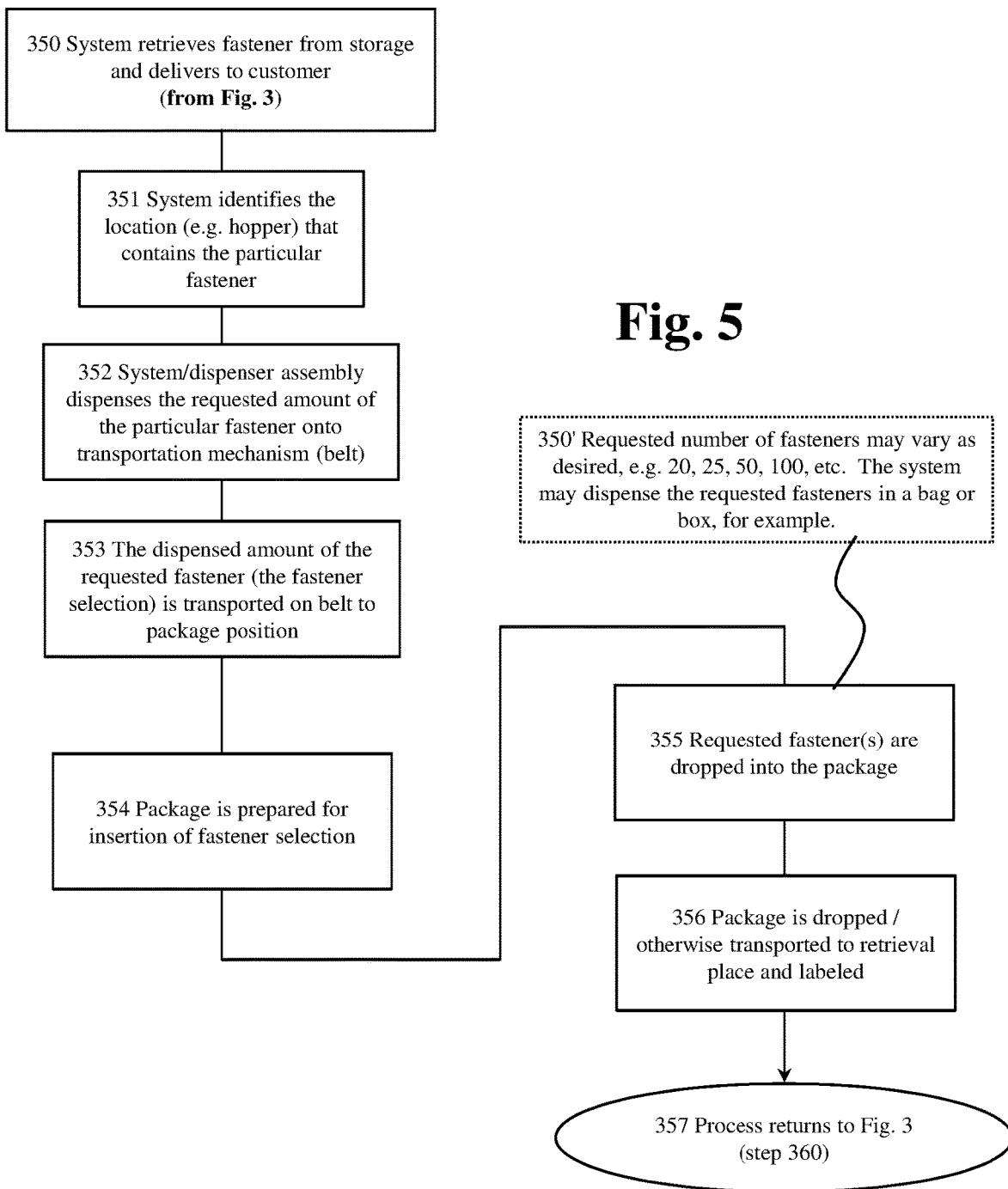
FIG. 5 is a flowchart showing in further detail the "system retrieves fastener from storage and delivers to customer" step of FIG. 3, in accordance with at least one embodiment of the disclosure.

FIG. 5 is a flowchart showing in further detail the "system retrieves fastener from storage and delivers to customer" step 350 of FIG. 3, in accordance with at least one embodiment of the disclosure. While FIG. 5 is a lower level process (of the processing shown in FIG. 3), it is noted that FIG. 5 depicts relatively high-level processing as compared to the further details described below.

As shown, the processing of FIG. 5 starts in step 350 passes to step 351. In step 351, the system identifies the location that contains the particular fastener that is desired to be purchased, i.e., the system identifies a particular location of the "fastener selection" in inventory. Illustratively, the fastener inventory of an AFS system 10 (with further illustrated reference to the system of FIG. 1) might be constituted by a plurality of hoppers or bins that respectively contain the various fasteners in inventory. After step 351 FIG. 5, the process passes to step 352.

In step 352, the system dispenses the requested amount of the particular fastener onto a suitable transport mechanism—so as to transport the fastener selection from the particular bin, that contains the fastener, to a point of retrieval by the customer. For example, the point of retrieval might be constituted by the retrieval tray assembly 140 FIG. 1. The suitable transport mechanism might illustratively be in the form of a conveyor belt, chute, or some other transport mechanism. With regard to the system dispensing the requested amount of the particular fastener, a dispenser assembly might be utilized. In some embodiments of the disclosure, each individual type of fastener may be provided with an individualized dispenser mechanism. On the other hand, in some embodiments of the disclosure, a dispenser mechanism may be utilized that selectively engages with the various fasteners in inventory.

After the processing of step 352, the process passes to step 353. In step 353, the dispensed amount of the requested fastener, i.e. the fastener selection, is transported on the belt or other transportation mechanism to a packaging position, in accordance with at least one embodiment of the disclosure. Then, processing passes to step 354. In step 354, a suitable package is prepared for insertion of the fastener selection. For example, the processing of step 354 might be constituted by the preparation of a plastic storage bag that is prepared for insertion of the desired fastener selection. Then, in step 355, the requested fasteners are dropped into the package that has been prepared. Then, in step 356, the package is dropped and/or otherwise transported to a retrieval place. As noted above, the retrieval place might, for example, be the retrieval tray assembly 140 as illustrated in FIG. 1. A suitable label may be printed and placed on the container or provided to the user for placement on the container, Accordingly, step 356 reflects that the desired fastener selection has been identified from a sample provided by the user (in conjunction with possibly other information obtained from the user), mapped to a fastener candidate(s) in inventory, retrieved from inventory, packaged, and delivered to the user. All of such processing, in accordance with at least some embodiments of the disclosure, may be performed in the environment of the kiosk—such as that shown in FIG. 1.

After the processing of step 356, the process passes to step 357. In step 357, the process returns to FIG. 3. Specifically, the process passes to step 360 FIG. 3.

It is appreciated that various variations of the processing described above with reference to FIG. 3 are within the purview of the disclosure. In particular, the processing performed by the system need not "bag" the fastener selection. Rather, in some embodiments of the disclosure, it may be desirable and/or needed to provide a fastener selection constituted by one or more individual fasteners, to the user, in a "loose" manner. The user might then be provided with a suitable bag or box in which to place the fastener selection. Relatedly, the system may provide a suitable label providing a variety of information including quantity, specifications of the particular fastener(s) in the fastener selection, SKU (stock keeping unit) information, and purchase price information, for example. In one embodiment of the disclosure, the system might print such label for retrieval by the user, and for placement of the label upon the package (by the user).

Figure 6:
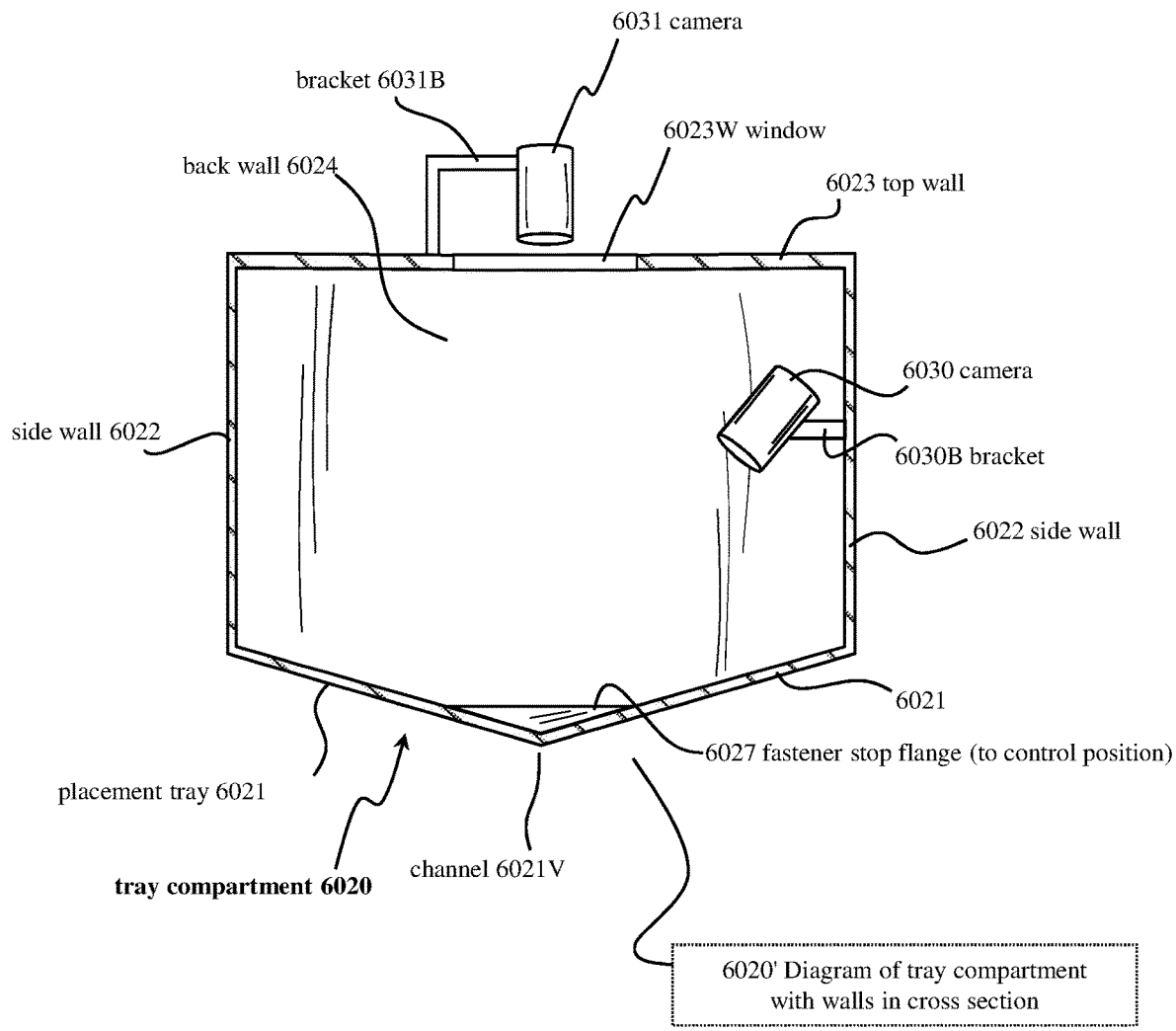
FIG. 6 is a diagram showing a tray compartment in cross-section, in accordance with at least one embodiment of the disclosure.

FIG. 6 is a diagram showing a tray compartment 6020 in cross-section, in accordance with at least one embodiment of the disclosure. While similar to the tray compartment of FIG. 1, the tray compartment 6020 is of different structure with regard to a top camera, for example.

The tray compartment 6020 of FIG. 6 includes a placement tray 6021. In a similar manner to the placement tray 121, of FIG. 1, the placement tray 6021 includes two opposing sides disposed at an angle. Such structure of the opposing sides of the placement tray 6021 provides a V-channel 6021V in which a sample fastener may be placed, by the user, and stably retained and seated upon the placement tray 6021. The tray compartment 6020 may also include a fastener stop flange 6027, in similar manner to the fastener stop flange 127 of FIG. 1. The fastener stop flange 6027 is provided to control a placement position of a sample fastener within the V-channel 6021V. Relatedly, the user may be asked (via the GUI, for example) to place a sample fastener in the V-channel 6021V and in an abutted position against the fastener stop flange 6027.

The tray compartment 6020 further includes opposing side walls 6022 and a top wall 6023. The top wall may be provided with a window 6023W. Accordingly, in the example of FIG. 6, a camera 6031 may be disposed outside an interior of the tray compartment 6020. Such positioning and arrangement might be desirable for spatial reasons and/or to protect the camera 6031. Relatedly, a second camera might be provided as shown in FIG. 6. As an alternative to the arrangement shown in FIG. 6, the second camera might also be disposed outside the interior of the tray compartment 6020—with a visual of the interior of the tray compartments 6020 via a suitable window. Each of the cameras may be provided with a suitable support structure so as to maintain the cameras in a desired position. For example, the camera 6031 may be provided with a bracket 6031B. For example, the camera 6030 may be provided with a bracket 6030B. The support structure provided to support the cameras may be adjustable so as to adjust position and angle of each of the cameras—though it is envisioned that in the normal routine the cameras would remain static, in particular for calibration purposes.

Figure 7:
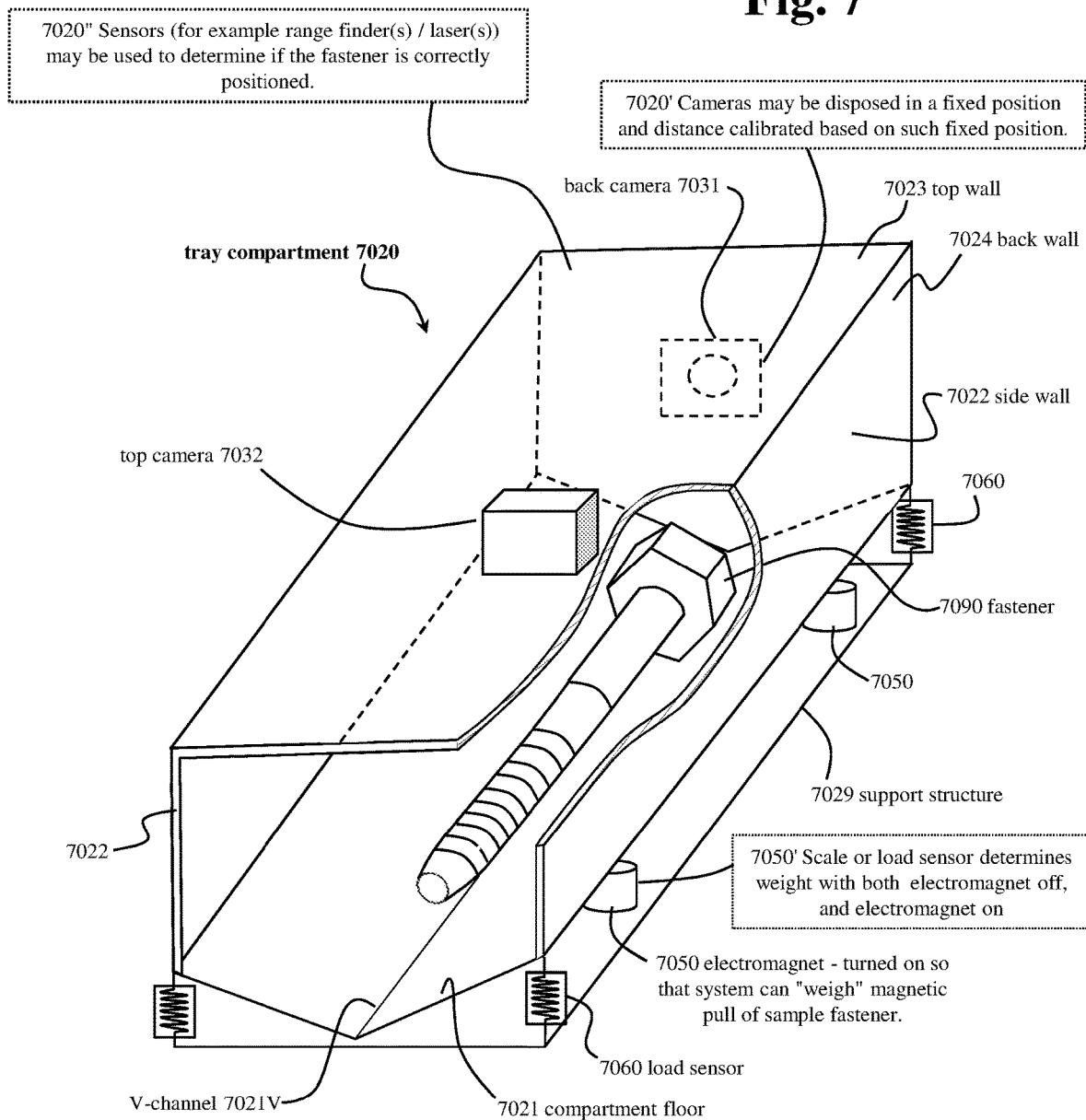
FIG. 7 is a further diagram showing a tray compartment, in accordance with a further embodiment of the disclosure.

FIG. 7 is a further diagram showing a tray compartment or apparatus 7020 in accordance with a further embodiment of the disclosure. As shown, the tray compartment 7020 includes a cutout (provided in cross-section) to illustrate a fastener 7090 disposed within the tray compartment 7020. A compartment floor 7021 is provided to support a sample fastener 7090. Opposing sides of the compartment floor 7021 may be disposed at an angle so as to stably support a sample fastener. As a result, a V-channel 7021V may be provided as shown in FIG. 7. In the embodiment of FIG. 7, the tray compartment 7020 also includes a top wall 7023 and opposing sidewalls 7022. Further, the tray compartment 7020 includes a back wall 7024.

The tray compartment 7020 may be provided with a plurality of cameras to input different images of a sample fastener disposed within the tray compartment. Accordingly, a back camera 7031 may be provided on the back wall 7024. Further, a top camera 7032 may be provided on the top wall 7023. It is appreciated that the position of the different cameras may be varied so as to effectively input requisite images for successful processing of the images. Further, as is otherwise described herein, the position and distance of each camera to the compartment floor 7021 may be determined and calibrated for processing an image of a fastener. In general, as reflected in box 7020', cameras may be disposed in fixed position and distance calibrated based on such fixed position. Also, as reflected in box 6020", sensors may be utilized to determine if a sample fastener is correctly positioned within the tray compartment 7020. Such sensors to determine if the sample fastener is correctly positioned might include range finders and/or lasers, for example.

In accordance with one aspect of the disclosure in at least one embodiment, the tray compartment 7020 may be disposed upon and/or in some manner supported by one or more sensors 7060 (supported on a support structure 7029) to measure the weight of a fastener 7090 disposed within the tray compartment 7020. The one or more sensors may be constituted by a load cell or transducer that generates an electrical signal based on the force being measured. The sensor may be a strain gauge load cell, hydraulic load cell, compression load cell, or pneumatic load cell, for example. The sensor may be in communication with a computer processor of the system. Accordingly, the data regarding the weight of a particular sample fastener may be utilized by the system, in addition to image data input by the cameras. The computer processor may interface with the user so as to assist in weighing a fastener. For example, the computer processor may wait for an accurate weight reading upon sensing that a fastener has been positioned on the scale, i.e. so as to allow the load cell or other sensor to settle out and attain a stabilized weight reading. The user may then receive an indication, via user interface, that the weight of the fastener has been successfully input.

Additionally, the arrangement of the tray compartment 7020 may be provided with one or more electromagnets 7050. As the electromagnets are energized in an increasing manner, the resulting force exerted upon a fastener disposed in the tray compartment 7020 is increased in a proportional manner Such relationship may be calibrated such that the system may determine attributes of a metallic object, e.g. an iron sample fastener (disposed in the tray compartment 7020), based upon attributes of the amount of energy utilized to energize the electromagnets 7050 vis-à-vis the amount of downpull resulting from the energization of the electromagnets. In other words, the electromagnets 7050 may be utilized in conjunction with a suitable scale or load sensor 7060 so as to be able to determine the "weight" of a sample fastener with both the electromagnets off and the electromagnets on, as reflected at 7050' in FIG. 7.

In one embodiment of the disclosure, a scale 6040 may determine the "weight" of the sample fastener with the electromagnets off vis-à-vis the "weight" of the sample fastener with the electromagnets on using differing amounts of energization. Such differential will provide further data on the electromagnetic properties of the sample fastener. In other words, differing amounts of energy may be applied to the electromagnets 7050 and the system input data regarding the resulting differing amounts of downpull of the tray compartment 7020 (as measured by a suitable weight sensor or load cell 7060). Relatedly, it is appreciated that the tray compartment 7020 may be constructed of a suitable material so as to minimize the effect that the structure of the tray compartment 7020 has upon implementation of the electromagnets. For example, the tray compartment 7020 might be constructed entirely of plastic so as to not be affected by the energization of the electromagnets.

Figure 8:
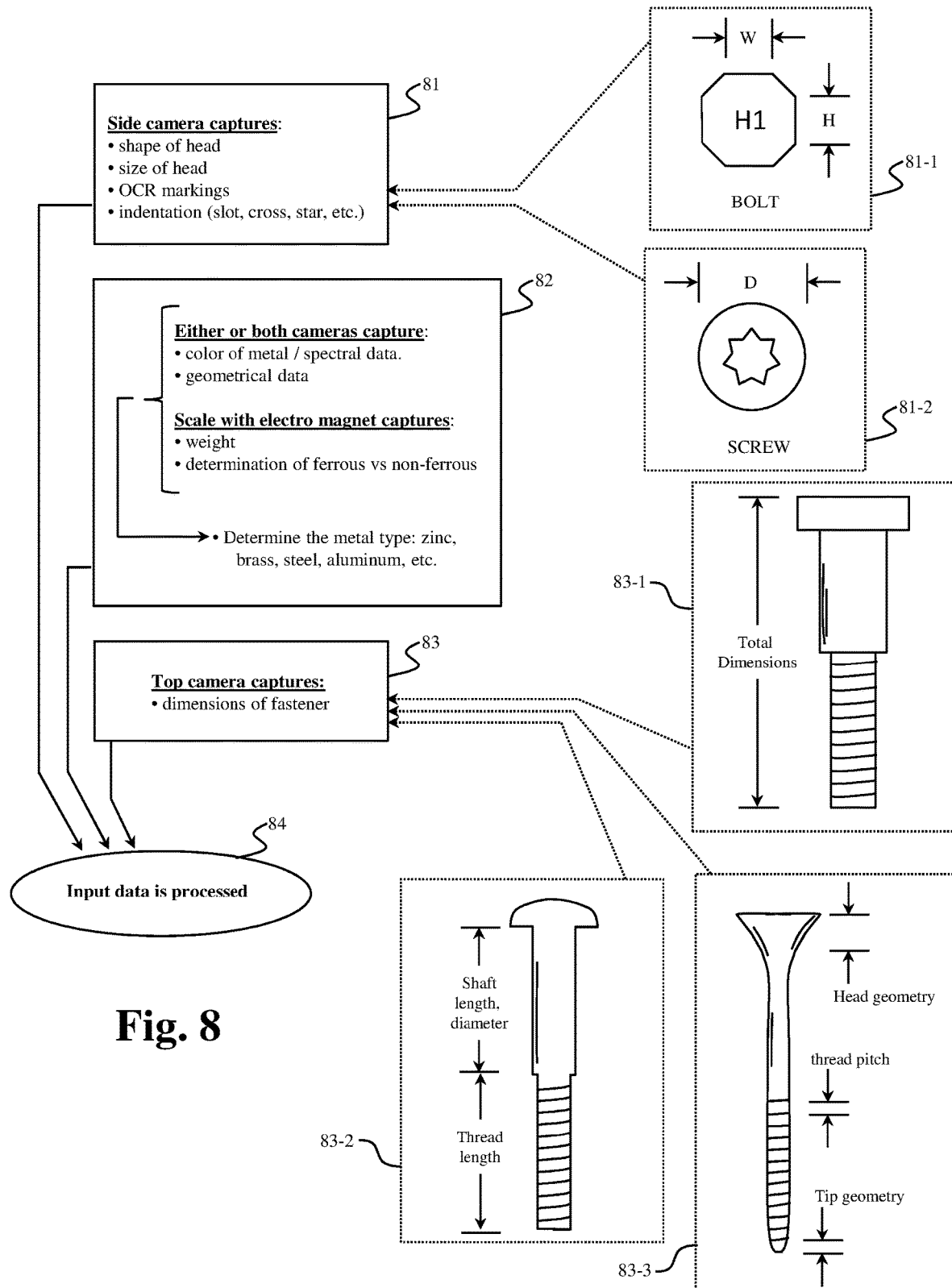
FIG. 8 is a diagram showing aspects of image data input and processed by the system, in accordance with at least one embodiment of the disclosure.

FIG. 8 is a diagram showing aspects of image data input and processed by the system, in accordance with at least one embodiment of the disclosure. Illustratively, the data of FIG. 8 might be input and processed by the system 10 of FIG. 1, which includes the camera assembly 130A, the camera assembly 130B, and the computer processing portion (CPP) 180. More specifically, FIG. 8 illustratively associates cameras, scales, and/or other input devices utilized in the invention, such as in the system 10 of FIG. 1, with attributes of a sample fastener that may be input by such input devices.

Illustratively, as shown at 81, a side camera (such as camera assembly 130A of FIG. 1) might be utilized to capture attributes of a sample fastener including shape of head, size of head, OCR markings, and indentations in the sample fastener. OCR markings might include numerical identifiers observed on the head of a sample fastener, indicia observed on the shank of the sample fastener, and/or other indicia observed on a particular sample fastener. Indentations observed by the system might include a slot, cross, star, or other structure, for example. For example, a side camera might be utilized to capture structure of a fastener as shown at 81-1. Such structure may include an OCR marking "H1" disposed upon the head of a fastener. Additionally, such structure might include the overall shape of the head, as well as height dimensions of the head of the fastener. A side camera might be utilized to capture structure of the fastener as shown at 81-2. Such structure may include varying types of screw drives, such as the "star" screw drive shown at 81-2. A diameter attribute of the screw head might also be input.

Further illustratively, as shown at 82, either or both cameras might capture attributes such as color of the screw as painted or metal. Additionally, spectral data might be input by either or both cameras. In general, a wide variety of geometrical data might be input by either or both cameras. Additionally, as described above and otherwise herein, a scale with electromagnet might be utilized to capture attributes of a sample fastener. With such components, the weight of a sample fastener might be determined with and without application of an electromagnet upon the sample fastener. In particular, a scale with electromagnet may provide determinations of ferrous versus non-ferrous construct of a particular fastener. Additionally, color data, spectral data, geometrical data, weight data, and composition data (ferrous versus non-ferrous) may be utilized in combination so as to deduce attributes of a particular fastener. For example, a combination of data might be utilized to determine the metal type of a particular fastener, be that zinc, brass, steel, aluminum, etc.

As illustratively shown at 83, the top camera might be utilized to input various information regarding the dimensions of a fastener. For example, a top camera might be utilized to capture structure of a fastener as shown at 83-1. Such structure might include total dimensions of a fastener. Also, a top camera might be utilized to capture structure of a fastener as shown at 83-2. Such structure might include the length of a shaft of the screw, the diameter of a shaft of a screw, thread length, thread diameter and/or various other attributes. A top camera might be utilized to capture structure of a fastener as shown at 83-3. Such structure might include the head geometry of a screw, thread pitch, tip geometry, and/or various other attributes. Accordingly, as reflected at 84, the various data input by the components of the system 10 contribute to input data that is processed by the one or more computer processors of the system.

It should be appreciated that the various components depicted in FIG. 8 and the various attributes illustratively described are for purposes of illustration in the present disclosure. A wide variety of other attributes might be input as may be desired. Relatedly, it is appreciated that particular attributes input and utilized may vary widely between different fasteners. For example, attributes input and processed for a screw would of course be substantially different than attributes input and processed for a nut. Various further particulars and attributes of fasteners, in conjunction with processing performed by the system, are described below.

Figure 9:
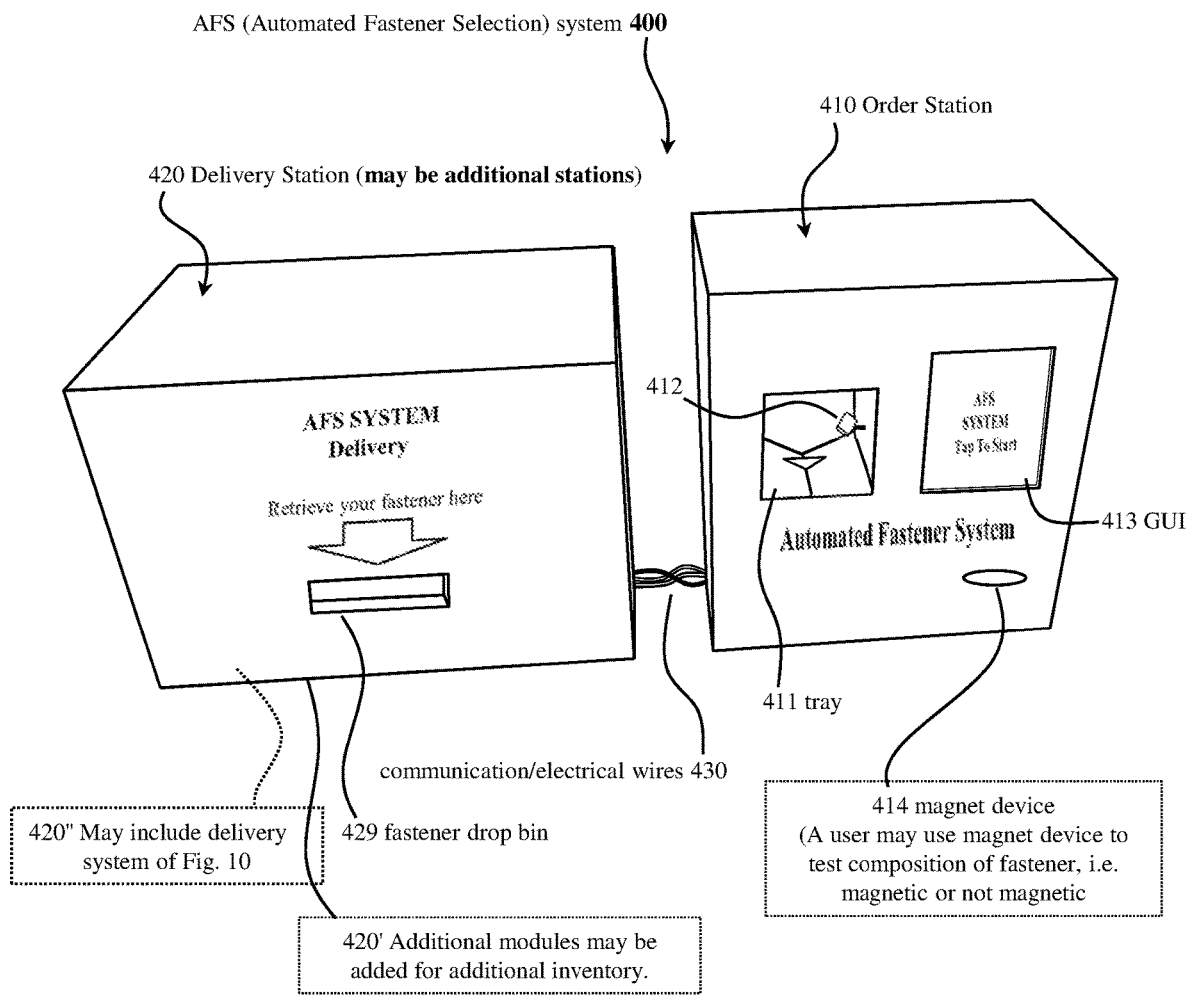
FIG. 9 is a diagram showing an AFS system, in accordance with a further embodiment of the disclosure.

FIG. 9 is a diagram showing an AFS system or apparatus 400, in accordance with a further embodiment of the disclosure. The AFS system 400 may be provided with various of the same structure and functionality described above with reference to the AFS system 10 of FIG. 1. However, the arrangement of the AFS system 400 is different as compared to the arrangement of the AFS system 10. In particular, the AFS system 400 might be characterized as including two distinct stations as compared to the one station of FIG. 1.

The two distinct stations of the AFS system 400, as shown in FIG. 9, include both an order station 410 and a delivery station 420. The order station 410, disposed on the right side of FIG. 9, includes a tray 411 and a GUI 413. Illustratively, both the tray 411 and the GUI 413 may be of similar structure and functionality to that described above, with reference to FIG. 1. Similarly to the system of FIG. 1, the order station 410 may also include suitable cameras such as the camera 412 shown in FIG. 9. In the example of FIG. 9, the station/kiosk portion 410 is characterized as the "order station" in that such structure houses various components and provides functionality relating particularly to the input of data to identify fasteners in inventory that correspond to a sample fastener placed in the tray 411.

On the other hand, the delivery station 420 as shown in FIG. 9 provides functionality and houses various components relating to the physical inventory of the AFS system 400 as well as the retrieval and delivery of a fastener selection to the user. Accordingly, in the example of FIG. 9, the inventory of fasteners is housed within one or more of the delivery stations 420. Accordingly, as inventory is increased the number of delivery stations 420 (associated with a particular order station 410) and/or the size of the delivery stations 420 may be increased as desired as reflected at 420' of FIG. 9. The delivery station 420, of FIG. 9, may be provided with a fastener drop bin 429 into which a fastener selection is delivered from inventory. The order station 410 and the delivery station 420 may be in communication with each other, as well as with other components, using suitable wires and communication devices, for example. Accordingly, communication and electrical wires 430 are shown in FIG. 9 as providing communication between the order station 410 and the delivery station 420.

Figure 10:
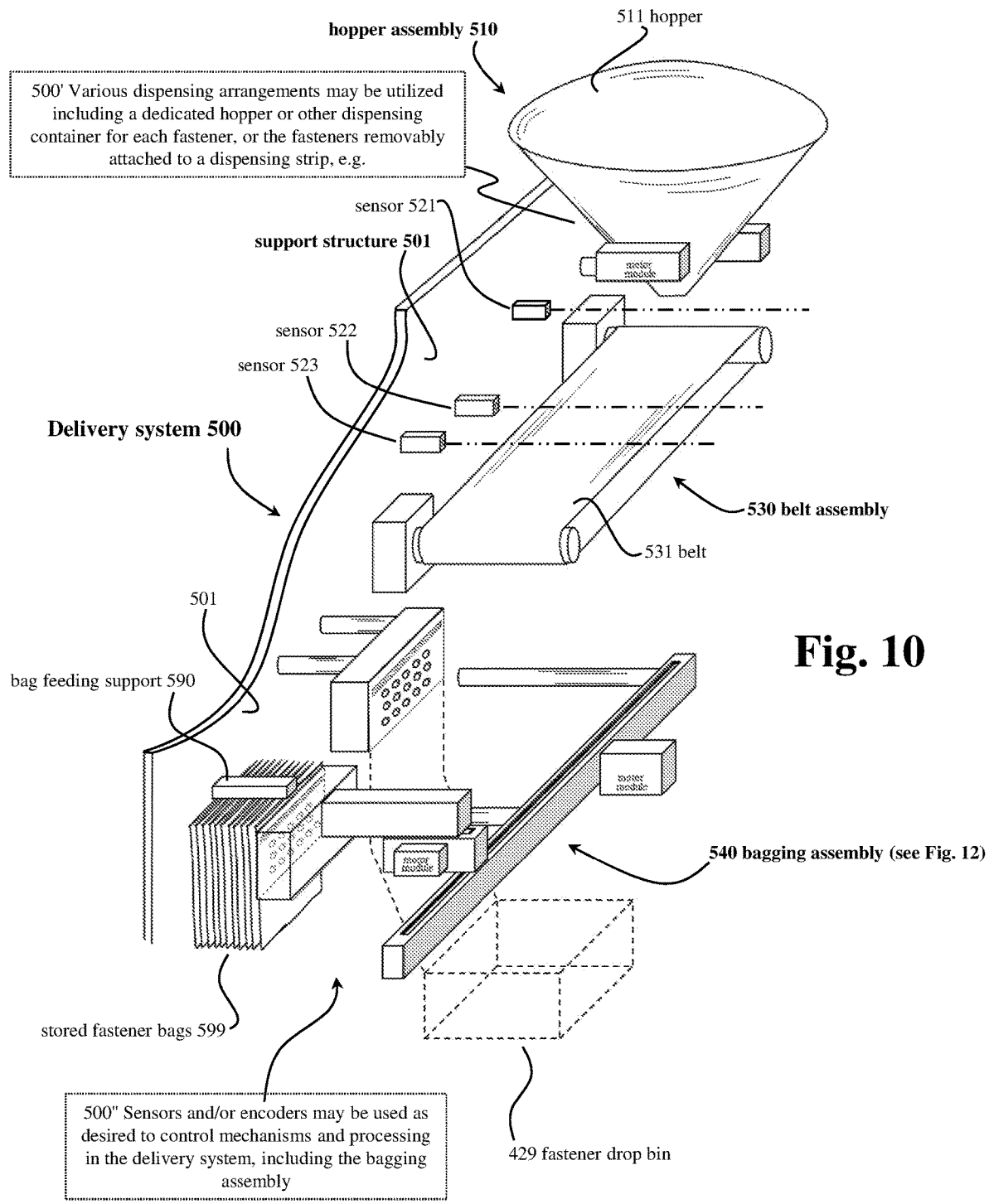
FIG. 10 is a diagram showing a delivery system, in accordance with at least one embodiment of the disclosure.

Various aspects of inventory and delivery mechanisms are described throughout the present disclosure. Such inventory and delivery mechanisms may be housed, in accordance with at least one embodiment of the disclosure, within the delivery station 420. For example, as reflected at 420", the delivery system (to deliver a fastener selection from inventory within the delivery station 422 to the fastener drop bin 429) may include a delivery systems such as is shown in FIG. 10 and described below. The AFS system 400, including the delivery station 420 and the order station 410, may be provided with additional accoutrements related to the identification of a sample fastener, in accord with at least one embodiment of the disclosure. Accordingly, in the example of FIG. 9, the order station 410 may be provided with a magnet device 414. Utilizing a magnet device 414, a user may use the magnet device 414 to test the composition of the fastener. That is, in one embodiment, a user may position a sample fastener in front of the magnet device 414 to test the composition of the fastener—and determine if the fastener is magnetic or not magnetic.

As described throughout the present disclosure, various mechanisms and arrangements may be utilized to store desired inventory in an AFS system of the invention. Additionally, various mechanisms and arrangements may be utilized to retrieve such stored inventory and deliver that inventory to a retrieval location, such as a fastener drop bin 429 of FIG. 9.

In accordance with at least one embodiment of the disclosure, FIG. 10 is a diagram showing a delivery system or apparatus 500, in accordance with at least one embodiment of the disclosure.

Figure 11:
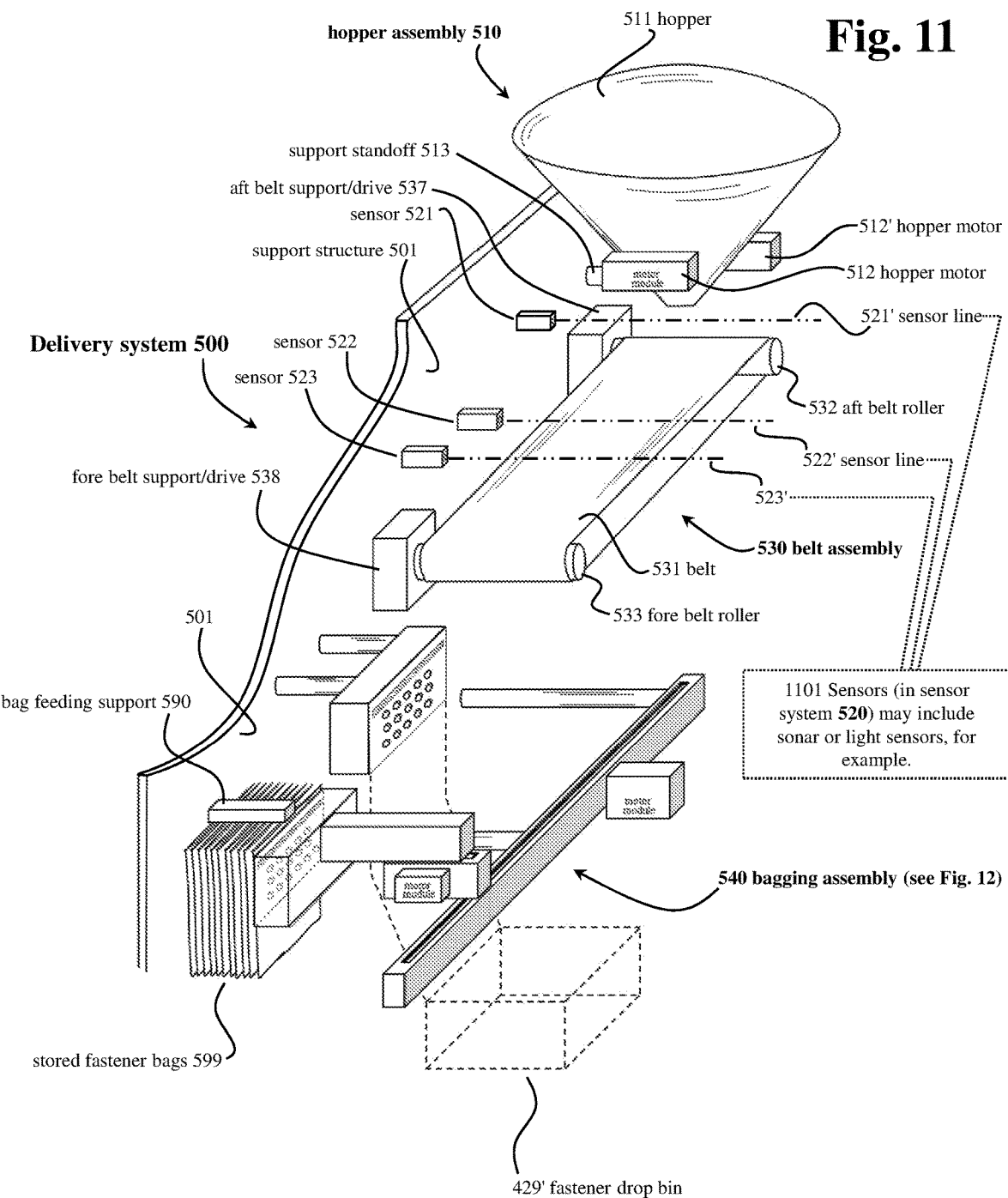
FIG. 11 is a diagram showing further details of a delivery system the same as or similar to the delivery system of FIG. 10, in accordance with at least one embodiment of the disclosure.

FIG. 11 is a diagram showing further details of a delivery system 500 the same as or similar to the delivery system of FIG. 10, in accordance with at least one embodiment of the disclosure.

As shown in FIG. 10, the delivery system 500 includes a hopper assembly 510 that includes a hopper 511. The hopper 511 provides for storage of a desired fastener. The size of the hopper 511 may vary as desired. Also, it is of course appreciated that numerous hoppers 511 may be provided so as to provide for sufficient storage for inventory. Additionally, the delivery system 500 includes a belt assembly 530 with a belt 531. The belt assembly transports a fastener selection from inventory, i.e. from a hopper assembly 510, to either a location for retrieval by a user or to a location for bagging, for example.

Figure 12:
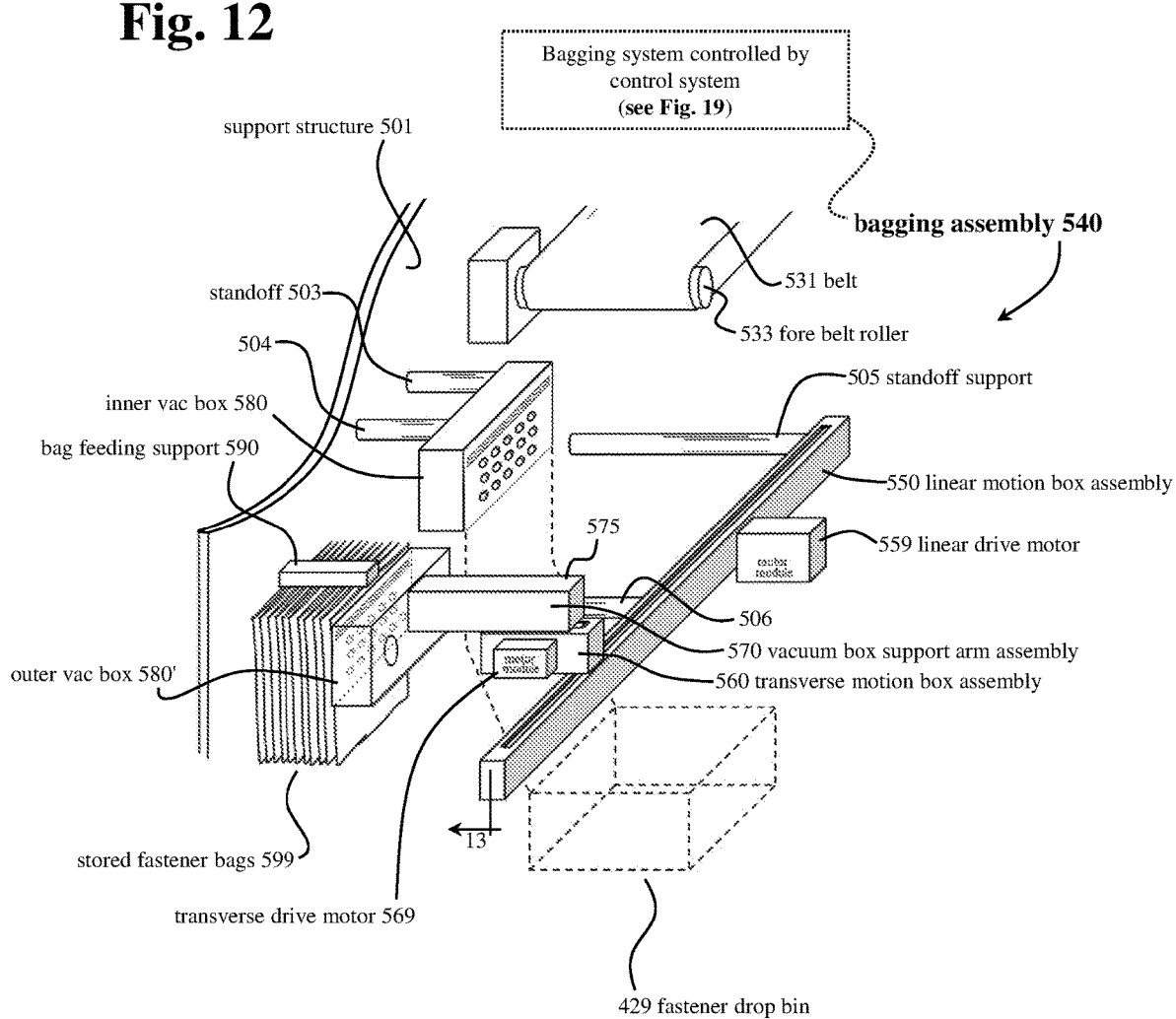
FIG. 12 is a diagram showing further features of a bagging assembly, in accordance with at least one embodiment of the disclosure.

Relatedly, the delivery system 500 includes a bagging assembly 540. Further details of the bagging assembly 540 are shown in FIG. 12, in particular. The delivery system 500 may include a plurality of stored fastener bags 599, shown in FIG. 10, along with a bag feeding support 590.

The various components of the delivery system 500, including a plurality of hoppers 511, one of more belt assemblies 530, a bagging assembly 540, as well as various other mechanical components may be supported utilizing a suitable support structure illustrated at 501 in FIG. 10. For example, a construct of a support structure 501 may be constituted by one or more walls of a kiosk of an AFS system. For example, a back wall of the delivery station 420 of FIG. 9 might be utilized as a support structure 501, in accordance with at least one embodiment of the disclosure.

As reflected in FIG. 10 at 500", various sensors and/or encoders may be used as desired to control mechanisms and processing in the delivery system 500 of FIG. 10. Such sensors and/or encoders might be utilized to control dispensing of fasteners from the hopper 511, passage of the fasteners along a delivery mechanism such as belt assembly 530, as well as operation of the bagging assembly 540. As shown in FIG. 10, the delivery system 500 may include sensor 521 to provide input regarding the dispensing of one or more fasteners from the hopper 511. Additionally, the delivery system 500 of FIG. 10 may include one or more sensors 522 and one or more sensors 523 to control transport of a fastener selection along delivery mechanisms, such as the belt assembly 530 of FIG. 10.

Further, it is appreciated that the systems of the disclosure may utilize various alternatives to the mechanisms presented in FIG. 10. Further, the particular arrangement and linearity as illustrated in FIG. 10 may be varied as desired. For example, instead of a belt assembly, a suitable chute, ramp, chain assembly, and/or other delivery mechanism(s) might be utilized. Further, a chain or series of varied delivery mechanisms might be utilized as may be desired. A particular type of delivery mechanism might be suitable for one type of fastener with another type of delivery mechanism suitable for another type of fastener. Likewise, a particular type of hopper or other storage device might be suitable for one type of fastener but not for another type of fastener. Accordingly, the arrangement, structure, machinery, and other mechanics of the delivery system 500 may be varied as desired with the particulars of FIG. 10 being illustrative of such delivery system.

As noted above, FIG. 11 is a diagram describing further details of a delivery system 500 the same as or similar to the delivery system of FIG. 10, in accordance with at least one embodiment of the disclosure.

As noted above, the delivery system 500 includes a hopper assembly 510, a belt assembly 530, and a bagging assembly 540. As described in further detail below, the hopper assembly 510 may include a plurality of hopper motors 512. In a manner as described below, the plurality of hopper motors 512 may be controlled by control system so as to selectively dispense fasteners out of a plurality of hoppers 511 that respectively contain the various fasteners in inventory. The hopper 511 as well as the hopper motors 512 may be supported with suitable support structure. For example, one type of support structure might be support standoff 513. However, it is of course appreciated that a wide variety of support structure and arrangements might be utilized.

As described above, a suitable sensor 521 might be utilized to sense and allow control of fasteners dispensed from the hopper 511. As reflected at 1101, sensors may also include sonar or light sensors, for example. Such sensors may detect activity along a particular line and/or in a particular area of the delivery system 500. For example, the sensor 521 might be in the form of a light sensor that detects activity along a sensor line 521'. Such activity might be constituted by one or more fasteners passing from the hopper 511 onto the belt 531. Sensor 522 may be provided to detect activity along a sensor line 522'. Sensor 523 may be provided to detect activity along a sensor line 523'.

As shown in FIG. 11, the belt assembly 530 may include various mechanisms to drive the belt in conjunction with the various input received from the one or more sensors 522, 523. As shown, the belt assembly 530 may include an aft belt support/drive 537 that includes structure that supports and drives an aft belt roller 532. The belt assembly 530 may further include a fore belt support/drive 538 that includes structure that supports and drives a fore belt roller 533. In turn, the aft belt roller 532 and the fore belt roller 533 serve to support the belt 531.

FIG. 11 also shows bagging assembly 540. Further details of the bagging assembly 540 are described below with reference to FIG. 12. As shown in FIG. 11, in this example of the disclosure, the bagging assembly 540 serves to receive a fastener selection, bag the fastener selection in a suitable container such as a plastic bag, and deliver that bag fastener selection to a pickup location, such as a fastener drop bin 429' as shown in FIG. 11. Various further details of such machinery and processing are described below.

FIG. 12 is a diagram showing further features of a bagging assembly 540, in accordance with at least one embodiment of the disclosure. As shown, the bagging assembly 540 is disposed proximate to a terminal end of belt 531, i.e. proximate to fore belt roller 533.

FIG. 12 shows an arrangement including machinery and processing to provide a plurality of stored fastener bags 599, retrieve a fastener bag as needed, manipulate the fastener bag so as to receive a fastener selection, seal the fastener bag if desired, and deposit the bag with fastener selection contained therein into the fastener drop bin 429. The arrangement of FIG. 12 utilizes vacuum technology and robotic arm construct so as to perform the processing relating to such bagging of a fastener selection. It is appreciated that the systems and methods of the disclosure are not limited to the particular arrangement as shown in FIG. 12. Various other arrangements, machinery, and/or methodology may be utilized so as to perform desired bagging and containment of a fastener selection. Additionally, it is appreciated that in some embodiments of the disclosure, it may not be the case that a fastener selection is bagged or boxed, for example, at all. Rather, with some arrangements, it may be desired (in construct of a fastener system) to simply provide a fastener selection to a user in a "loose" manner.

Accordingly, while the disclosure is not limited to the particular arrangement as shown in FIG. 12, FIG. 12 provides one illustrative arrangement to afford the functionality described. The bagging assembly 540 includes a linear motion box assembly 550 that is illustratively supported by standoff supports 505 and 506. A transverse motion box assembly 560 is moved along a length of the linear motion box assembly 550 utilizing a linear drive motor 559. The linear drive motor 559 may include a motor module as shown. Such movement of the transverse motion box assembly 560 may be performed with mechanics as described below with reference to FIG. 13.

The bagging assembly 540 further includes a vacuum box support arm assembly 570. The vacuum box support arm assembly 570 is transversely moved relative to the box assembly 560 utilizing a transverse drive motor 569. The transverse drive motor 569 may include a motor module as shown.

The assembly 550, the assembly 560, and the assembly 570 collectively serve to provide movement to and support what is characterized as an outer vacuum box 580'. Further details are described below with reference to FIG. 14A, for example. In this illustrative example in accordance with at least one embodiment of the disclosure, the outer vacuum box 580' is initially positioned adjacent and against one of the stored fastener bags 599. A vacuum is applied so as to secure the adjacent fastener bag to the outer vacuum box 580'. The outer vacuum box 580' is then manipulated, by the bagging assembly 540, so as to be disposed adjacent to an additional vacuum box. More specifically, the additional vacuum box is characterized as the inner vacuum box 580 is shown in FIG. 12. The inner vacuum box 580 may be supported by suitable standoff support structures 503, 504. Various further details are described below.

Figure 13:
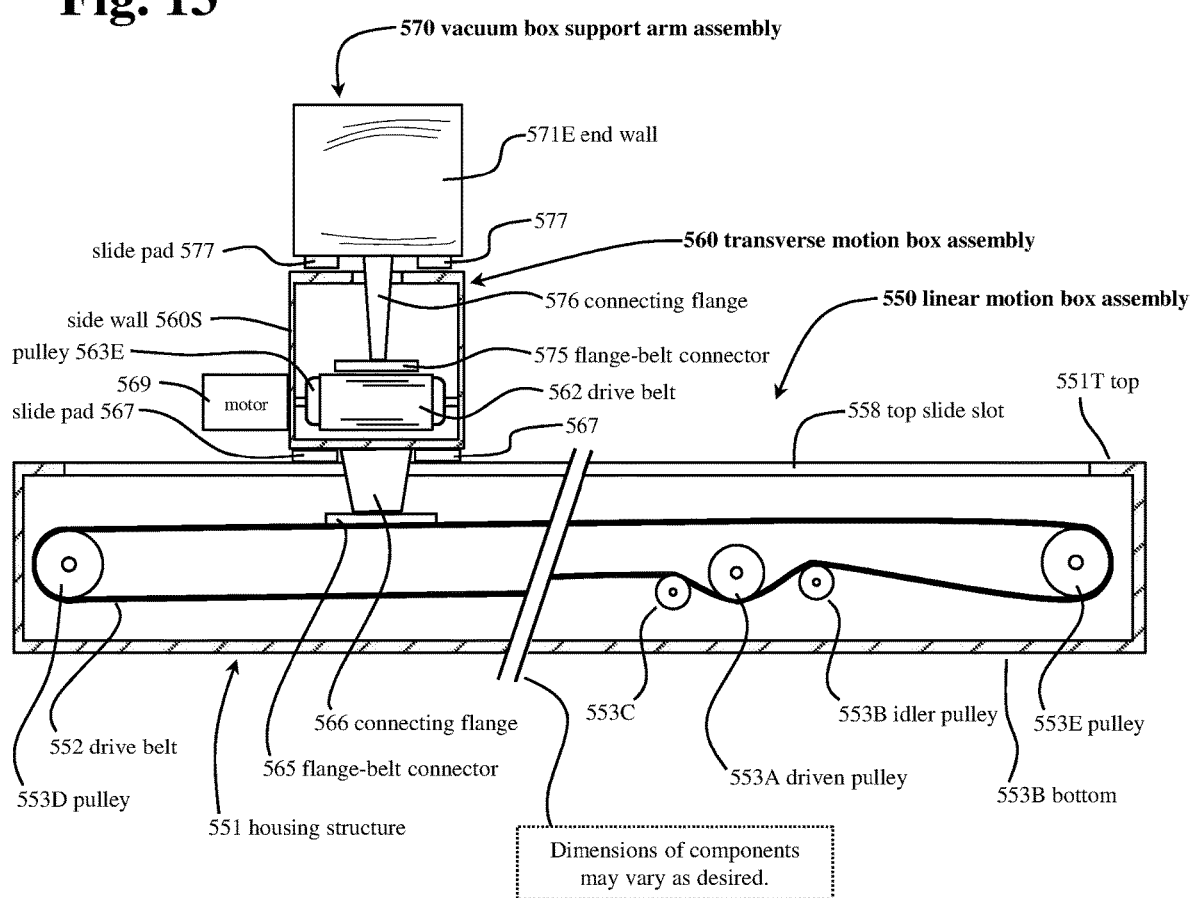
FIG. 13 is a cross-sectional view of an arrangement, in accordance with at least one embodiment of the disclosure.

FIG. 13 is a cross-sectional view of the arrangement of FIG. 12 along line 13 as shown in FIG. 12, in accordance with at least one embodiment of the disclosure. It is appreciated that the dimensions of the various components of the delivery system 500 may be varied as desired. Relatedly, is appreciated that relative dimensions of the various components of the delivery system 500 may be varied as desired.

In particular, FIG. 13 shows internal details of the linear motion box assembly 550. FIG. 13 also shows various other internal details of the bagging assembly 540. The linear motion box assembly 550, as shown in FIG. 13 and in FIG. 12, includes a housing structure 551. The housing structure might be constructed of various materials as desired, such as metal and/or plastic, for example. The housing structure includes a bottom 551B and a top 551T. The housing structure may also include a side 551S. The various portions of the housing structure 551 serve to support various components housed within the housing structure 55. As reflected at 1301, the dimensions of components may vary as desired—in particular with reference to the assembly 550, the length of the assembly 550 may vary as desired.

The interior components of the assembly 550 provides functionality to provide movement of the transverse motion box assembly along a length of the housing structure top 551T. Relatedly, disposed along a length of the housing structure top 551T, is a top slide slot 558. The top slide slot 558 accommodates a connecting flange 566 that is fixedly associated with the transverse motion box assembly 560. The transverse motion box assembly 560 is moved along a length of the assembly 550, in the example of FIG. 13, utilizing a belt arrangement. The connecting flange 566 is connected to a flange-belt connector 565. As shown, the flange-belt connector 565 is in turn connected to the drive belt 552.

The drive belt 552 may be supported and driven utilizing the pulley arrangement of FIG. 13. The pulley arrangement may include a driven pulley 553A. The driven pulley 553A may be driven by the linear drive motor 559 through a suitable driveshaft arrangement. Opposing ends of the drive belt 552 may be supported by pulley 553D and pulley 553E. Further, suitable idler gears 553B and 553C, may be utilized to "take up" any slack in the drive belt 552. Accordingly, as the drive belt 552 is motorized by the driven pulley 553B, such movement serves to move the flange-belt connector 565, which is in turn connected to the connecting flange 566, which is in turn connected to the transverse motion box assembly 560. In particular, movement of the assembly 560 is provided along the top slide slot 558. Such movement may be assisted through using suitable slide pads 567. The slide pads 567 may be constructed of any suitable material such as nylon, for example. For example, the slide pads 567 may be fixedly supported upon a bottom surface of the assembly 560 (on opposing sides of the top slide slot 558) so as to assist sliding of the assembly 560 along the length of the linear motion box assembly 550. It is appreciated that in the various connections of the bagging assembly 540, suitable mechanical arrangements may be provided so as to not allow movement between connected components or to allow limited movement between connected components. For example, ball and socket arrangements might be utilized as desired.

FIG. 13 also shows a cross-section of the transverse motion box assembly 560. The purpose of the assembly 560 is to provide movement to the vacuum box support arm assembly 570. In similar manner to the arrangement of the assembly 550, the assembly 560, may include a drive belt 562 operationally disposed upon a pulley arrangement including pulley 563E. Such a pulley arrangement, as well as other components within the assembly 560 may be supported by side walls 560S of the transverse motion box assembly 560. The drive belt 562, disposed upon the suitable pulley arrangement with pulley 563E, may be driven by the transverse drive motor 569. In similar manner to the arrangement of the assembly 550, movement of the drive belt 562 results in movement of a connected flange-belt connector 575. The flange-belt connector 575 is in turn connected to a connecting flange 576. The connecting flange 576 is in turn connected to the vacuum box support arm assembly 570. An end wall 571E is shown in FIG. 13. In a similar manner to slide pads 567 assisting with movement of the assembly 560 along the length of the assembly 550, slide pads 577 may assist with movement of the vacuum box support arm assembly 570 along a length of the assembly 560. Operation and related movement of the various components of the bagging assembly 5401 is described further below, and in particular with reference to FIGS. 36-44.

Figure 14A:
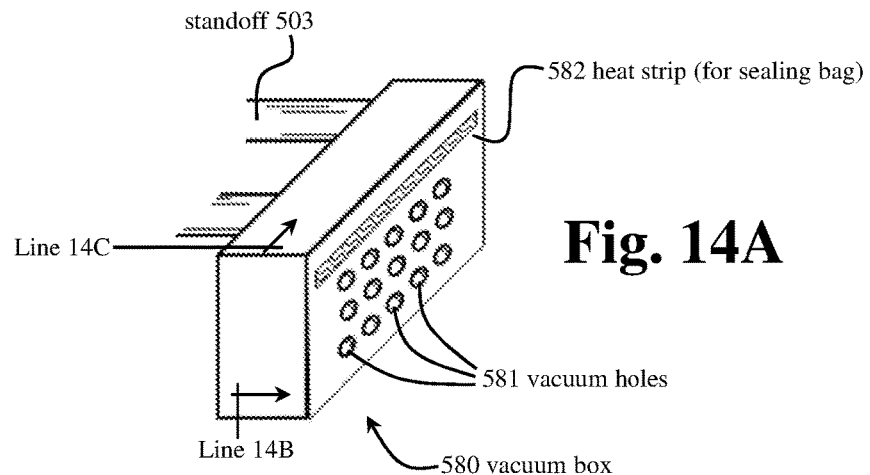
FIG. 14A is a perspective view of a vacuum box, in accordance with at least one embodiment of the disclosure.

FIG. 14A is a perspective view of a vacuum box 580, in accordance with at least one embodiment of the disclosure. Such vacuum box 580 may be the same as or similar to the vacuum box shown in FIG. 12, for example. The vacuum box 580 includes vacuum holes 581. Also, the vacuum box 580 may be provided with a heat strip 582, in accordance with at least one embodiment of the disclosure. The heat strip 582 provides heat to "heat seal" plastic bags, as may be desired. The vacuum box 580 may be supported by appropriate support structure such as the standoff 503 shown in FIG. 14A.

Figure 14B:
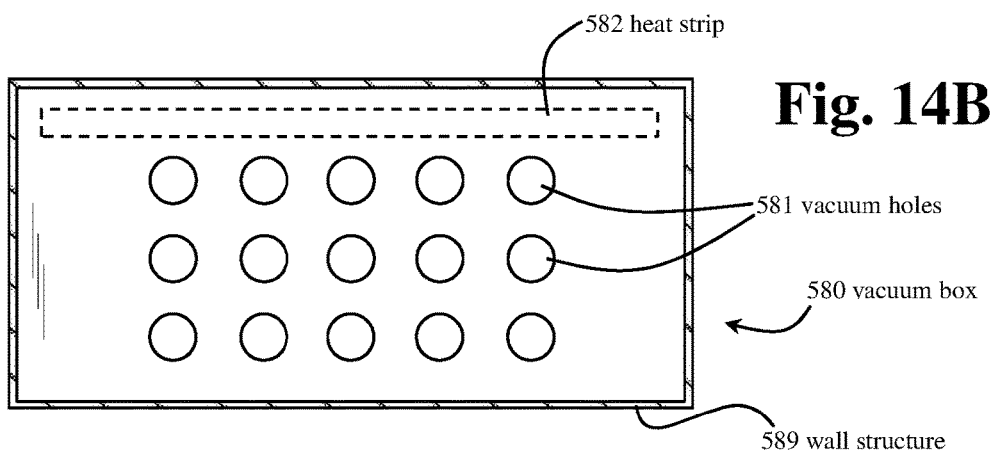
FIG. 14B is a cross-sectional view along line 14B of FIG. 14A, in accordance with at least one embodiment of the disclosure.

FIG. 14B is a cross-sectional view along line 14B of FIG. 14A, in accordance with at least one embodiment of the disclosure. FIG. 14B shows a wall structure 589 of the vacuum box 580. In particular, FIG. 14B shows a hollow interior of the vacuum box 580.

Figure 14C:
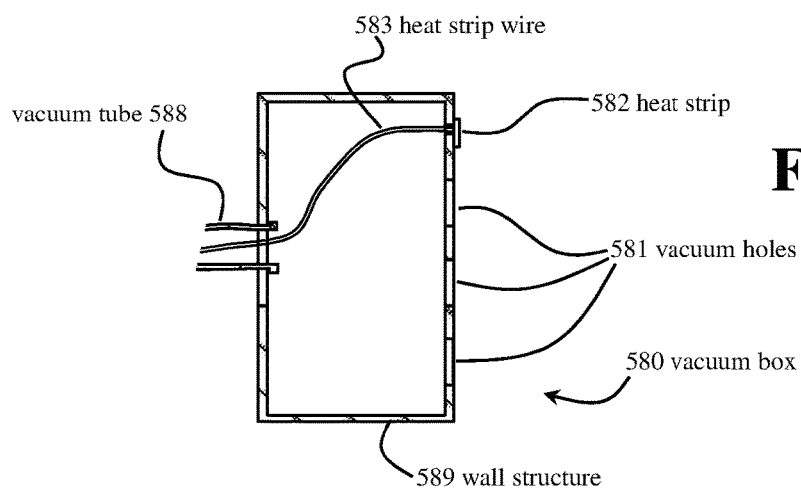
FIG. 14C is a cross-sectional view along line 14C of FIG. 14A, in accordance with at least one embodiment of the disclosure.
Figure 40:
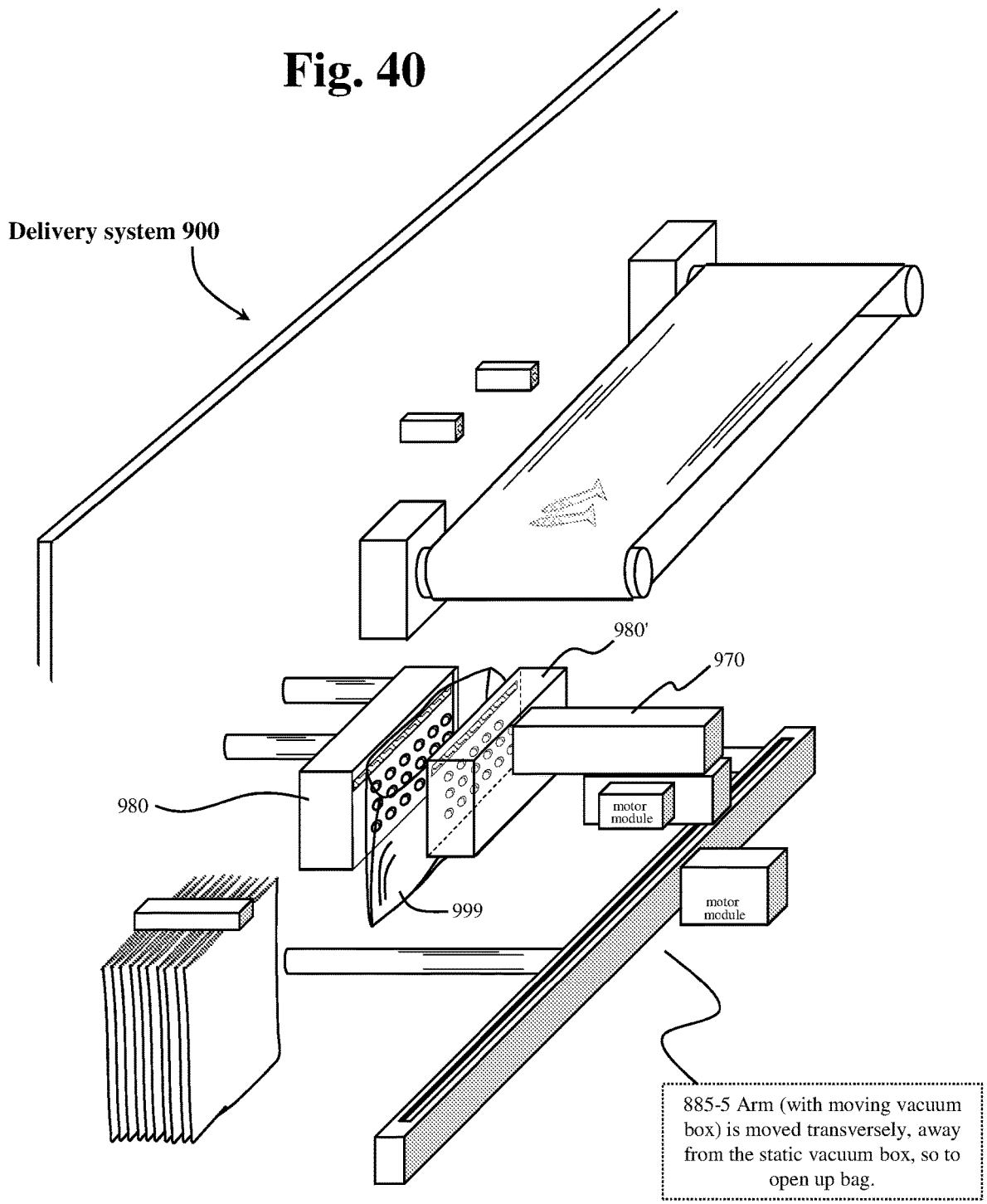
FIG. 40 is a further diagram showing aspects of a delivery system, at later time in processing, in accordance with at least one embodiment of the disclosure

FIG. 14C is a cross-sectional view along line 14C of FIG. 14A, in accordance with at least one embodiment of the disclosure. FIG. 14C also shows a hollow interior of the vacuum box 580 provided by wall structure 589. In operation, vacuum is applied to the interior volume of the vacuum box 580. As result, such vacuum is created within the vacuum holes 581. In turn, the arrangement including the vacuum bags 581 may be utilized to removably and selectively secure a plastic bag or other container to the vacuum box 580. The vacuum created within the vacuum box 580 may be created utilizing a vacuum tube 588. The vacuum tube 588 is in turn connected to an apparatus, i.e. a suction machine, to create a desired vacuum within the vacuum tube 588. Accordingly, a desired vacuum is created within the vacuum tube 588, which in turn creates a vacuum within the vacuum box 580, which in turn creates suction at the vacuum holes 581, which in turn creates a suction affect—so as to removably and selectively secure a container upon the vacuum box 580. Illustratively, such operation is shown in FIG. 40 described below. FIG. 14C also illustrates that heat strip wire 583 may be connected to a heat strip 582 so as to power (and heat) the heat strip 582. As shown, in one example, the heat strip wire 583 might be positioned within the vacuum tube 588 so as to protect the heat strip wire 583 and route the heat strip wire 583 to a suitable power source, in conjunction with routing the vacuum tube 588 to a suitable vacuum source/apparatus.

In lieu of use of individual bags as described above, in accordance with at least one embodiment of the disclosure, bag stock (to form bags to hold fasteners) may be provided in a "roll" arrangement. That is, two-ply plastic stock, heat sealed on both sides, may be parsed out to predetermined length and cut to the desired size. A bottom of the parsed out bag may be heat sealed initially—i.e. to seal a "bottom" of such bag. After insertion of fastener, the top of the bag may then be sealed.

Figure 15:
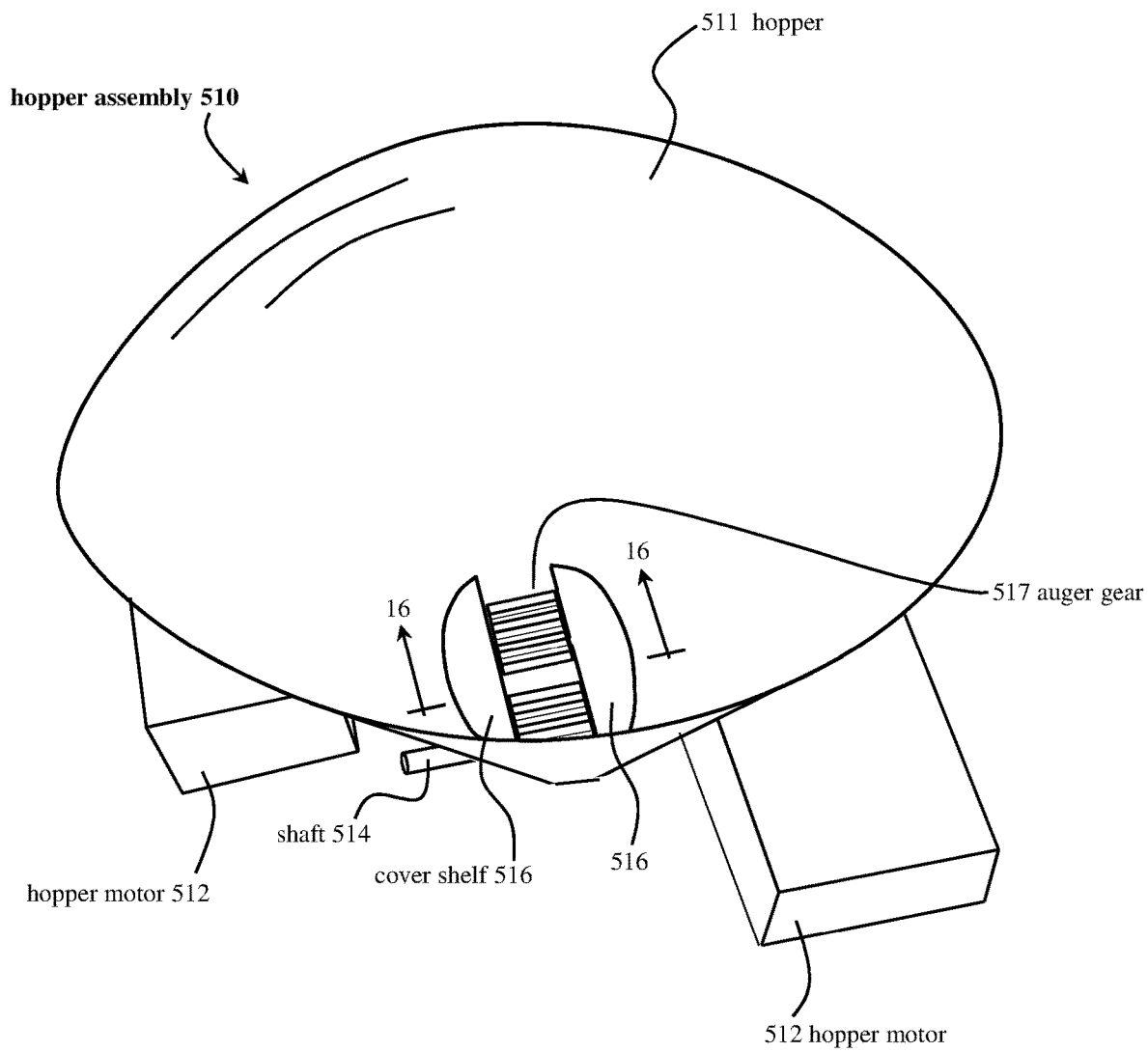
FIG. 15 is a top view showing a hopper assembly, in accordance with at least one embodiment of the disclosure.

FIG. 15 is a top view showing a hopper assembly 510, in accordance with at least one embodiment of the disclosure. The hopper assembly 510 might be the same as or similar to the hopper assembly shown in FIG. 10. The hopper assembly 510 includes hopper 511.

FIG. 15 shows further details of illustrative structure of the hopper assembly 510. In operation, the hopper 511 may be stocked with a fastener, of a particular type, that serves to provide "inventory" for an AFS system 400. For example, the hopper assembly 510 may be housed within an AFS system such as that shown in FIG. 9. Construct of the hopper assembly 510 includes a pair of auger gears 517, in accordance with at least one embodiment of the disclosure. Each of the auger gears 517 may be respectively powered by one or more hopper motors 512. The particular arrangement of powering the auger gears 517, including the particular drive-train utilized and the particular arrangement of the motors may be varied as desired. In operation, the auger gears 517 are operated in unison with each other so as to "intake" fasteners disposed within the hopper 511. The gears 517 might be constructed of any of a wide variety of materials as is dependent upon what is determined to work well with a particular fastener. Also, the gears 517 might be constructed in any of a wide variety of shapes as is dependent upon what is determined to work well with a particular fastener. To explain illustratively, the construct of a pair of auger gears 517 to dispense nuts may be different then construct of a pair of auger gears 517 to dispense screws. In accordance with embodiments, the auger gears 517 might be constructed of a plastic or rubber material, for example.

Figure 16:
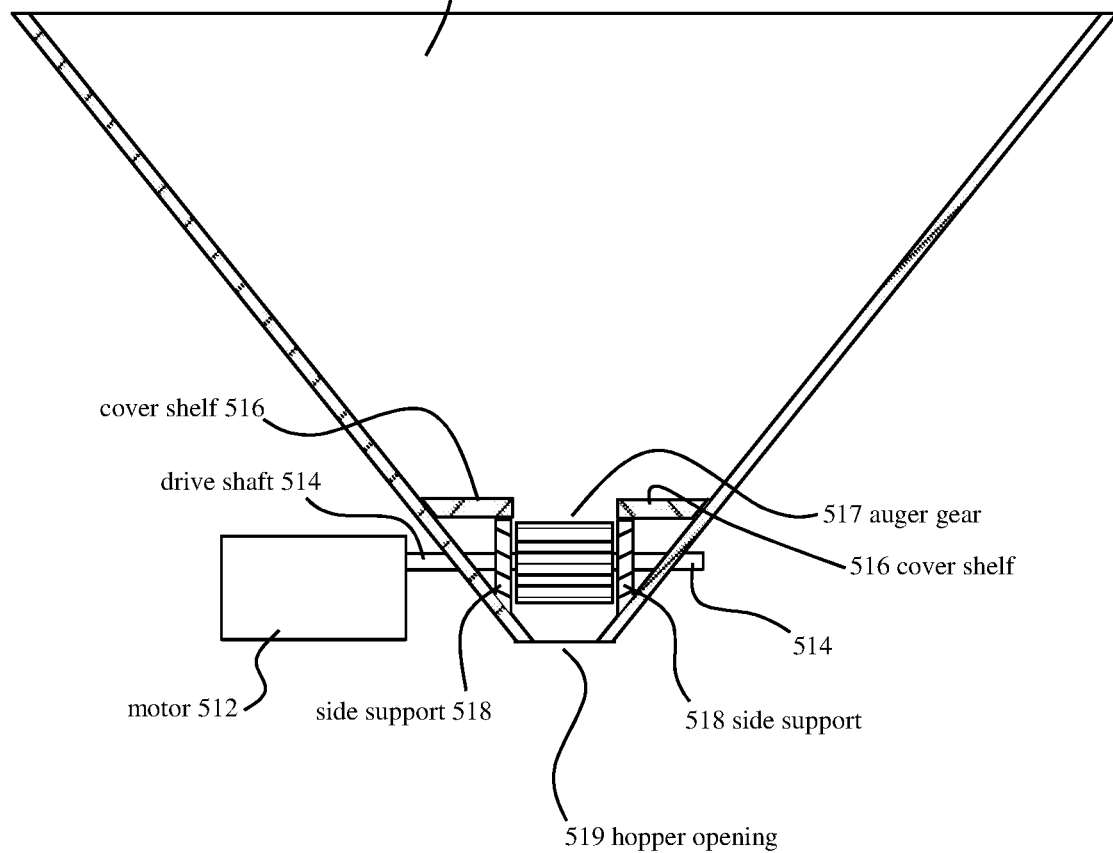
FIG. 16 is a cross-sectional view of a hopper assembly, in accordance with at least one embodiment of the disclosure.

As shown in FIG. 16, a drivetrain between the driven gears 517 and one or more hopper motors 512 may simply be in the form of a shaft 514. A wide variety of gear arrangements may be utilized as desired, so as to adjust gearing ratio between one or more hopper motors 512 and the driven auger gear 517.

The hopper 511, as shown, may be in the general shape of a funnel. However, such particular shape is not limiting and systems and methods of the disclosure may include other shapes. However, the shape and arrangement of a hopper 511 or similar structure may best provide for transport of a stored fastener to the auger gears 517—be that through the force of gravity or otherwise. Relatedly, the hopper assembly 510 may include one or more cover shelves 516. The cover shows 516 may be constructed, angled, positioned, and or otherwise arranged to both enhance movement of fasteners (within the hopper 511) toward the auger gears 517 hand in hand with preventing "stray" fasteners from accessing undesirable locations of the hopper assembly 510. In other words, for example, the cover shelves 516 may be provided to prevent fasteners injuring operation of the hopper assembly 510 by falling outside of the auger gears 517.

FIG. 16 is a cross-sectional view of a hopper assembly 510 along line 16-16 of FIG. 15, in accordance with at least one embodiment of the disclosure. As shown, the hopper assembly 510 includes hopper 511. FIG. 16 further illustrates an auger gear 517. As shown, auger gear 517 is supported upon and driven by a drive shaft 514. In turn, the drive shaft 514, is driven by one or more motors 512. The drive shaft 514 may be supported in a desired position by suitable bearings or other support structure. Such bearings or other support structure may be provided by side support 518, as shown in FIG. 16, by sidewalls of the hopper 511, or in some other manner. As described above, the hopper assembly 510 may be provided with suitable cover shelves 516. The cover shelves 516 may be constructed, positioned, angled, or otherwise arranged in a manner as desired. In particular, as noted above, the cover shelves 516 or similar arrangement prevents one or more fasteners (stored within the hopper 511) from undesirably accessing operational portions of the hopper assembly 510, i.e. so as to result in possible shutdown of a hopper assembly 510.

In operation, as is also described above, fastener(s) stored within the hopper 511 are effectively "sucked" in by opposing rotational movement of the auger gears 517. Control systems and/or sensors may be utilized to control dispensing of fasteners. For example, as sensor 521 (of FIG. 11) detects that a desired number of fasteners has been dispensed (through hopper opening 519) by rotation of the auger gears 517, then rotation of the auger gears 517 is stopped.

Figure 17:
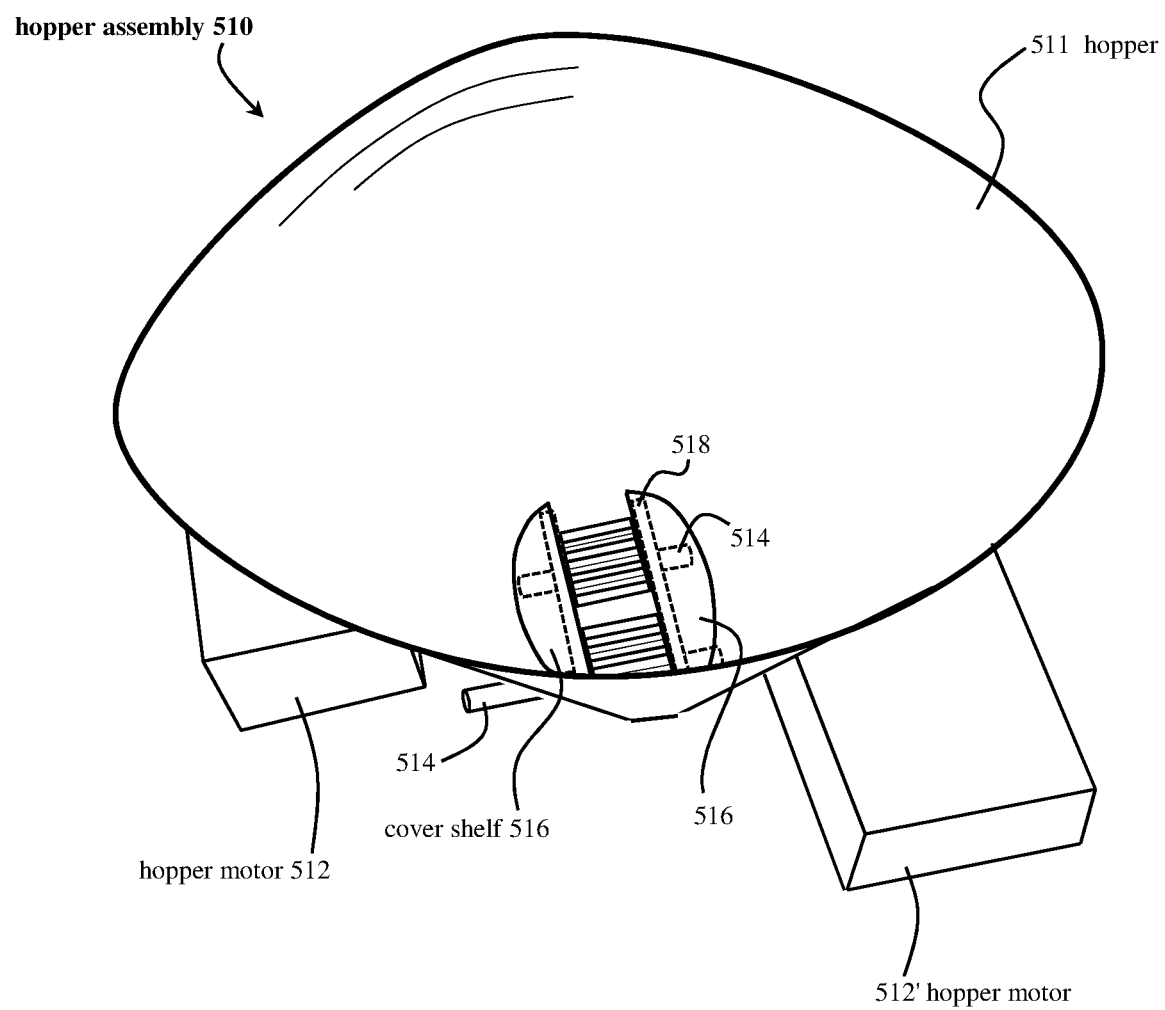
FIG. 17 is a top view showing a hopper assembly the same as or similar to the hopper assembly of FIG. 15, in accordance with at least one embodiment of the disclosure.

FIG. 17 is a top view showing a hopper assembly 510 the same as or similar to the hopper assembly of FIG. 15, in accordance with at least one embodiment of the disclosure. As shown, the hopper assembly 510 includes hopper 511. The hopper assembly 510 also includes hopper motors 512. FIG. 17 also shows further details of the internal arrangement of the hopper assembly 510, including showing side supports 518 and portions of driveshaft 514 (in phantom).

Figure 18:
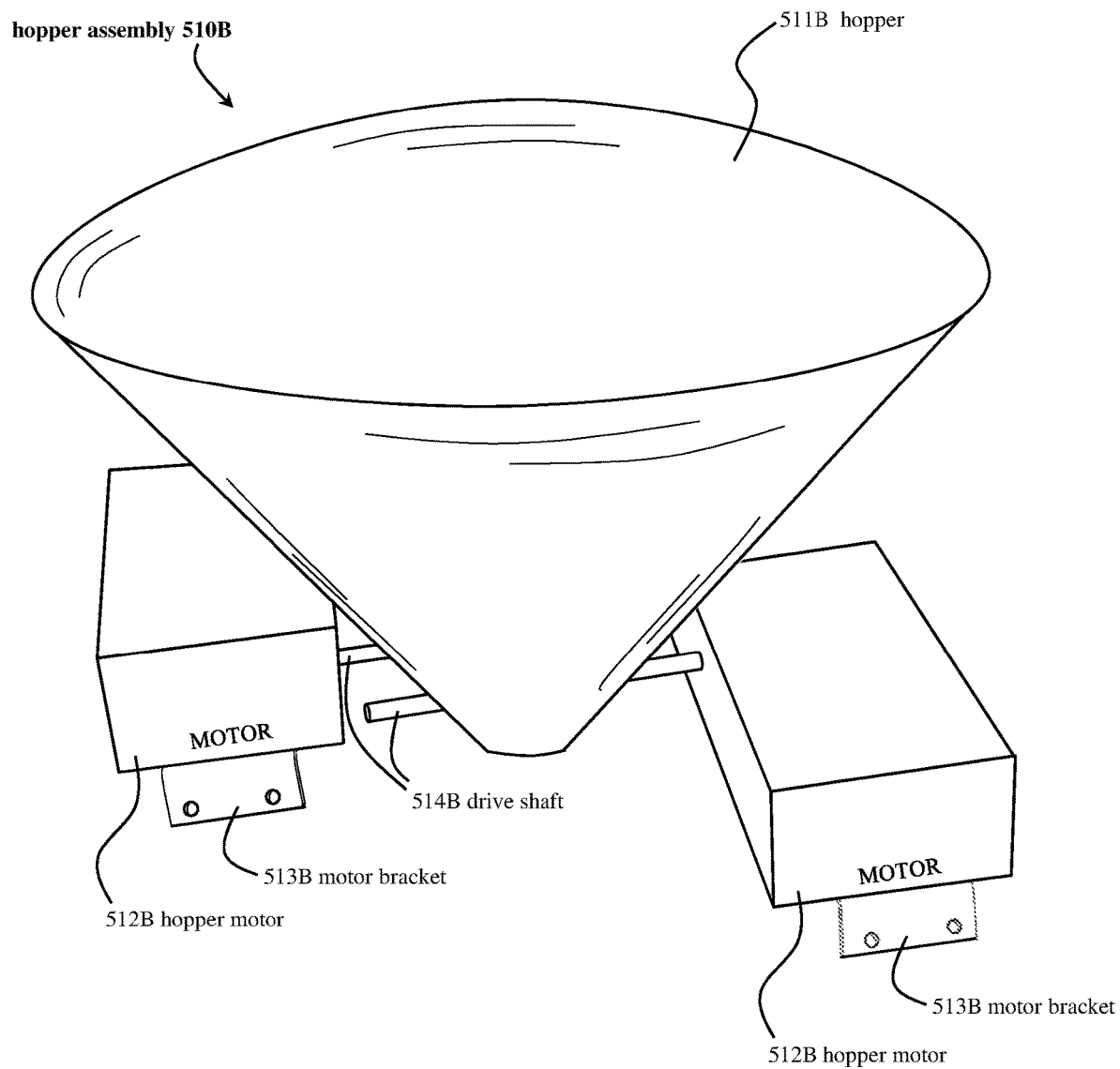
FIG. 18 is a further perspective view of a hopper assembly, in accordance with at least one embodiment of the disclosure

FIG. 18 is a further perspective view of a hopper assembly 510B, in accordance with at least one embodiment of the disclosure. The hopper assembly 510B includes hopper 511B. In a manner similar to the arrangement of FIG. 15, the hopper assembly 510B may be provided with a dispensing arrangement such as auger gears or other dispensing mechanisms. Such dispensing mechanism may be driven by one or more driveshafts 514B or driven in some other suitable manner FIG. 18 further shows that suitable support structure may be utilized to support the hopper 511B, the drive shafts 514B and/or the hopper motors 512B. In particular, such support structure may include motor brackets 512B, respectively, that may be connected directly or indirectly to a further support structure, such as the support structure 501 of FIG. 10.

Figure 19:
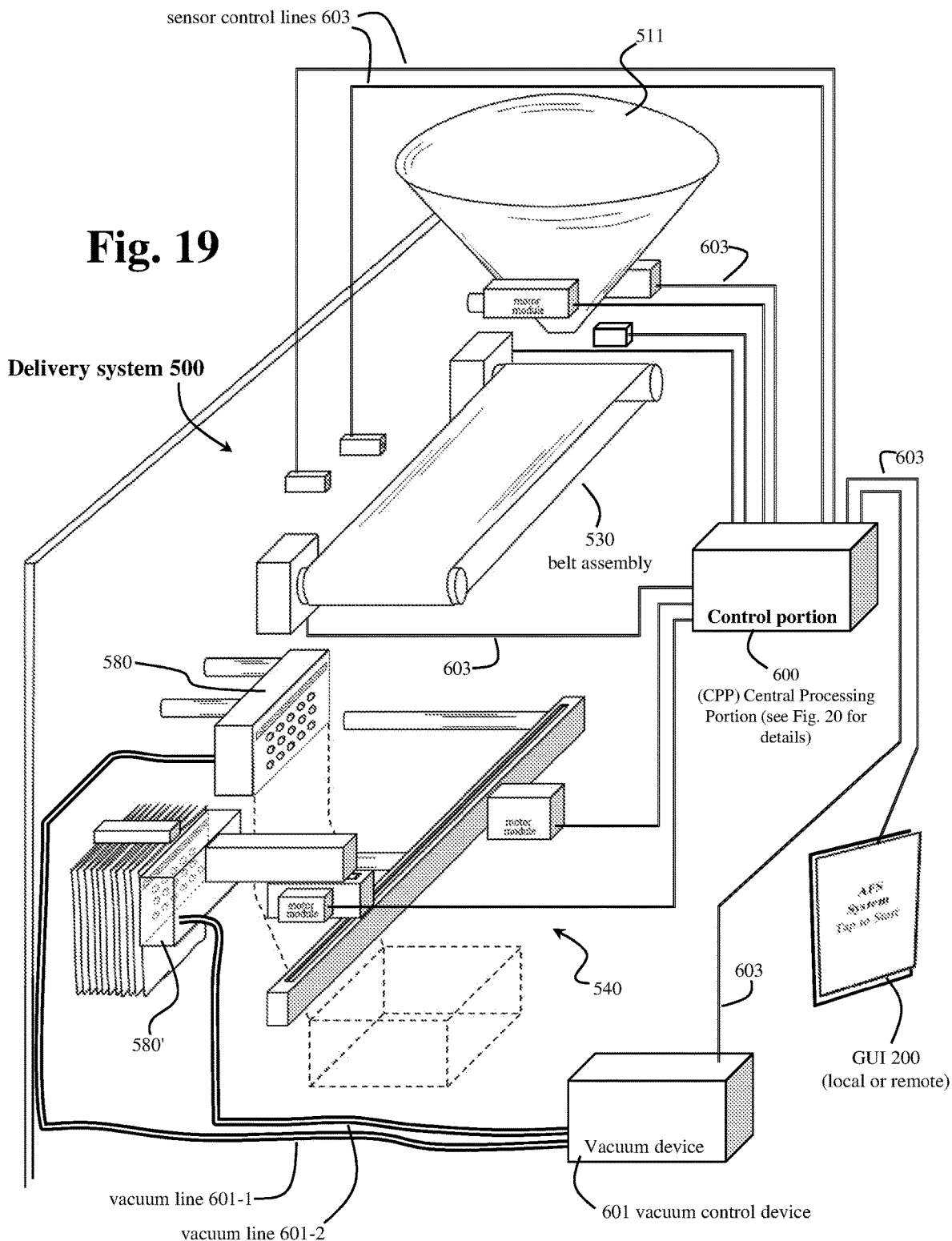
FIG. 19 is a diagram showing further details of a delivery system the same as or similar to the system of FIG. 10
Figure 20:
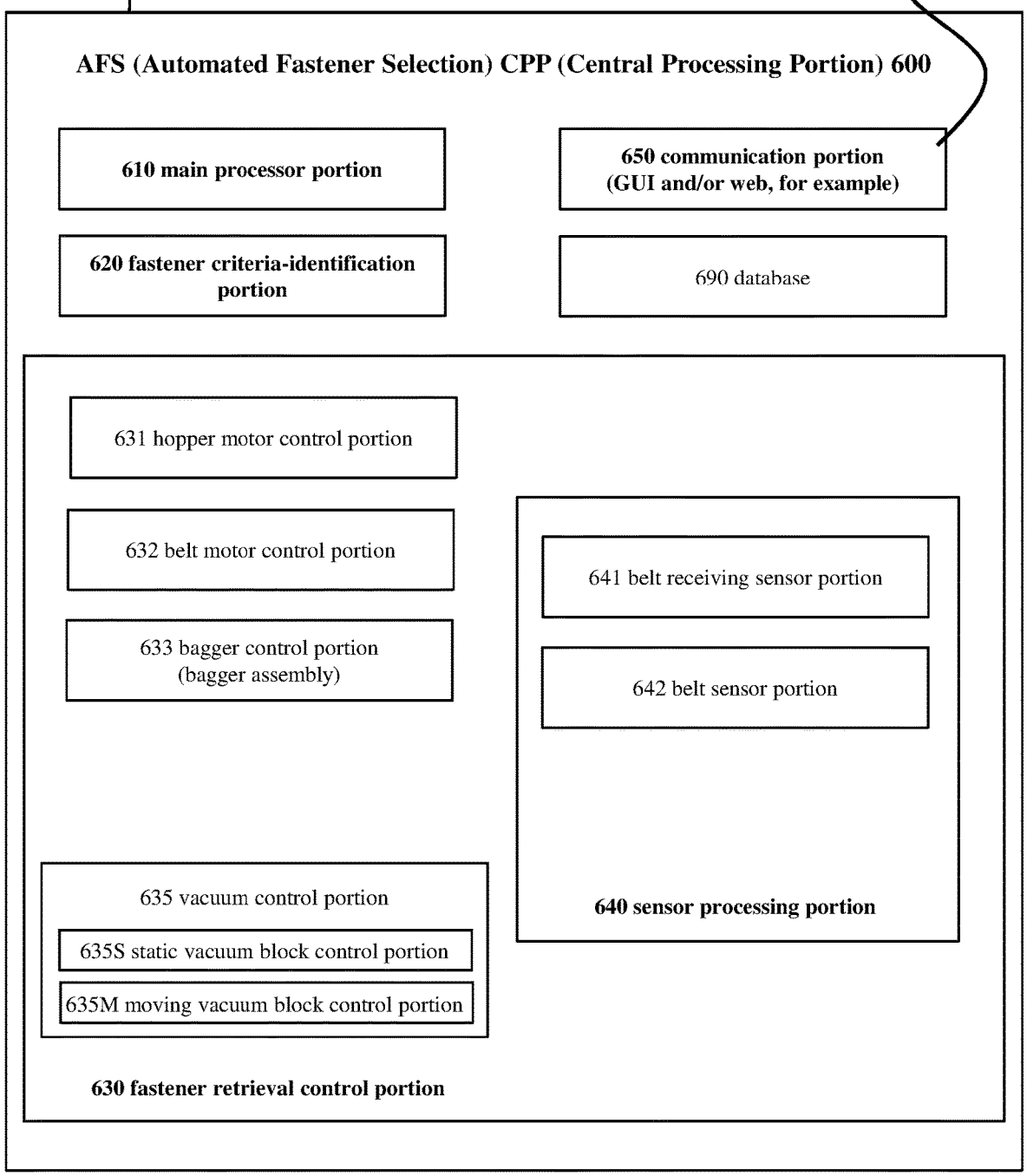
FIG. 20 is a block diagram showing details of the control portion of FIG. 19, in accordance with at least one embodiment of the disclosure.

FIG. 19 is a diagram showing further details of a delivery system 500 the same as or similar to the system of FIG. 10. In particular, FIG. 19 shows various aspects of control of the delivery system 500. Accordingly, the delivery system 500 includes a control portion or apparatus 600. In particular, the control portion 600 may include a central processing portion (CPP). Further details of the control portion 600 are shown in FIG. 20.

As described in detail below, the control portion 600 inputs a wide variety of data associated with various operations and phases of an AFS system of the disclosure. In particular, the control portion inputs various data regarding attributes of a particular fastener desired by a user. Such data might be input from images obtained from a sample fastener provided by the user. Such data may also be input through interface with a user. Accordingly, FIG. 19 shows a control portion 600 that may be connected to one or more cameras 412. Also, control portion 600 may be connected to a suitable GUI 200. In various embodiments of the disclosure, the GUI 200 is disposed upon an AFS system structure, such as in the form of a kiosk. However, interface with a user might additionally or alternatively be performed over a network. That is, as described further below, an AFS system 400 with delivery system 500 might indeed be disposed a geographically different location than a GUI 200, which in turn interfaces with a user, i.e. a GUI on a user device such as a cell phone.

In general, the control portion 600 may be in communication with the various components of an AFS system of the disclosure including delivery system 500 of the disclosure. Accordingly, communication and/or energize lines 603 may be provided between the control portion 600 and the motors and/or sensors that control operation of one or more hoppers 511 or other inventory storage arrangements. Communication and/or energize lines 603 may be provided between the control portion 600 and the motors and/or sensors that control operation of the belt assembly 530. Communication and/or energize lines 603 may be provided between the control portion 600 and the motors and/or sensors that control operation of the bagging assembly 540.

Communication and/or energize lines 603 may be provided between the control portion 600 and the motors and/or sensors the control operation of a vacuum control device 601, as shown in FIG. 19. As described in further detail below, the vacuum control device 601 (of the control portion 600) may be controlled—so as to in turn control operation of the vacuum boxes 580, 580'. Relatedly, vacuum lines 601-1, 601-2 may be provided between the vacuum controlled by 601 and the vacuum boxes 580, 580'.

FIG. 20 is a block diagram showing details of the control portion 600 of FIG. 19, in accordance with at least one embodiment of the disclosure. Such control portion 600 may be constituted by an AFS (automated fastener selection) CPP (central processing portion).

The CPP 600, as shown, includes a variety of processing portions and databases for various operations of the system. Such CPP 600 illustratively includes a main processor portion 610. The main processor portion 610 controls various general operations of the AFS system not otherwise controlled by more specialized processing portions, as described herein. For example, the main processor portion 610 might control powering of the various components in the AFS system and a wide variety of other general functions and operations. The CPP 600 includes fastener criteria-identification portion 620. The fastener criteria-identification portion 620 performs the various operations described herein relating to fastener identification. Accordingly, the fastener criteria-identification portion 620 may control processing of input images from a sample fastener provided in a tray 411, for example (with reference to the AFS system 400 of FIG. 9). The portion 620 might control overall operations of one or more cameras utilized to input such images. The portion 620 may perform various processing related to input of data from a GUI of an AFS system of the disclosure.

The AFS 600 also includes a fastener retrieval control portion 630. The fastener retrieval control portion 630 performs various operations described herein related to retrieval of a fastener selection from inventory—in delivery of the fastener selection to a user. Further details are described below.

Additionally, the CPP 600 includes a communication portion 650. The communication portion 650 may perform various processing related to operation of a GUI, such as GUI 200 disposed upon AFS system 10 of FIG. 1. Such operation of a GUI, such as the GUI 200 of FIG. 1, includes both the generation and presentation of data that is presented to a user, as well as the input of data, which is input from a user interfacing with the GUI. The communication portion 650 may also include a variety of communications performed over networks to which the CPP 600 is connected. For example, the CPP may access third-party resources and/or databases for a variety of purposes. For example, access to third party resources and/or databases might be performed to determine inventory of fasteners, restocking of fasteners, available fasteners, and/or for other purposes. Additionally, the CPP 600 includes database 690. As is described in detail below, the database 690 includes a variety of data generated by the CPP 600 and used by the CPP 600.

The fastener retrieval control portion 630 includes a variety of components. A hopper motor control portion 631 controls operation of one or more hopper motors. The belt motor control portion 632 controls operation of a belt assembly or other arrangement provided to transport a fastener selection from inventory to a delivery point. A bagger control portion 633 controls various operations of a bagging assembly, such as bagging assembly 540 of FIG. 11. Relatedly, the fastener retrieval control portion 630 includes a vacuum control portion 635. Illustratively, the vacuum control portion 635 includes a static vacuum block control portion 635, which controls operation of vacuum 580 shown in FIG. 19. Further, the vacuum control portion 635 includes a moving vacuum block control portion 635M, which controls operation of vacuum 580' shown in FIG. 19.

Additionally, the fastener retrieval control portion 630 may include a sensor processing portion 640. The sensor processing portion 640 processes and/or prepares data for utilization of that data by the various control portions. The sensor processing portion 640 may include a belt receiving sensor portion 641 that identifies a quantity of fasteners, as such fasteners are dispensed from a hopper or other inventory storage mechanism. A belt sensor portion 642 may be utilized to input data from one or more sensors disposed about a belt assembly, such as the belt assembly 530 FIG. 19.

Figure 21:
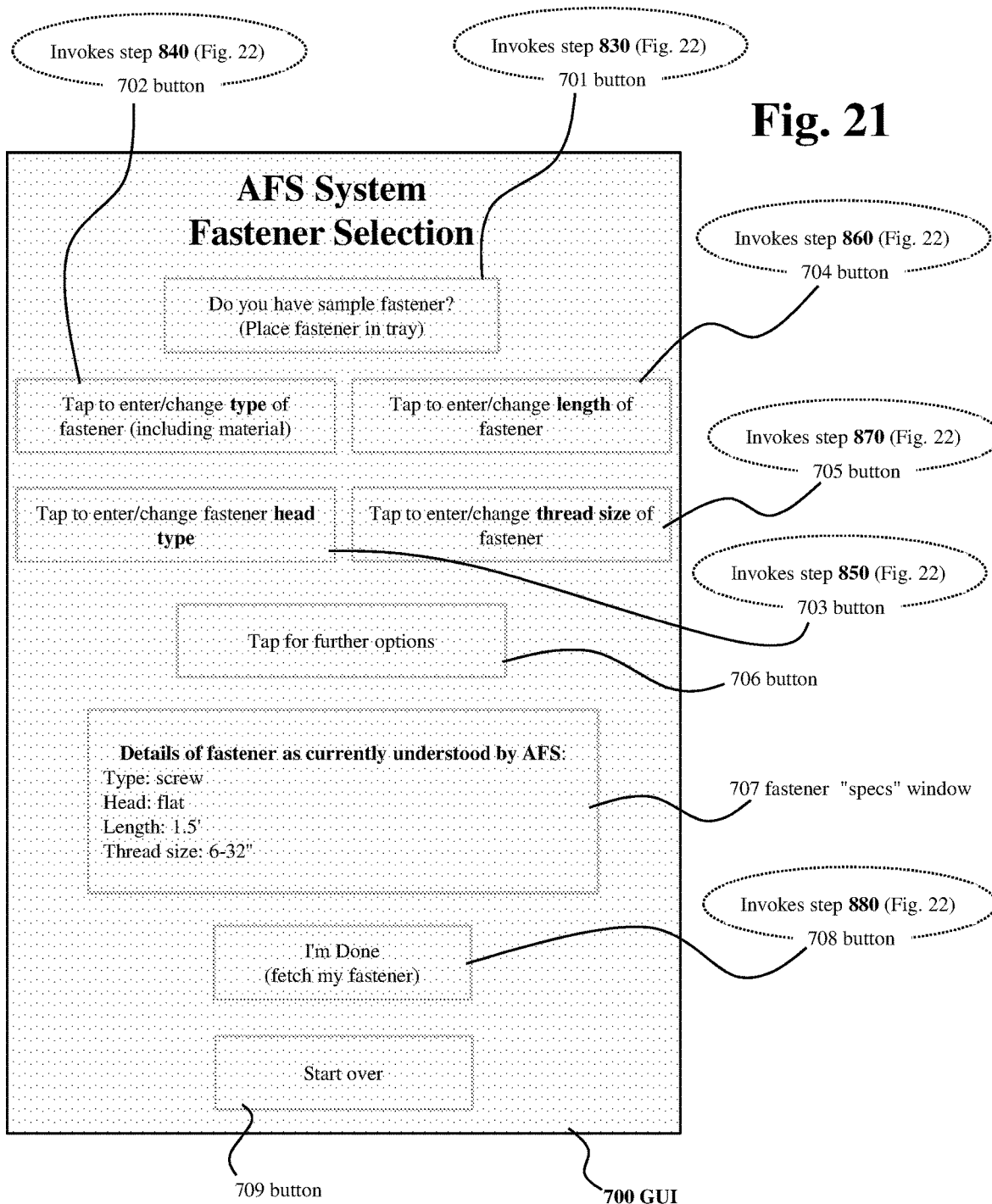
FIG. 21 shows an illustrative GUI reflecting various processing performed by the AFS system, in accordance with at least one embodiment of the disclosure.

FIG. 21 shows an illustrative GUI 700 reflecting various processing performed by the AFS system, in accordance with at least one embodiment of the disclosure. The GUI 700 includes various "buttons" that are generated and displayed for user selection.

Figure 22:
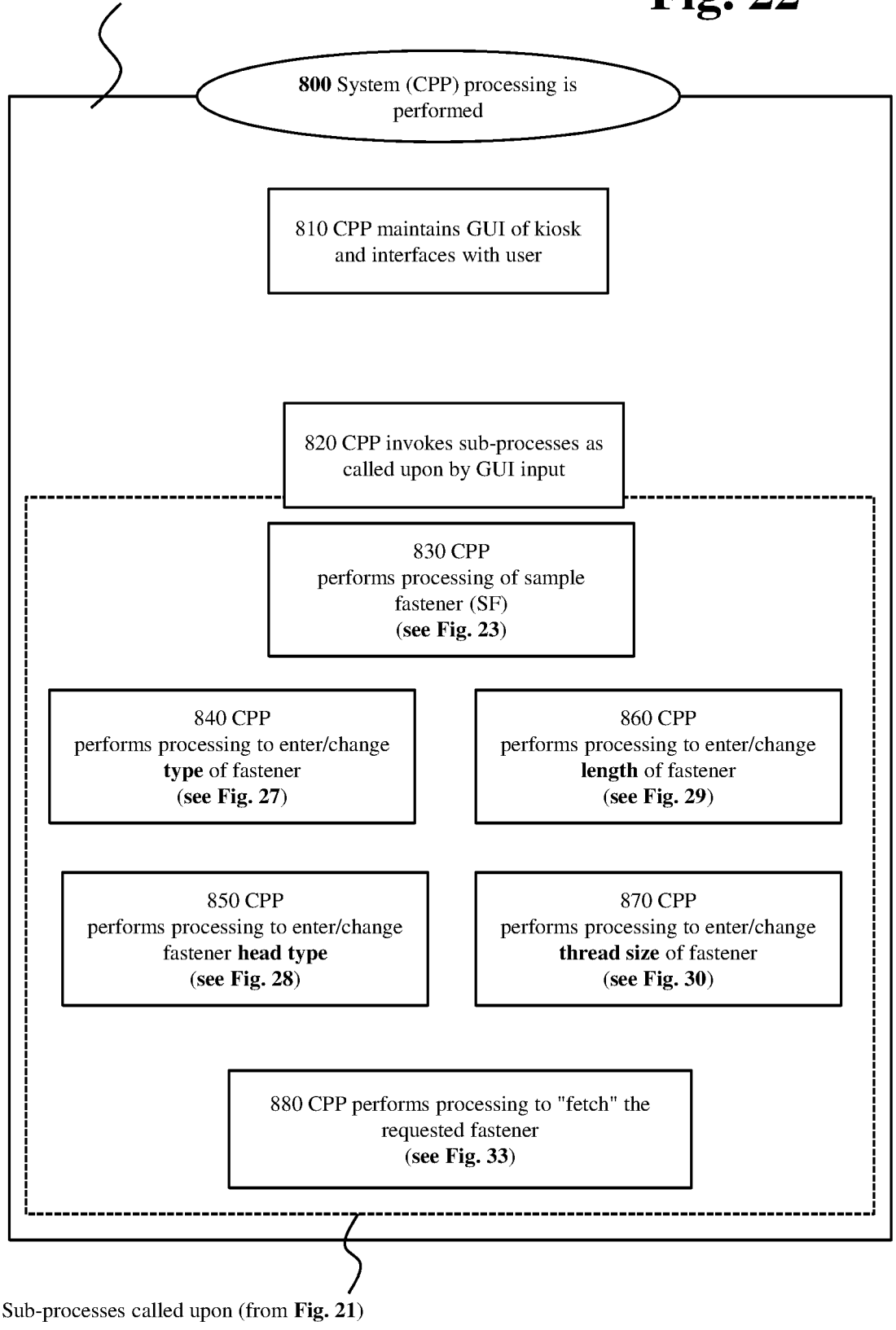
FIG. 22 is a flowchart showing further processing performed by a CPP, in accordance with at least one embodiment of the disclosure.

The GUI 700 includes button 701. Button 701 is provided to input data regarding whether or not a user possesses a sample fastener. Button 701 also includes indicia instructing a user to place a sample fastener in a tray of a kiosk, such as the tray 121 of FIG. 1. Upon a user tapping the button 701, step 830 of FIG. 22 is invoked by the CPP 600, i.e. by the CPP 600 as illustratively shown and depicted in FIGS. 19 and 20.

The GUI 700 includes button 702, in accordance with at least one embodiment of the disclosure. Button 702 is provided to input data regarding if the user wishes to enter or change a particular type of fastener. Upon the user tapping the button 702, step 840 of FIG. 22 is invoked by the CPP 600.

The GUI 700 also includes button 703, in accordance with at least one embodiment of the disclosure. Button 703 is provided to enter or change data regarding a fastener head type of a particular fastener. Upon the user tapping the button 703, step 850 of FIG. 22 is invoked.

The GUI 700 of FIG. 21 also includes button 704, in accordance with at least one embodiment of the disclosure. The button 704 is provided to input data regarding if the user wishes to enter or change a particular length of a desired fastener. Upon the user tapping the button 704, step 860 of FIG. 22 is invoked by the CPP 600.

The GUI 700 of FIG. 21 also includes button 705, in accordance with at least one embodiment of the disclosure. The button 705 is provided to input data regarding if the user wishes to enter or change a thread size of a particular fastener. Upon the user tapping the button 705, step 870 of FIG. 22 is invoked by the CPP 600.

Additionally, the GUI 700 includes button 706, in accordance with at least one embodiment of the disclosure. The button 706 reflects a general button that might be provided in the GUI 700 so is to invoke various additional options. For example, the button 706 might be tapped to also display related parts that are associated with a particular fastener, i.e. a particular sample fastener, for example. Such might be constituted by nuts that are complementary to a particular screw fastener being requested by the user.

Additionally, the GUI 700 includes a fastener "specs" window 707, in accordance with at least one embodiment of the disclosure. The window 707 provides a display of data, generated by the CPP 600, based on the CPP's current "understanding" of the particular fastener desired by the user—based on data input by the system. Accordingly, upon a user placing a sample fastener in the placement tray 121 of FIG. 1, the CPP 600 determines the identity and attributes of such sample fastener in manner as described throughout this disclosure. Various of those attributes may be displayed via the window 707. It is appreciated that it may well not be the case that all attributes understood by the CPP 600 is displayed in the window 707. Rather, it may be desired to simply display sufficient data/information to convey to the user, at a kiosk for example, attributes of a particular fastener as currently understood by the system. In the example of FIG. 21, details of the fastener as currently understood by the system are listed as a screw, with flat head, length of 1.5 inches, with a 6-32 inch thread size. Illustratively, through processing as described below, a user might opt to change the length of the desired fastener. Such operation might be performed via the user tapping the button 704, as noted above. As a result, after such processing, window 707 would be updated to display the updated desired length of the fastener.

Further, FIG. 21 includes button 708, in accordance with at least one embodiment of the disclosure. Button 708 is provided to determine if the user is done with his selection of a particular fastener. Upon the user tapping the button 708, the processing of step 880 of FIG. 22 is invoked.

Lastly, the GUI 700 includes button 709, in accordance with at least one embodiment of the disclosure. Button 709 is provided to provide the user with the option to start over with a particular selection of a fastener.

In accordance with at least one embodiment of the disclosure, the user interface, such as the GUI 700 of FIG. 21, is disposed in a retail environment in which a user or customer may physically retrieve a fastener selected. However, in other embodiments, interface between a processor of the disclosure (e.g. fastener retrieval control portion 630) and a user may be performed over a network—with the user utilizing a suitable user device, such as a cell phone, smartphone, tablet, other smart device, computer, or laptop, for example. A selected item may then be physically made available to the user via pick-up at a particular location or via delivery service, for example. Such a user, interfacing with the fastener retrieval system or apparatus of the disclosure, may remotely input images of a particular fastener desired—so that processing described herein may be used to process the images. Size of a fastener may be calibrated (by a fastener retrieval system) by the user placing an item of known size, e.g. a penny, next to the fastener. The fastener retrieval system interfacing with a user remotely may request the user to weigh the particular fastener, so that the fastener retrieval system may use such data in determining the identity of a requested fastener. Further, even in the scenario in which the user is in a physical retail environment, if a particular fastener is not available in that location—a delivery or pick-up option may be offered for a desired fastener.

Related to the GUI 700 FIG. 21, FIG. 22 is a flowchart showing further processing performed by a CPP 600, in at least one embodiment of the disclosure. As reflected at 800, system (CPP) processing is performed as illustrated. The various processing depicted in FIG. 22 is variously depicted in a linear manner from top to bottom. However, such linearity is not to be interpreted as limiting to the disclosure. Rather, the various processing as depicted in FIG. 22 may be performed in a non-ordered manner as invoked by other processes of the system and/or as invoked by the user interface.

In the processing of step 810, the CPP maintains the GUI of the kiosk and interfaces with the user in ways and manners as described throughout this disclosure. Accordingly, for example, the processing performed in step 810 of FIG. 22 includes the generation of the GUI of FIG. 21, the display of data associated with the GUI of FIG. 21, and the input of data from a user from the GUI of FIG. 21.

In the processing of step 820, the CPP 600 invokes sub-processes as called upon by GUI input that is inputted via the GUI 700 of FIG. 21. Specifically, in step 830 of FIG. 22, the CPP performs processing of a sample fastener (SF). Various further details are described below with reference to FIG. 23.

In the processing of step 840, the CPP performs processing to enter/change a type of fastener. Further details are described below with reference to FIG. 27. In the processing of step 850, the CPP performs processing to enter/change a fastener head type. Further details are described below with reference to FIG. 28. In the processing of step 860, the CPP performs processing to enter/change a length of fastener. Further details are described below with reference to FIG. 29. In the processing of step 870, the CPP performs processing to enter/change a thread size of a particular fastener. Further details are described below with reference to FIG. 30.

Lastly, in the processing of step 880, the CPP performs processing to "fetch" the requested fastener. In other words, the CPP performs processing to retrieve a fastener selection from inventory, perform interim processing such as "bagging" the fastener selection, and deliver the fastener to a suitable pickup point for pickup by the user. Further details are described below with reference to FIG. 33.

Figure 23:
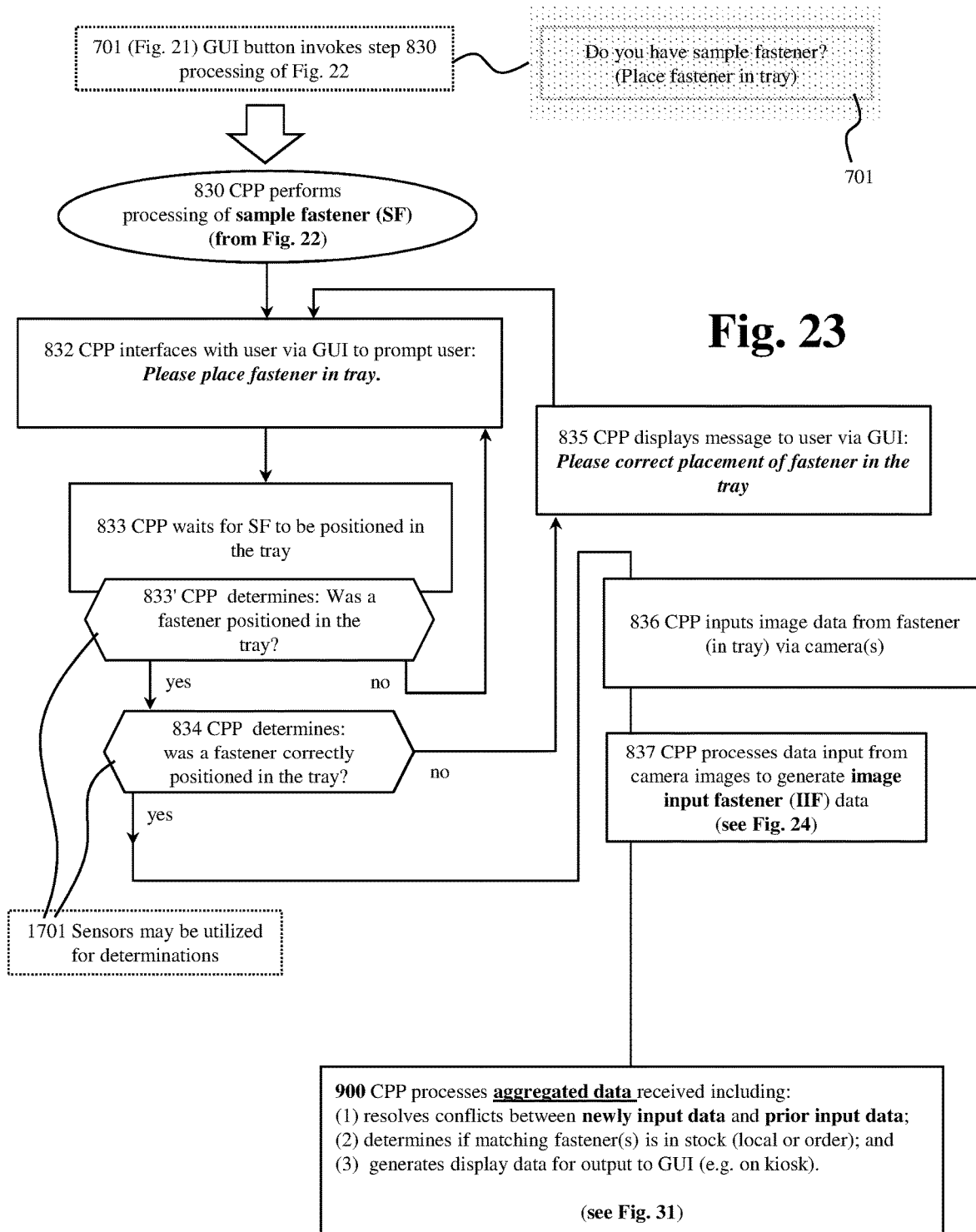
FIG. 23 is a flowchart showing further details of the processing "CPP performs processing of sample fastener" step of FIG. 22, in accordance with at least one embodiment of the disclosure.

FIG. 23 is a flowchart showing further details of the processing "CPP performs processing of sample fastener" step 830 of FIG. 22, in accordance with at least one embodiment of the disclosure. As described above, the processing of step 830 is invoked by a user by tapping button 701 (GUI of FIG. 21)—so as to invoke the processing of step 830 (FIG. 22 and FIG. 23).

As shown in FIG. 23, once the processing of step 830 is invoked, processing passes to step 832. In step 832, the CPP interfaces with the user via GUI to prompt the user to place a sample fastener in a tray of the stationary kiosk, such as the placement tray 121 of FIG. 1. Accordingly, the processing of step 832 may include the generation and display of suitable indicia on the GUI, such as "please place fastener in tray." After the processing of step 832, the process passes to step 833. In step 833, the CPP waits for the sample fastener to be positioned in the tray. Relatedly, in step 833', the CPP determines whether or not a sample fastener was indeed positioned in the tray of the kiosk, for example. The processing of step 833' may include the utilization of a predetermined wait time, such as 30 seconds for example. If a no determination is generated in the processing of step 833', then the process may simply return to step 832.

Alternatively, in the normal course, a yes determination may be secured in the processing of step 833'—indicating that a sample fastener was indeed positioned in the tray by user. Accordingly, the process passes to step 834. In step 834, the CPP determines whether or not the fastener was correctly positioned in the tray. Such determination may be determined using various processing as described herein. For example, suitable sensors may be utilized to determine if a fastener was correctly positioned in the tray, as reflected at 1701 of FIG. 23. If the determination of step 834 is no, i.e. a sample fastener was not correctly positioned in the tray, the processing passes to step 835.

In step 835, the CPP displays a message to the user via the GUI, with content such as please correct placement of fastener in the tray. After the processing of step 835, the process passes again to step 832. Processing is then performed as described above.

If the determination of step 834 is yes, i.e. a sample fastener was correctly positioned in the tray, the processing passes to step 836. In step 836, the CPP inputs image data from the sample fastener, in a tray such as tray 121 of FIG. 1, from one or more cameras. Once the image data is input in step 836, the process passes to step 837. In step 837, the CPP processes data input from the camera images to generate image input fastener data. Such data is characterized herein as "IIF" data, in accordance with at least one embodiment of the disclosure. Various further details of the processing of image input fastener data are described below with reference to FIG. 24. After the processing of step 837, the processing passes to step 900.

In step 900, the CPP processes various aggregated data that has been received by the CPP relating to the particular sample fastener. For example, the processing of aggregated data may include resolving conflicts between newly input data vis-à-vis prior input data; and/or determining if a matching fastener or fasteners are in stock/inventory. Such processing might include both whether a desired fastener is available at the particular physical kiosk (with which the user is interfacing) and/or whether a desired fastener is available at a different geographical location or available by order, for example. Further, such processing might include the generation of display data for output to a GUI of the kiosk. Such processing relates, in particular, to the fastener specs window 707 as shown in FIG. 21. Various further details of the processing of step 900 are described below with reference to FIG. 31.

Figure 24:
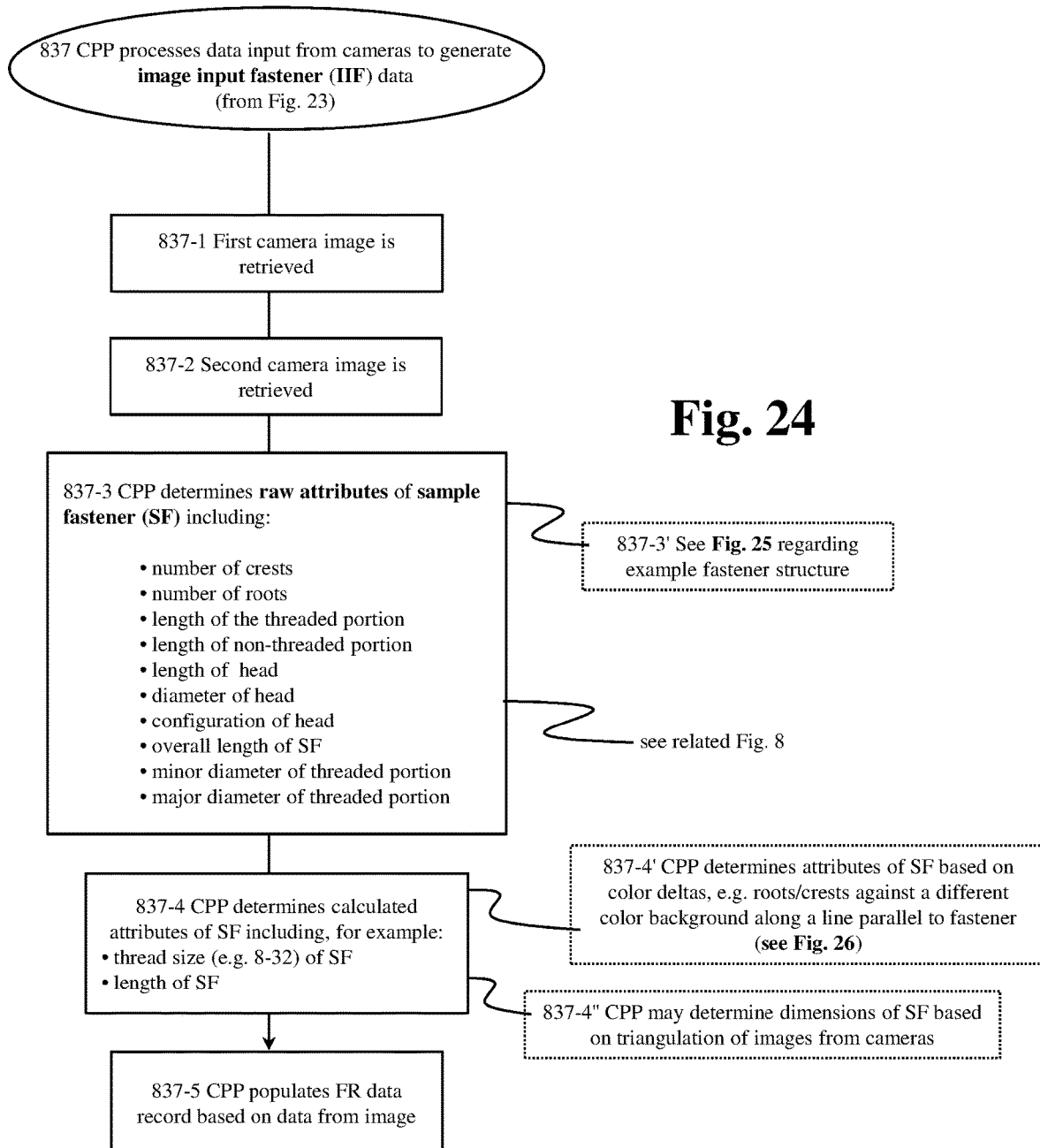
FIG. 24 is a flowchart showing in further detail the processing "CPP processes data input from cameras to generate image input fastener (IIF) data" step of FIG. 23, in accordance with at least one embodiment of the disclosure.

FIG. 24 is a flowchart showing in further detail the processing "CPP processes data input from cameras to generate image input fastener (IIF) data" step 837 of FIG. 23, in accordance with at least one embodiment of the disclosure. Such processing is initiated at step 837 and passes to step 837-1. In step 837-1, the first camera image is retrieved. For example, a first camera image might be retrieved from camera assembly 130A as shown in FIG. 1 in the kiosk of FIG. 1. Then, in step 837-2, a second camera image is retrieved. For example, the second camera image might be retrieved from a camera assembly 130B as shown in FIG. 1. Then, the processing passes to step 837-3.

In step 837-3 the CPP determines raw attributes of the particular sample fastener (SF) including, for example number of crests of the SF, number of roots, length of the threaded portion, length of non-threaded portion, length of head, diameter of head, configuration of head, overall length of SF, minor diameter of threaded portion of SF, and/or major diameter of threaded portion of the SF, for example. Various associated processing (associated with the processing of step 837-3) is performed as reflected at 837-3' in FIG. 24. In particular, further details of such processing are described below with reference to FIG. 25 regarding example fastener structure. Additionally, FIG. 8 and the related disclosure herein describes various attributes of a fastener that might be utilized in the processing of step 837-3.

After the processing of step 837-3, the process passes to step 837-4. In step 837-4, the CPP determines what is characterized as calculated attributes of a sample fastener including, for example, thread size of the sample fastener and length of the sample fastener, in particular. As reflected at 837-4', the CPP may determine attributes of a sample fastener based on color deltas, e.g. roots/crests against a different color background along a line parallel to fastener, in accordance with at least one embodiment of the disclosure. Further details are described below with reference to FIG. 26. As reflected at 837-4" the CPP may determine dimensions of a SF based on triangulation of images from multiple cameras. Further details are described below with reference to FIG. 26.

Figure 25:
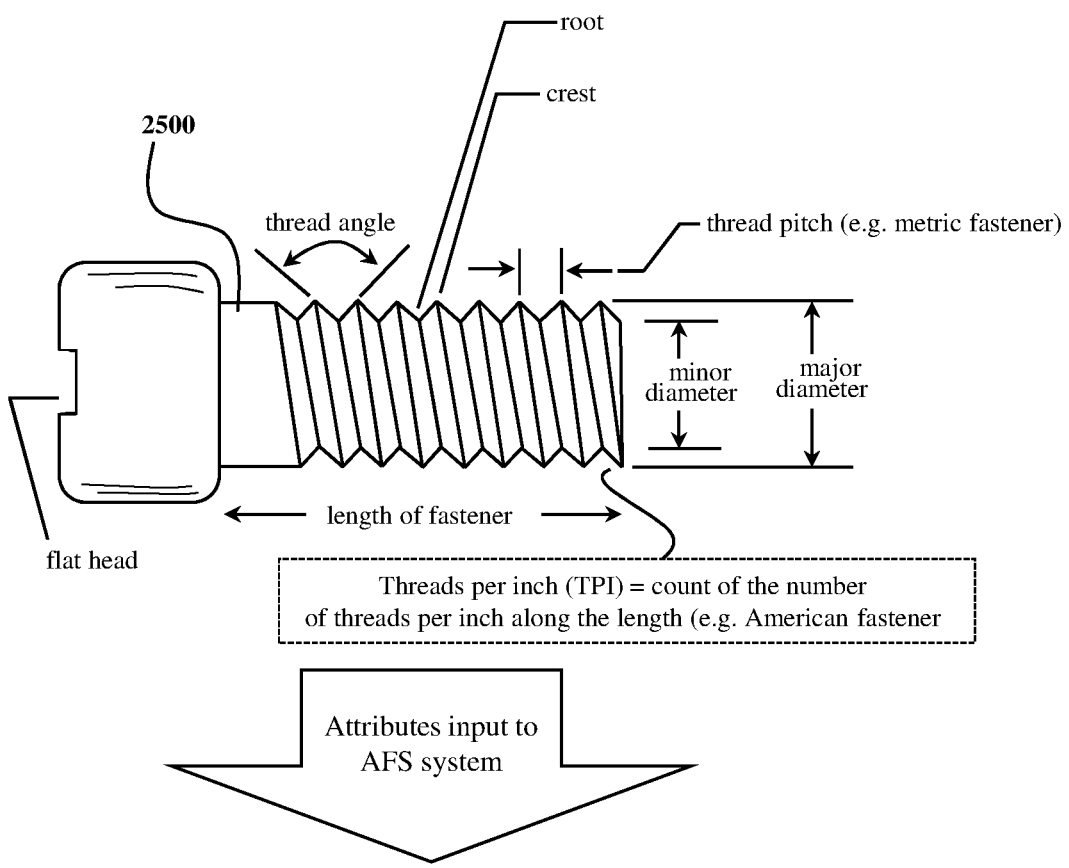
FIG. 25 is a diagram showing example fastener structure, which may be utilized in conjunction with the various processing, in accordance with at least one embodiment of the disclosure.
Figure 26:
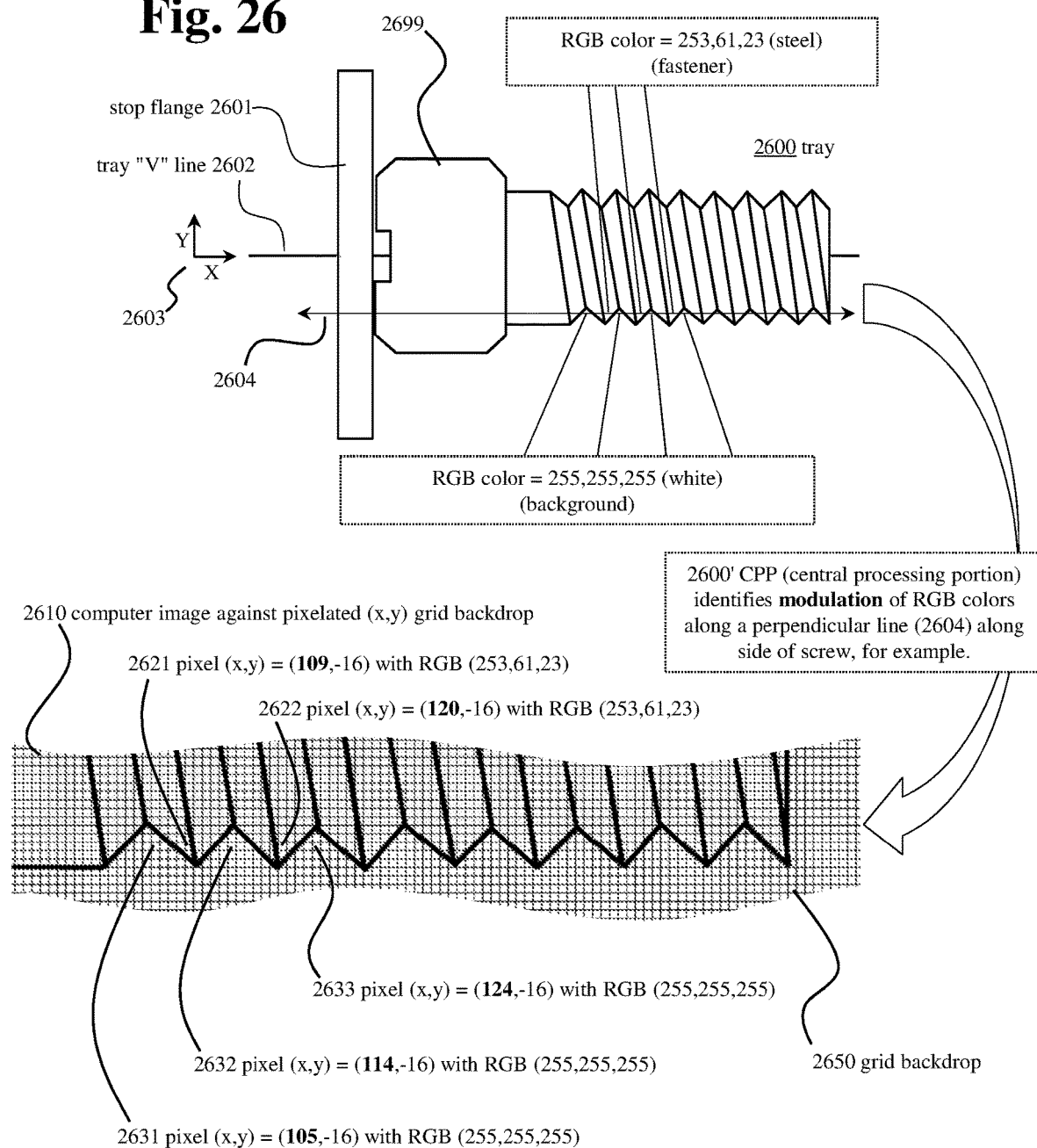
FIG. 26 is a diagram showing features of processing of attributes of a sample fastener, in accordance with at least one embodiment of the disclosure.

FIG. 25 is a diagram showing example fastener structure, which may be utilized in conjunction with the various processing, in accordance with at least one embodiment of the disclosure. Illustratively, FIG. 25 shows a fastener 2500. The illustrative fastener 2500, in this example, includes a flat head. Other attributes of the example fastener 2500 includes thread angle, a "root" attribute of the threads, a "crest" attribute of the threads, and length of the fastener. It is appreciated that the AFS system of the disclosure may utilize various attributes relating to length, including length of a threaded portion of a particular fastener, length of a shank portion, and/or overall length of the total fastener. A further attribute that may be utilized by the AFS system of the disclosure includes thread pitch, in particular as such relates to a metric fastener. Further attributes include minor diameter and major diameter. A further attribute that may be utilized for the AFS system of the disclosure is a threads per inch (TPI) attribute. Such indicates a count of the number of threads per inch along a length of the fastener. FIG. 26 is a diagram showing features of processing of attributes of a sample fastener, in accordance with at least one embodiment of the disclosure. As referenced above, FIG. 26 shows features of the CPP 600 determining attributes of a sample fastener based on such characteristics of color deltas—as such processing is performed in step 837-4 of FIG. 24.

In the example of FIG. 26, the fastener 2699 has been placed in a suitable tray, such as placement tray 121 as shown in the kiosk of FIG. 1 or tray 411 as shown in the kiosk of FIG. 9, for example. In particular, the image shown in FIG. 26 may be obtained from a top camera, i.e. disposed over the sample fastener in a placement tray, in a kiosk. In a manner as described above, the sample fastener 2699 is placed on a tray "V-line" 2602 (such as that formed by a V-channel 7021V of FIG. 7). Such placement and "seating" of the fastener 2699 on the V-line 2602 provides stable positioning of the sample fastener 2699 and prevents rolling of the sample fastener 2699. To further assist in positioning of the sample fastener 2699, the fastener 2699 may be abutted against a stop flange 2601 (akin to the fastener stop flange 127 shown in FIG. 1, for example). In the processing as illustrated in FIG. 26, an X-Y coordinate system might be utilized. However, any suitable coordinate system might be utilized.

In accord with one aspect of processing of the invention, in accordance with at least one embodiment of the disclosure, (as reflected at 2600' of FIG. 26) the CPP identifies modulation of colors along a perpendicular line 2604 along one side of a fastener, for example. Illustratively, the fastener might be the screw is depicted in FIG. 26. Identification of modulation of colors might utilize the red green blue (RGB) color scheme or some other suitable color scheme. For example, processing of the invention might include the CPP starting at a central line extending along and in parallel to line 2602. The CPP may progressively analyze color modulation in sequence (in a line) progressing outward from the line 2602. At that point, the CPP will identify that modulation of the colors satisfies particulars criteria. In the example of FIG. 26, satisfaction of this criteria is obtained by the CPP progressing outward (in analyzing parallel lines) until the CPP reaches line 2604. For example, the criteria might be constituted by a sufficient differential in modulation. Further, the criteria might be dependent upon the CPP recognizing a sufficient quantity of pixels of which the CPP knows is the color of the placement tray. In the example of FIG. 26, any pixel with RGB color=255,255,255 (white) is known to be the tray, i.e. background. On the other hand, any pixel with RGB color=253,61,23 may be identified to be steel, for example. In one example, the CPP may search for a line (such as line 2601) that exhibits the properties of having a substantially equal number of pixels that the CPP associates with the background, i.e. tray, as compared to a number of pixels associated with another RGB color. In the processing, the another RGB color is understood by the CPP to constitute the sample fastener—in this case the fastener 2699.

The processing illustrated in FIG. 26 may be performed utilizing a computer image of the sample fastener superimposed against a pixelated (x,y) grid backdrop 2650 (as reflected at 2610 of FIG. 26). It is appreciated that the described determination of modulation of colors along a line, be such line perpendicular to the tray "V" line 2602 or not perpendicular, may be performed in various ways. For example, only intermittent pixels of predetermined periodicity might be analyzed until the CPP (moving outward from the center) attains a line 2604 that satisfies predetermined criteria. Such processing allows the CPP to work in a more efficient and effective manner.

In the example of FIG. 26, various pixels are shown including coordinates of such pixels and RGB value determined (by the CPP) of such pixels. The pixels include 2621, 2622, 2631, 2632, 2633. In the example, pixels 2621 and 2622 represent pixels identified by the CPP as associated with the sample fastener. On the other hand, pixels 2631, 2632, 2633 represent pixels identified and known by the CPP is associated with the tray color. Accordingly, the grid backdrop 2650, as superimposed by an image of the sample fastener upon the tray of a kiosk, may be analyzed in various ways. In particular, the RGB color that is determined to belong to the sample fastener may be compared against a database of colors (and candidate fasteners associated with such colors) to identify the sample fastener. For example, if the RGB color of a sample fastener is determined by the CPP to be 253, 61, 23 then the CPP then compares that particular RGB color with sample fasteners in memory, i.e. in one or more data records associated with the CPP. If a sufficient match is determined, then the CPP concludes that attribute of the sample fastener has been identified. It is appreciated that various thresholds might be utilized such as a match— determined to be found—if the variance between the RGB components is +/–10, for example. Such thresholds and accepted variance may of course be changed and/or modified based on particulars of implementation of the invention.

Further details of determining a match between a sample fastener and a candidate fastener are described below with reference to FIG. 32.

Figure 27:
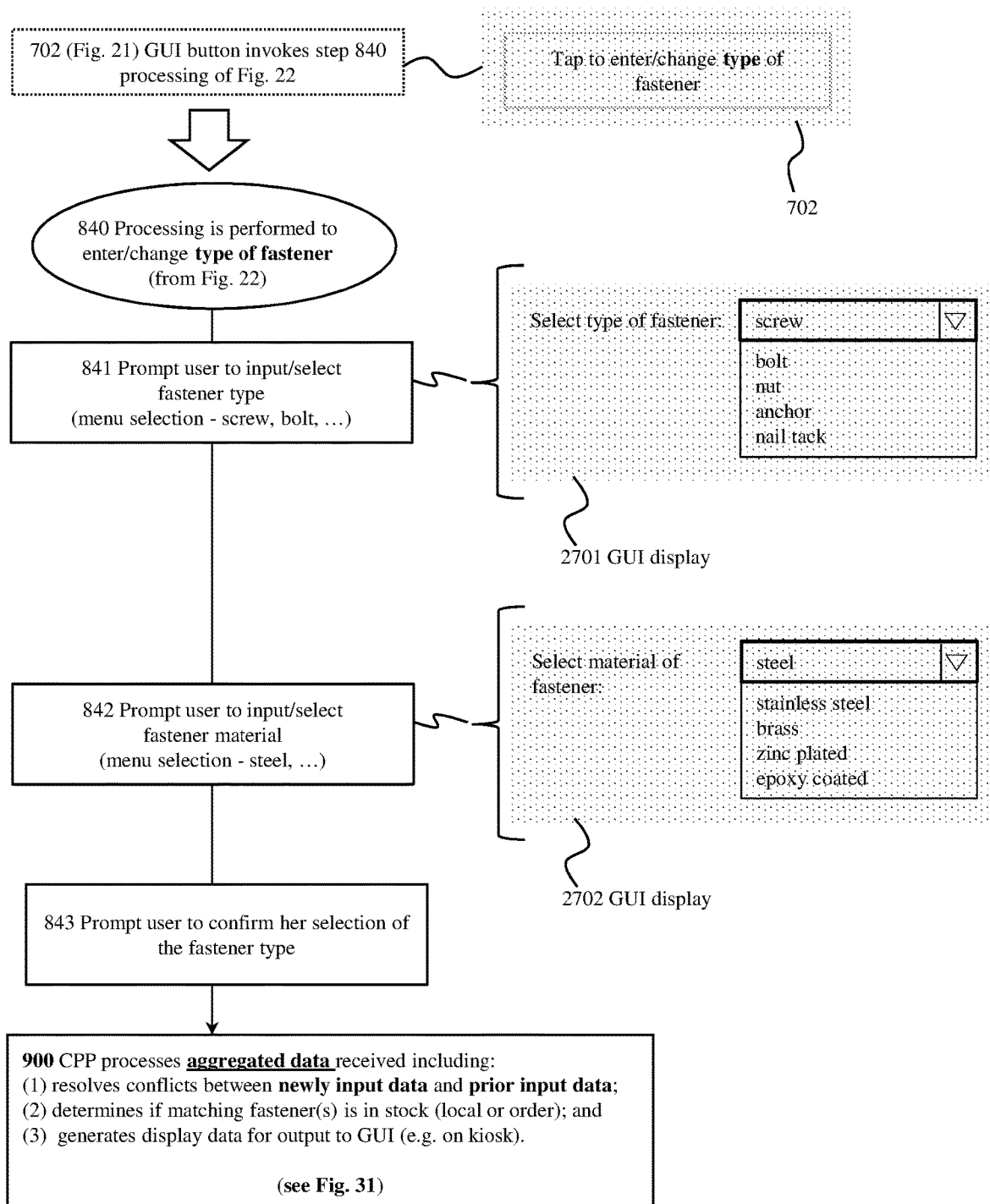
FIG. 27 is a flowchart showing further details of "processing is performed to enter/change type of fastener" step of FIG. 22, in accordance with at least one embodiment of the disclosure.

FIG. 27 is a flowchart showing further details of "processing is performed to enter/change type of fastener" step 840 of FIG. 22, in accordance with at least one embodiment of the disclosure. As described above, the processing of step 840 is invoked by a user by tapping button 702 (GUI of FIG. 21)—so as to invoke the processing of step 840 (FIG. 22 and FIG. 23).

The processing of FIG. 27 starts in step 840 and passes to step 841. In step 841, the CPP prompts the user to input or select a fastener type. Such prompt of step 841 might be in the form of the CPP generating a GUI display 2701. The GUI display 2701 may provide for a menu selection for a type of fastener. As shown, the menu selection might include such options as screw, bolt, nut, anchor, nail tack, for example. Upon the user making a selection via the GUI display 2701, the processing may pass to step 842.

In step 842, the user selects the desired material of the fastener via GUI display 2702. For example, the user may select from various options available including steel, stainless steel, brass, zinc plated, or epoxy coated. The particular material that is generated in the GUI (and available) may be interrelated to the particular type of fastener selected in step 841, i.e. limited to those materials that are available for the particular type of fastener.

The process then passes to step 843 in which the user confirms her selections. Then, the processing passes to step 900. The processing of step 900 is akin to the processing described above with reference to FIG. 23. Additionally, the processing of step 900 is described in further detail below with reference to FIG. 31.

Figure 28:
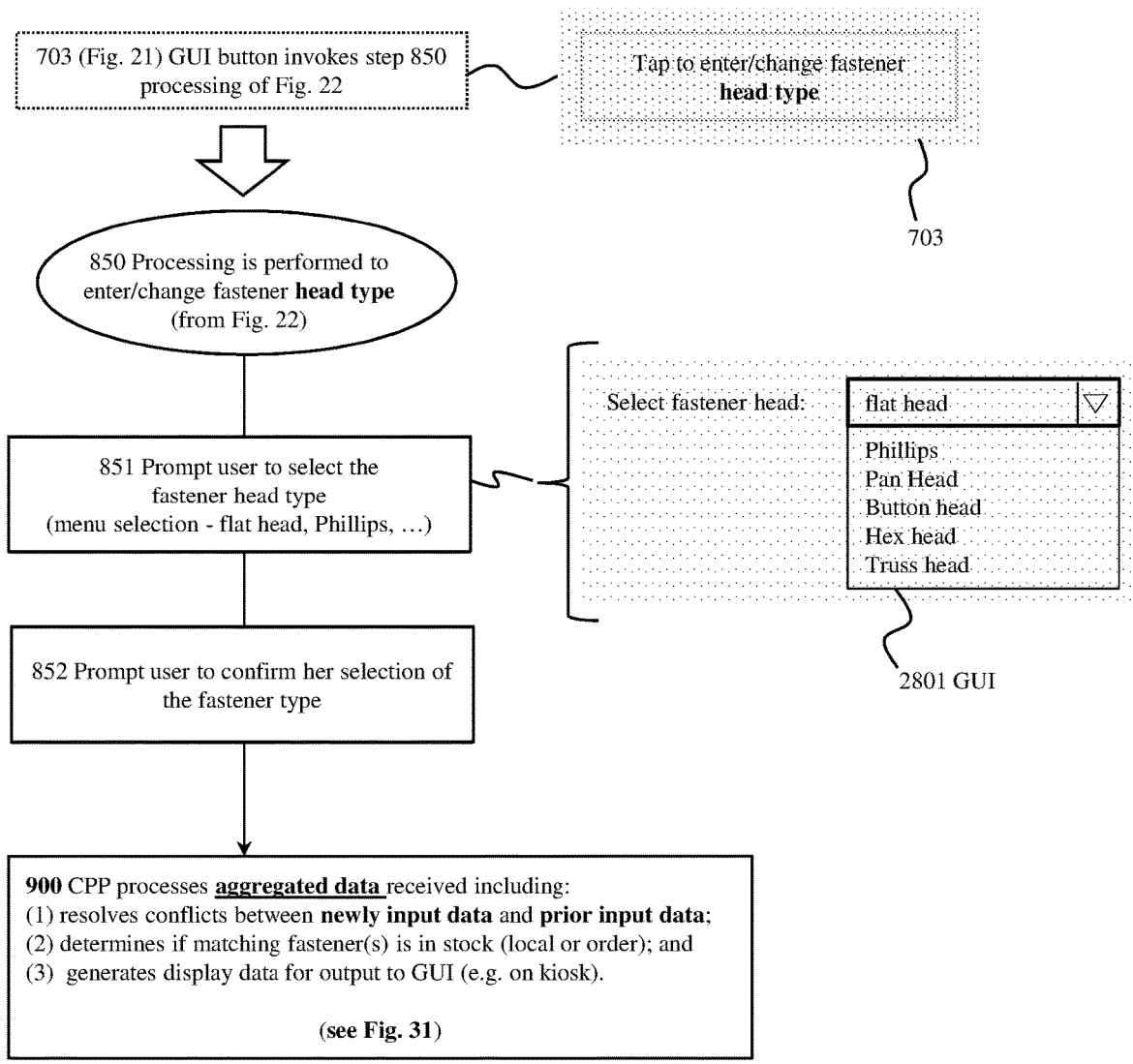
FIG. 28 is a flowchart showing further details of "processing is performed to enter/change fastener head type" step of FIG. 22, in accordance with at least one embodiment of the disclosure.

FIG. 28 is a flowchart showing further details of "processing is performed to enter/change fastener head type" step 850 of FIG. 22, in accordance with at least one embodiment of the disclosure. As described above, the processing of step 850 is invoked by a user tapping button 703 (GUI of FIG. 21)—so as to invoke the processing of step 850 (FIG. 22 and FIG. 23).

The processing of FIG. 28 starts in step 850 and passes to step 851. In step 851, the CPP prompts the user to input or select a head type. Such prompt of step 841 might be in the form of the CPP generating a GUI display 2801. The GUI display 2801 may provide for a menu selection for a type of head. As shown, the menu selection might include such options as Phillips, Pan Head, Button head, Hex head, Truss head, for example. Upon the user making a selection via the GUI display 2801, the processing may pass to step 842 in which the user confirms her selection. Then, the processing passes to step 900. The processing of step 900 is akin to the processing described above with reference to FIG. 23. Additionally, the processing of step 900 is described in further detail below with reference to FIG. 31.

Figure 29:
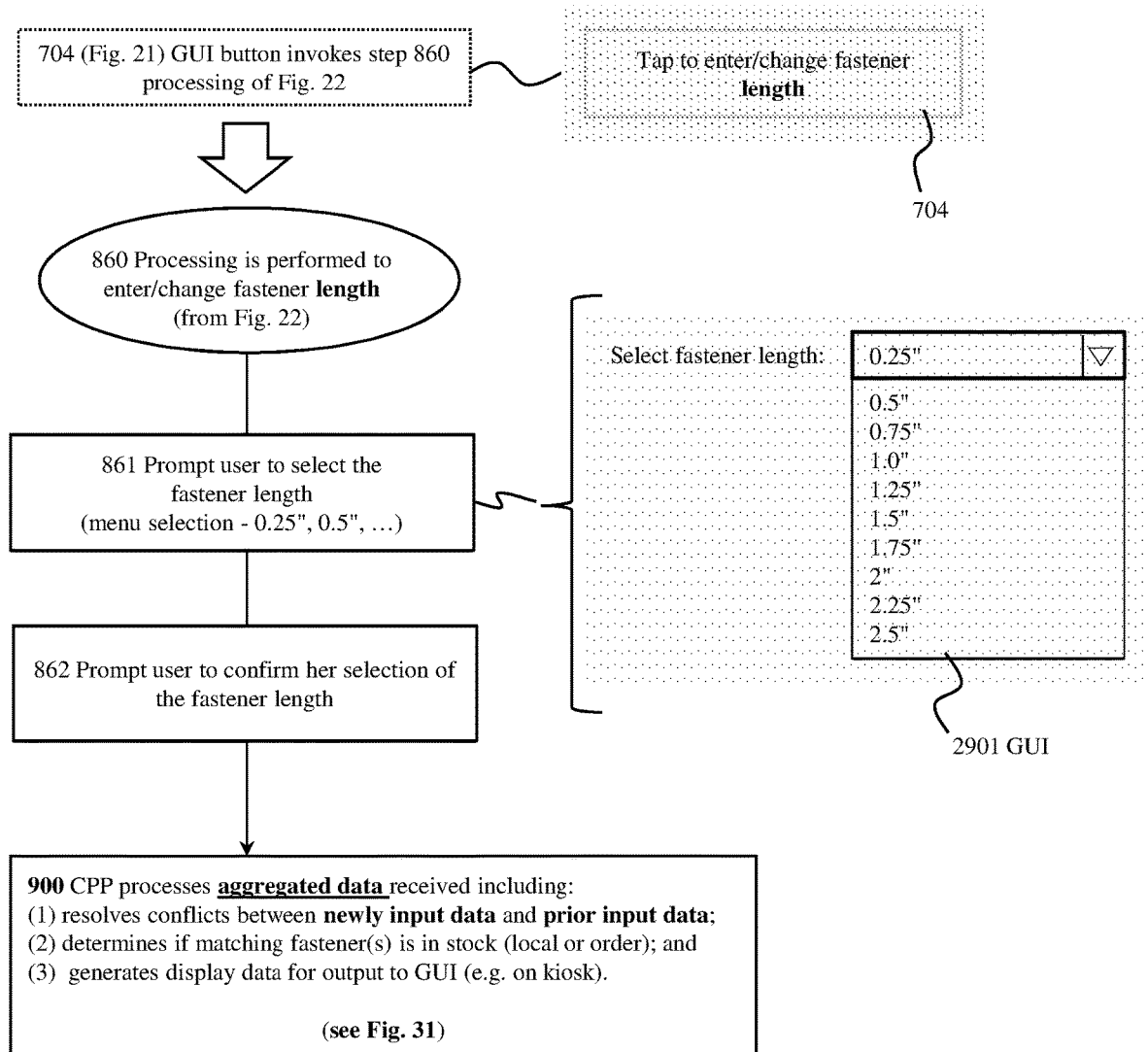
FIG. 29 is a flowchart showing further details of "processing is performed to enter/change fastener length" step of FIG. 22, in accordance with at least one embodiment of the disclosure.

FIG. 29 is a flowchart showing further details of "processing is performed to enter/change fastener length" step 860 of FIG. 22, in accordance with at least one embodiment of the disclosure. As described above, the processing of step 860 is invoked by a user by tapping button 703 (GUI of FIG. 21)—so as to invoke the processing of step 860 (FIG. 22 and FIG. 23).

The processing of FIG. 29 starts in step 860 and passes to step 861. In step 861, the CPP prompts the user to input or select a length of fastener. Such prompt of step 851 might be in the form of the CPP generating a GUI display 2901. The GUI display 2901 may provide for a menu selection for a particular size of fastener. As shown, the menu selection might include such options as varying sizes, for example. Upon the user making a selection via the GUI display 2901, the processing may pass to step 862 in which the user confirms his or her selection. Then, the processing passes to step 900. The processing of step 900 is akin to the processing described above with reference to FIG. 23. Additionally, the processing of step 900 is described in further detail below with reference to FIG. 31.

Figure 30:
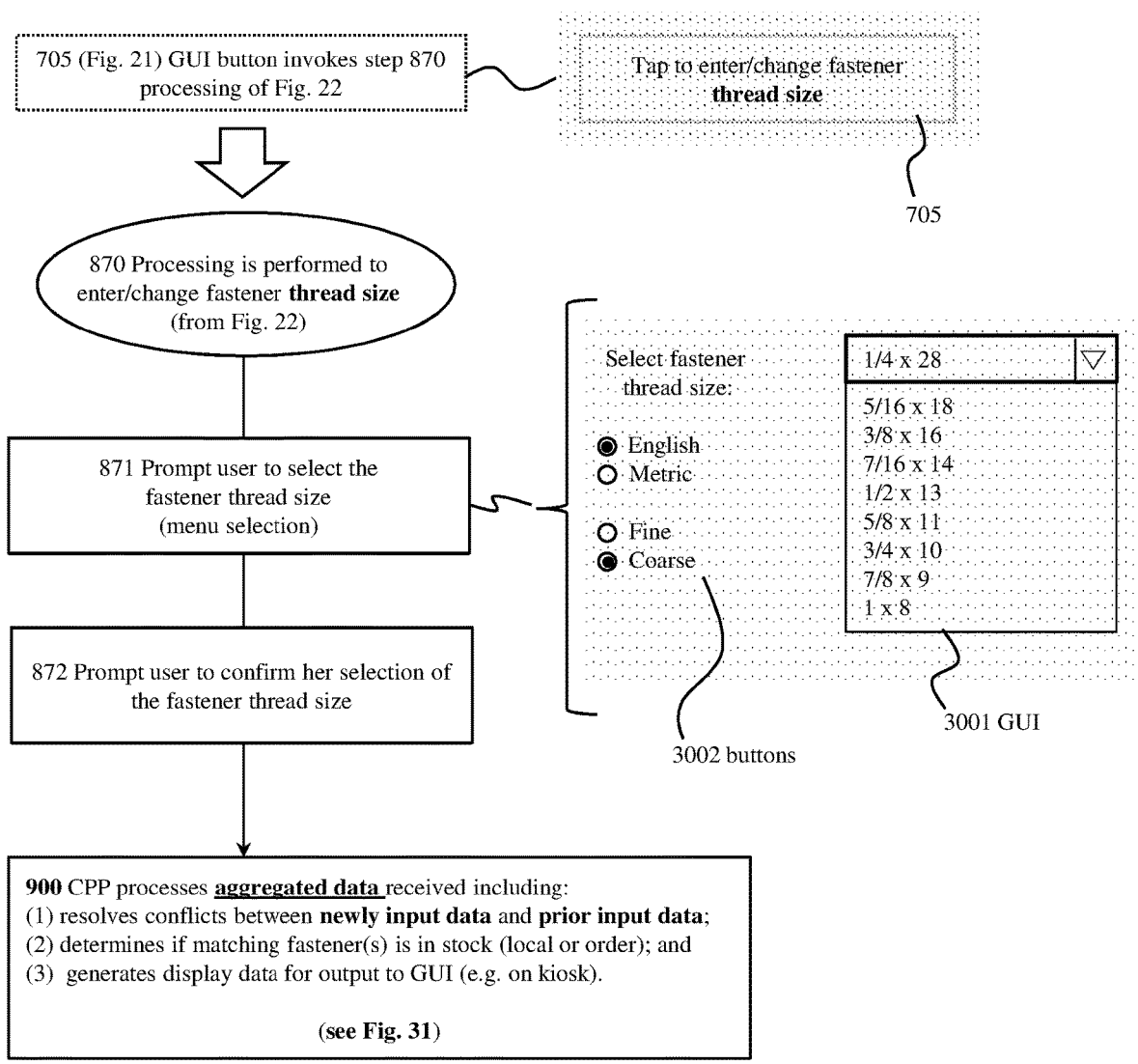
FIG. 30 is a flowchart showing further details of "processing is performed to enter/change fastener thread size" step of FIG. 22, in accordance with at least one embodiment of the disclosure.

FIG. 30 is a flowchart showing further details of "processing is performed to enter/change fastener thread size" step 870 of FIG. 22, in accordance with at least one embodiment of the disclosure. As described above, the processing of step 870 is invoked by a user by tapping button 705 (GUI of FIG. 21)—so as to invoke the processing of step 870 (FIG. 22 and FIG. 23).

The processing of FIG. 30 starts in step 870 and passes to step 871. In step 861, the CPP prompts the user to input or select a thread size for a desired fastener. Such prompt of step 871 might be in the form of the CPP generating a GUI display 3001. The GUI display 3001 may provide for a menu selection for a particular thread size of fastener. As shown, the menu selection might include options of varying thread size, for example. Upon the user making a selection via the GUI display 3001, the processing passes to step 872 in which the user confirms his or her selection. Then, the processing passes to step 900. The processing of step 900 is akin to the processing described above with reference to FIG. 23. Additionally, the processing of step 900 is described in further detail below with reference to FIG. 31.

As shown, the GUI 3001 may include radio buttons 3002 so as to constrain size options that are presented to the user. For example, as shown in FIG. 30, by tapping the "English" selection and tapping the "coarse" selection only sizes conforming to such selections (and available in inventory) might be presented to the user. Accordingly, the buttons 3002 may be desirable in providing more limited, constrained and workable options to the user.

Figure 31:
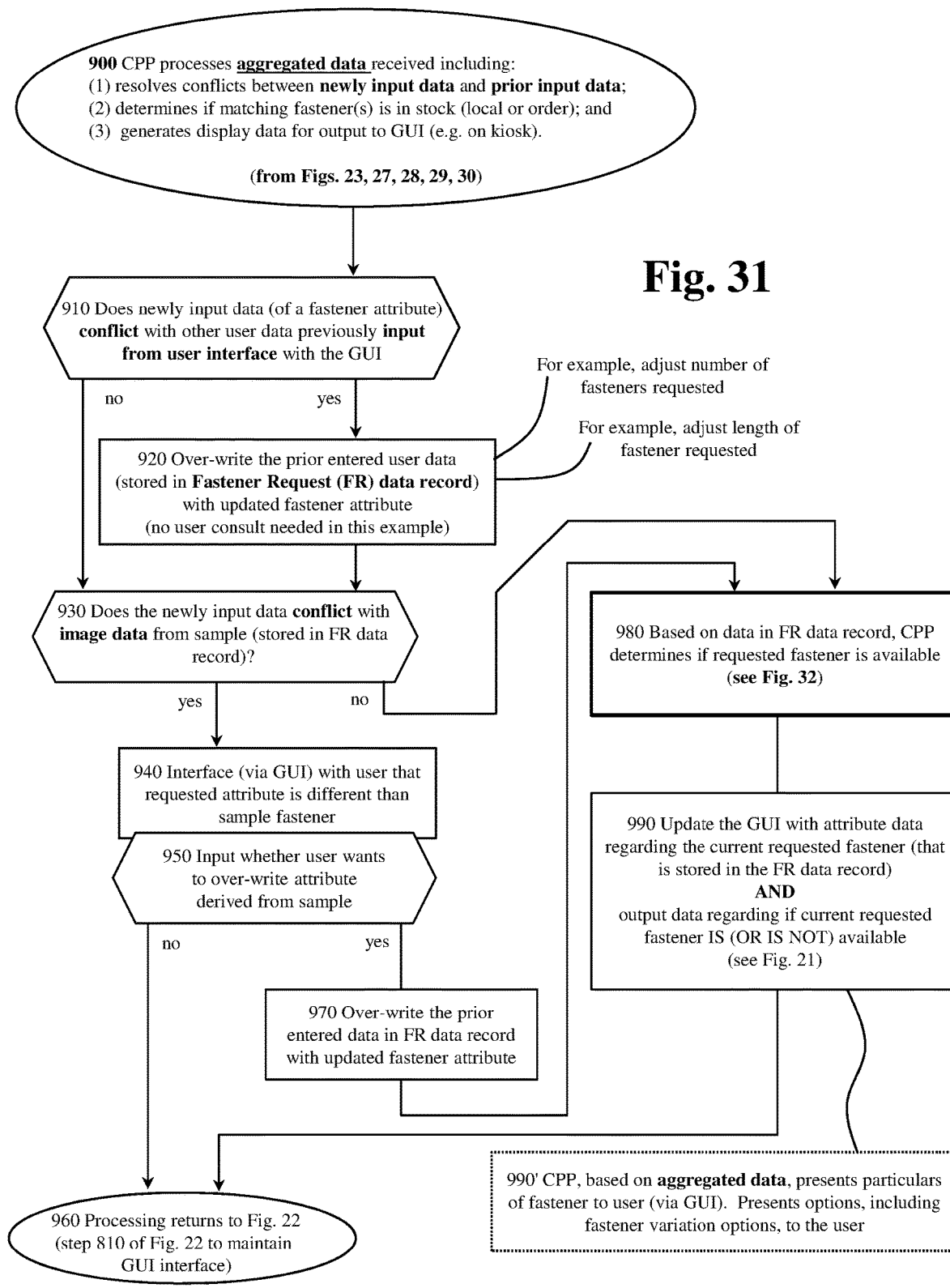
FIG. 31 is a flowchart showing further details of the "CPP processes aggregated data received" step in accordance with at least one embodiment of the disclosure.

FIG. 31 is a flowchart showing further details of the "CPP processes aggregated data received" step 900 in accordance with at least one embodiment of the disclosure. As described above, the processing of step 900 may be invoked through processing of FIG. 23, 27, 28, 29, or 30, for example.

As described above, in step 900, the CPP processes various aggregated data that has been received by the CPP relating to the particular sample fastener. For example, the processing of aggregated data may include resolving conflicts between newly input data or prior input data; and/or determining if a matching fastener or fasteners are in stock/inventory. Such processing might include both whether a desired fastener is available at the particular physical kiosk (with which the user is interfacing) and/or whether a desired fastener is available at a different geographical location or available by order, for example. Further, such processing might include the generation of display data for output to a GUI of an AFS kiosk. Such processing relates, in particular, to the fastener "specs" window 707 as shown in FIG. 21, in accordance with at least one embodiment of the disclosure.

As shown, the process of FIG. 31 starts in step 900 and passes to step 910. In step 910, the CPP performs a determination of whether or not newly input data (of a fastener attribute) conflicts with other data previously input from the user, e.g. through interface of the user with the GUI. As noted above, such GUI may be constituted by a suitable GUI on a side of an AFS station, such as that shown in FIG. 1 or in FIG. 9. If the determination of step 910 is yes, then processing passes from step 910 to step 920. In step 920, the CPP "over-writes" the prior entered user data with the updated fastener attribute. For example, the prior entered user data may be stored in a "fastener request (FR) data record". In other words, the decision processing of step 910 reflects a situation in which newly input data (be that data from prior GUI interface with the user or be that data from a fastener sample) conflicts with prior input data. For example, the processing of step 920 might relate to an adjustment to the number of fasteners requested by a user. For example, the processing of step 920 might relate to an adjustment in the length of fastener requested by the user. Accordingly, in the processing of step 920, newly input data will automatically take priority over prior input data, if the prior data was input via user interface, i.e. based upon the reasoning that the prior data was input from the user. After step 920, the process passes to step 930.

If a "no" determination was determined in step 910—i.e. the newly input data (of a fastener attribute) does not conflict with other user data previously input from GUI interface with the user—the processing passes directly to step 930.

To explain further, the processing of step 910, 920 and 930 demonstrates illustrative functionality in which prior input data (versus new data) that is input from GUI user interface is over-written more readily than prior input data that is input from a sample fastener. In general, such functionality demonstrates that different treatment in priority may be afforded based on type of data and the manner in which data was input—for example, regarding attributes of a particular sample fastener. Such priority processing might be performed based upon the premise that a user may not be aware that she is over-writing an attribute that was input from the very sample provided by the user. Accordingly, the processing of steps 930 and 940 provide methodology with which the AFS system may confirm a user's understanding—that she wants to over-write an observed attribute of the fastener sample.

With further reference to FIG. 31, in step 930, the CPP performs a determination of does the newly input data conflict with image data from a sample (stored in FR data record)? If no in step 930, then no conflict has been identified in the "newly input data". Accordingly, the process passes from step 930 to step 980.

On the other hand, if yes in step 930, i.e. the newly input data does indeed conflict with image data (or other data) from a sample foreign associate, then the processing passes to step 940. In step 940, the CPP interfaces with the user to advise the user that the particular requested attribute (newly input) is inconsistent with or different vis-à-vis the sample fastener provided by the user. Relatedly, in step 950, the CPP inputs whether the user wants to over-write the attribute previously derived from the sample fastener. If the user does not want to over-write, then the processing passes to step 960. In step 960, the process returns to FIG. 22 and presentation of the high-level GUI interface. Accordingly, a "no" determination in step 950 reflects a scenario in which newly input data will not be utilized to perform searching, by the AFS system, for a candidate fastener in inventory—and processing for such newly input data regarding a sample fastener is terminated.

In step 950, if the user does want to over-write the prior attribute that was derived from the sample—then the processing passes to step 970. In step 970, the CPP over-writes the prior entered data in the particular FR data record with the updated fastener attribute. After step 970, the process passes to step 980.

In step 980, based on data in the fastener request data record, the CPP determines if the requested fastener is available in inventory. Further details are described below with reference to FIG. 32. Then, the process passes to step 990.

In step 990, the system updates the GUI (for example the "spec" window 707 of FIG. 21) with the current attribute data regarding the current requested fastener—as such data is stored in the fastener request data record. Additionally in step 990, the system may output data via GUI, to the user, regarding if the current requested fastener is or is not available. Accordingly, as reflected at 990' of FIG. 31, the CPP, based on aggregated data, presents particulars of fastener to user (via GUI). Additionally, in accordance with at least one embodiment of the disclosure, functionality may be provided in which the CPP interfaces with the user, based on attributes of a desired fastener vis-à-vis attributes of candidate fasteners in inventory, and presents options, including fastener variation options, to the user.

Figure 32:
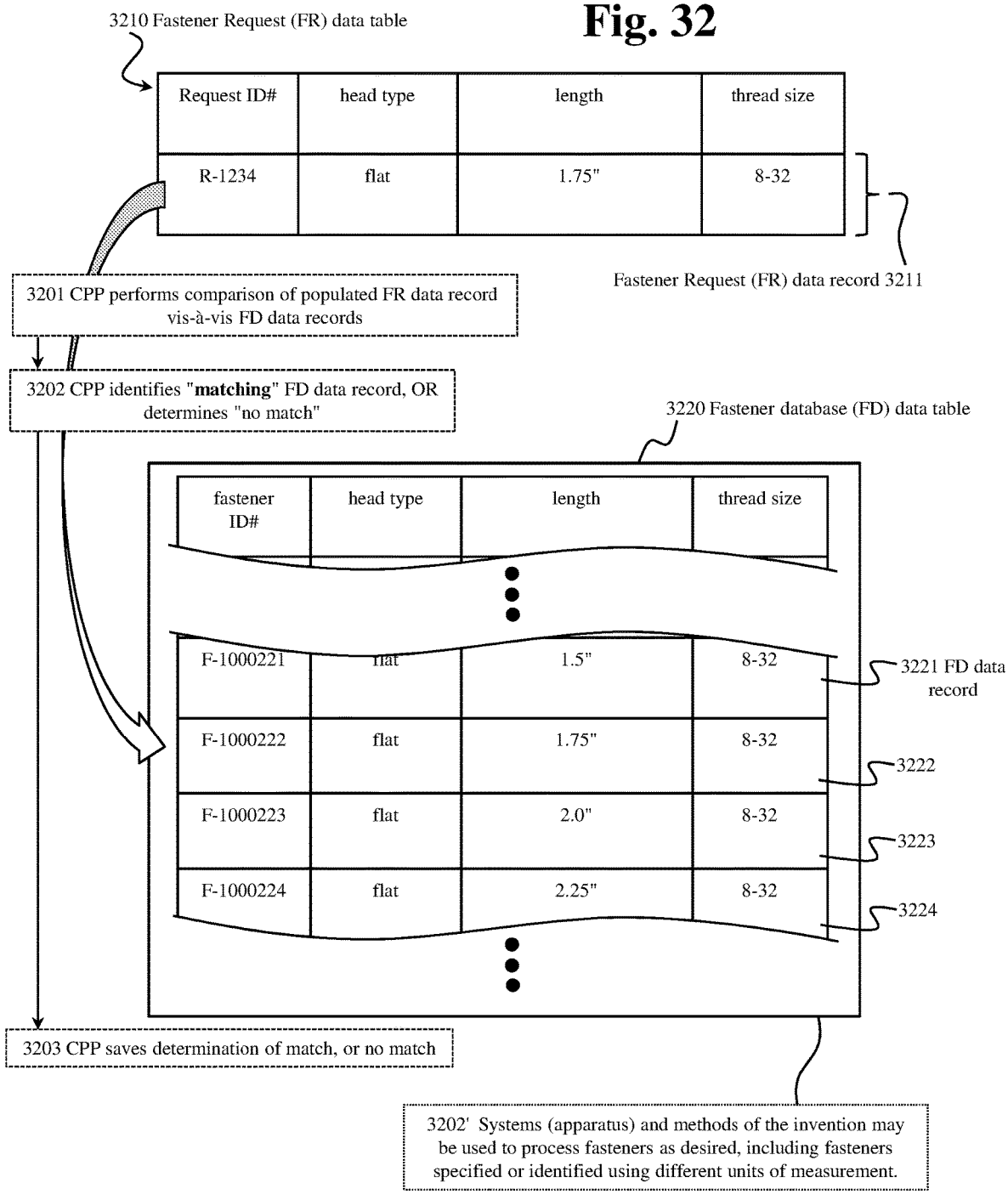
FIG. 32 is a flowchart diagram showing a search process in accordance with at least one embodiment of the disclosure.

FIG. 32 is a flowchart diagram showing a search process in accordance with at least one embodiment of the disclosure. In particular, FIG. 32 shows a fastener request (FR) data table 3210. The FR data table 3210 includes an FR data record 3211. The FR data record 3211 includes various data regarding a fastener request. The particular attributes (head type, length, and thread size) shown in the FR data record 3211 are for purposes of illustration. It is appreciated that additional and/or varied attributes of a fastener may be stored in the FR data record 3211. The FR data record 3211 may be identified utilizing a request ID number or other suitable "anchor" data field. In the example of FIG. 32, the request ID number is R-1234.

Additionally, the flowchart diagram of FIG. 32 includes a fastener database (FDA) data table 3220. The FD data table 3220 is constituted by a plurality of FD data records 3221, 3222, 3223, 3224. A particular FD data record is, in accordance with at least one embodiment, provided for each fastener in inventory. Accordingly, a particular FD data record is constituted by a fastener ID number—in association with data representing specific attributes of that specific fastener. In the example FD data record 3221, data representing specific attributes of fastener ID number-1000221 includes head type, length, and thread size. It is appreciated that the particular attributes associated with a particular fastener (i.e. a particular fastener ID number) is of course dependent on the nature of the fastener.

Accordingly, in the processing depicted in FIG. 32, at step 3201, the CPP performs comparison of a populated FR data record vis-à-vis the FD data records. In other words, the CPP performs a comparison of attributes of the desired fastener vis-à-vis attributes of the various fasteners in inventory in the particular AFS kiosk, for example. As a result, at step 3202, the CPP identifies a matching FD data record, or alternatively, determines that there is no match. Thereafter, the processing passes to step 3203. In step 3203, the CPP saves the determination of match, or saves the determination of no match. It is appreciated that numerous variations of the processing of FIG. 32 are within the purview of the invention. For example, processing may be provided in the situation of a partial match between the FR data record 3211 and the various FD data records reflecting fasteners in inventory. In such partial match processing, it is appreciated that some attributes of a fastener may possess a higher priority and higher weight, for example, vis-à-vis other attributes of a particular fastener.

As reflected at 3202' (in FIG. 32) and otherwise described herein, the systems and methods of the disclosure may be used to process any of a wide variety of fasteners, as may be desired. The systems and methods of the disclosure may be used to process fasteners using any desired system of measurement, including any U.S. system including "Standard" and "Customary", the metric system of measurement, and/or any other system of measurement, as may be desired.

Figure 33:
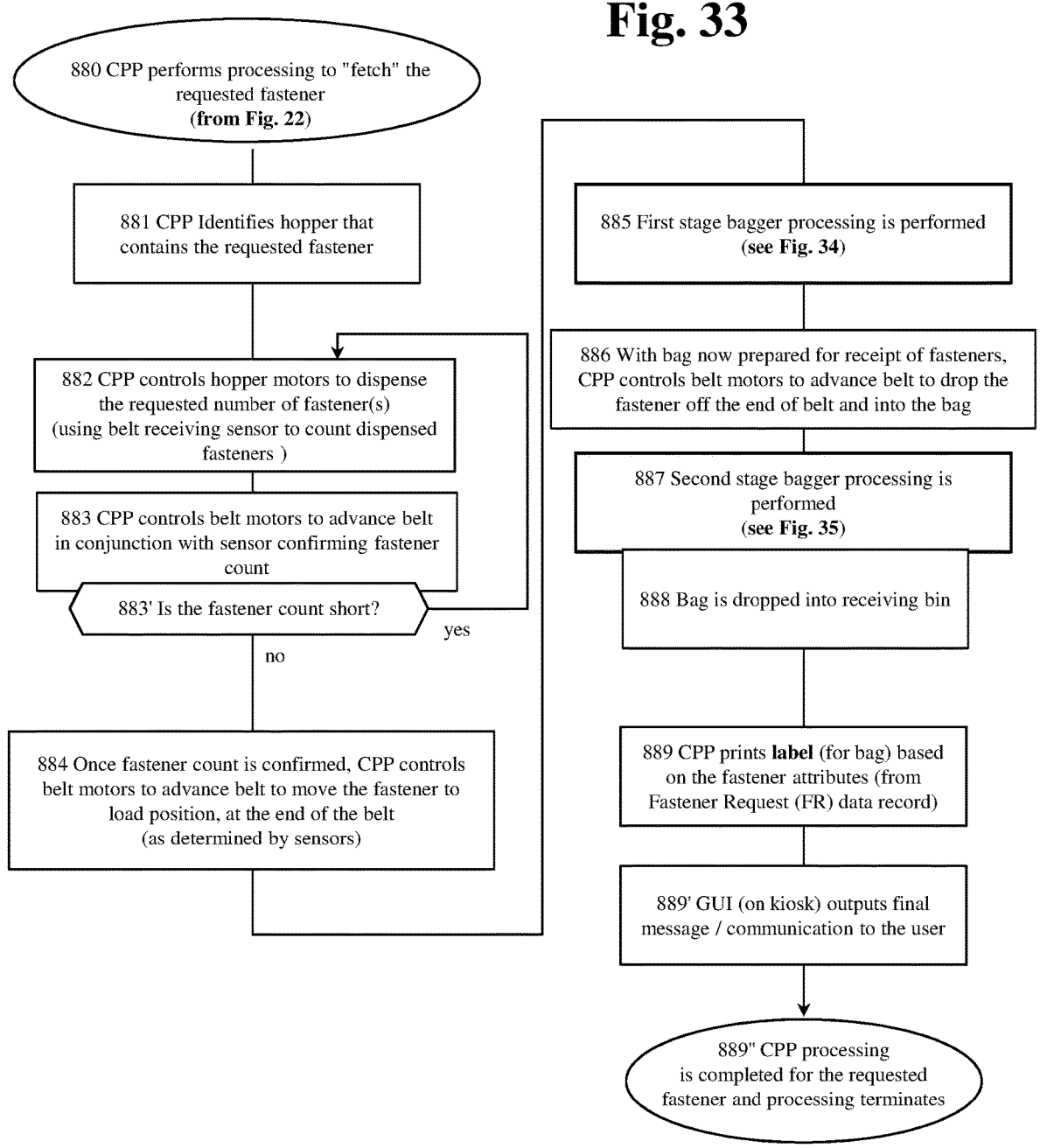
FIG. 33 is a flowchart showing details of the processing "CPP performs processing to fetch the requested fastener" step of FIG. 22, in accordance with at least one embodiment of the disclosure.

FIG. 33 is a flowchart showing details of the processing "CPP performs processing to fetch the requested fastener" step 880 of FIG. 22, in accordance with at least one embodiment of the disclosure. As shown, processing starts at step 880 and passes to step 881. In step 881, the CPP identifies the hopper (or other inventory storage mechanism) that contains the requested fastener. Then, in step 882, the CPP controls the hopper motors to dispense the requested number of fasteners. This functionality may be performed using what might be characterized as a belt receiving sensor that counts fasteners that are dispensed from the particular hopper unto a transport belt, for example. For example, this processing may be performed in the context of the arrangement shown in FIG. 10. After the processing of step 882, the process passes to step 883. In step 883, the CPP controls the belt motors (for example, the belt drive 537, 538 of FIG. 11) to advance the belt in conjunction with one or more sensors confirming a count of fasteners disposed upon the belt. Then, in step 883' the CPP determines whether or not the fastener account is short. If yes, the processing returns to step 882 and additional fasteners are dispensed from the hopper unto the belt or other delivery apparatus.

On the other hand, it may be determined in step 883' that the fastener count is not short. As a result, the process passes to step 884. In step 884, once fastener count is confirmed, the CPP controls the belt motors to advance the belt to move the fasteners to a load position, at the end of the belt (as determined by one or more sensors). Then, in step 885, first stage bagger processing is performed. Further details are described below with reference to FIG. 34. Then, the process passes to step 886.

In step 886, with a suitable bag now prepared for receipt of fasteners, the CPP controls the belt motors to advance the belt to drop the one or more fasteners off the end of the belt and into the opened bag. Then, the processing passes to step 887. In step 887, second stage bagger processing is performed. Further details are described below with reference to FIG. 35. Then, in step 888, the bag (now holding the requested fasteners) is dropped into a receiving bin. For example, such receiving bin might be constituted by the retrieval tray assembly 140 as shown in FIG. 1. With further reference to FIG. 33, after step 888, the processing passes to step 889. In step 889, in accord with this example of the disclosure, the CPP prints a label, for the plastic bag, based on the fastener attributes. The fastener attributes may be retrieved by the CPP from the fastener request data record, for example. Then, in step 889', the GUI (on the kiosk) outputs a final message/communication to the user. For example, the communication might include text indicating that the customer may take his or her purchase to the front or that the customer may continue to search for additional fasteners. After the processing of step 889', the processing passes to step 889".

As is shown in FIG. 33, step 889" reflects that processing is completed for the requested fastener and accordingly processing terminates.

Figure 34:
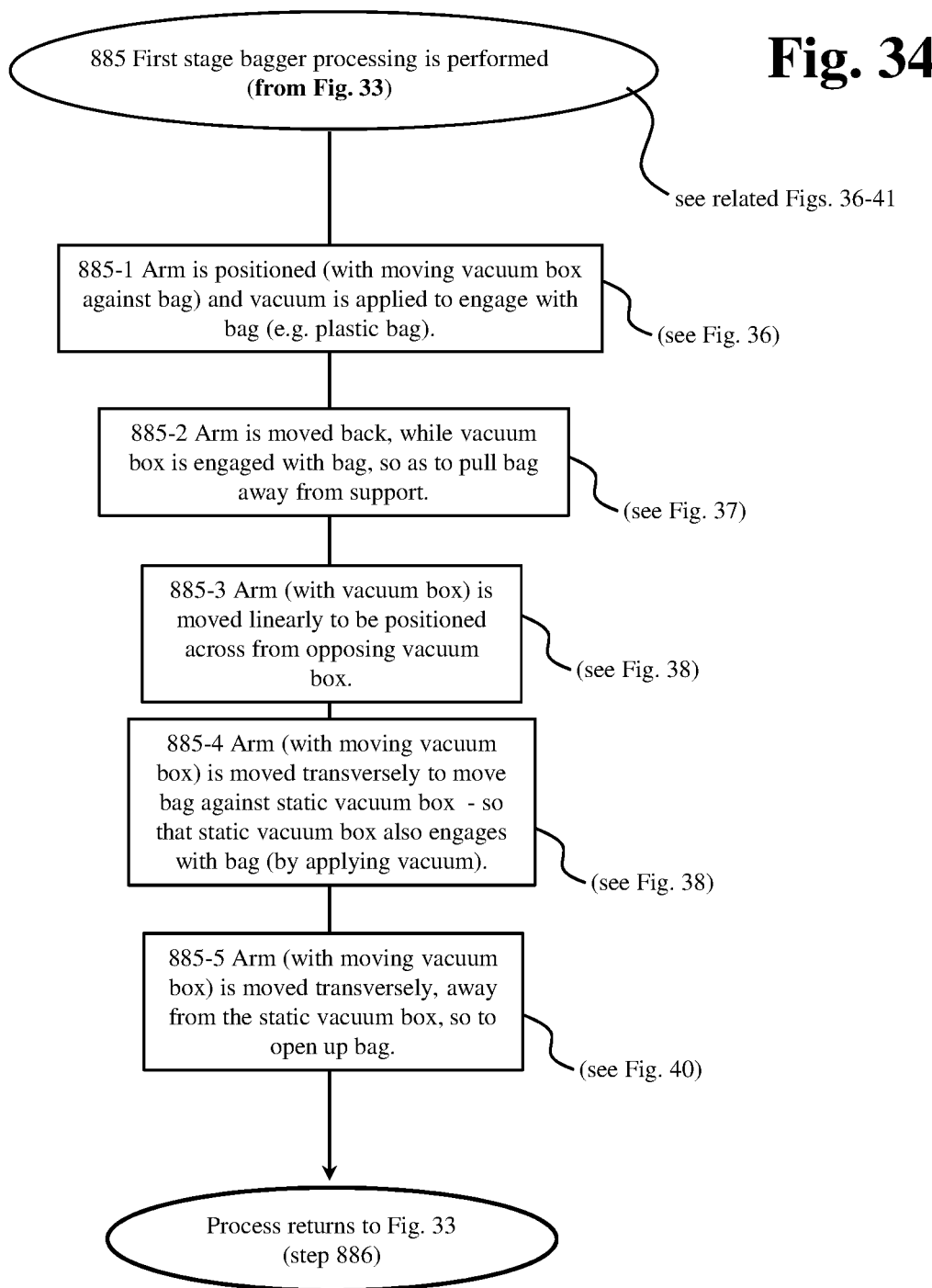
FIG. 34 is a flowchart showing further details of "first stage bagger processing is performed" step of FIG. 33, in accordance with at least one embodiment of the disclosure.

FIG. 34 is a flowchart showing further details of "first stage bagger processing is performed" step 885 of FIG. 33, in accordance with at least one embodiment of the disclosure. Details are described below with reference to related FIGS. 36-40.

Figure 35:
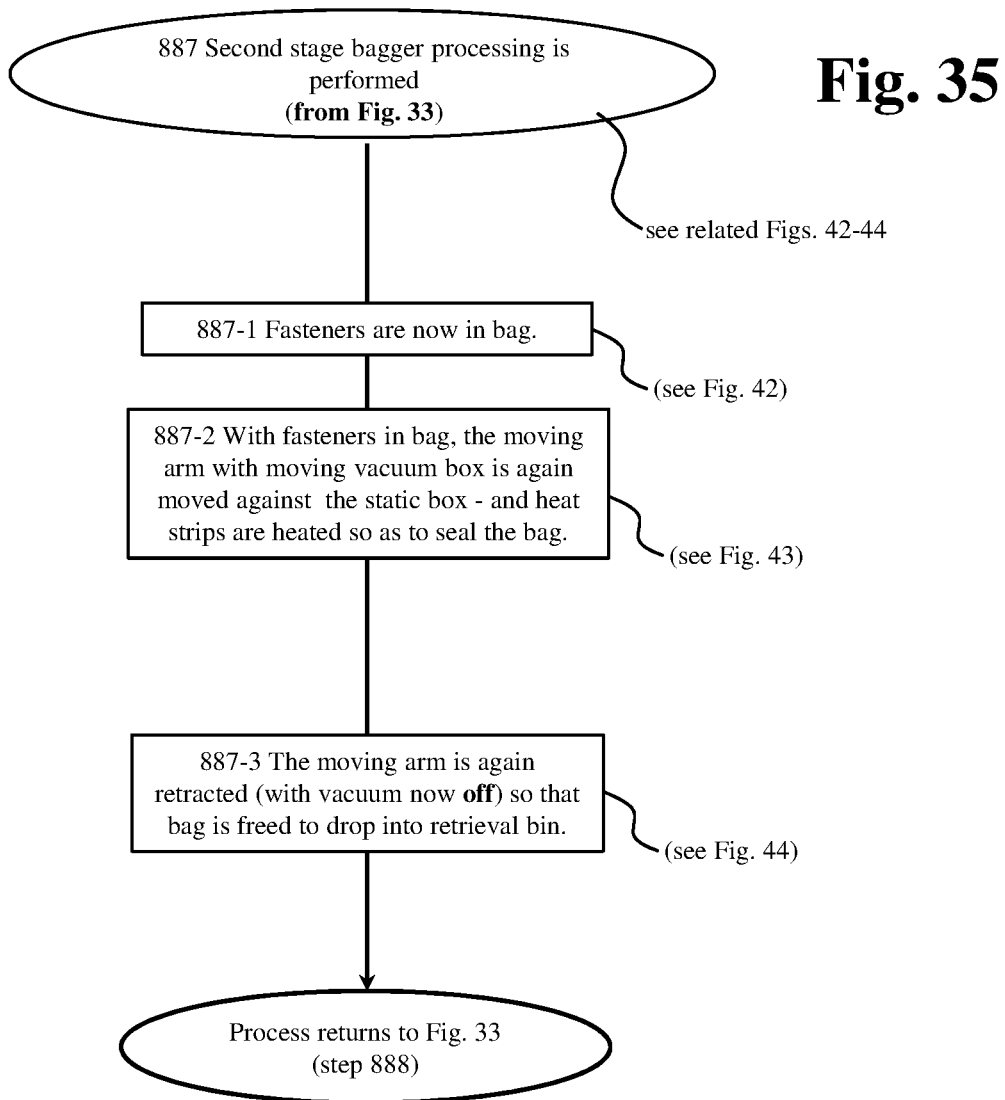
FIG. 35 is a flowchart showing further details of "second stage bagger processing is performed" step of FIG. 33, in accordance with at least one embodiment of the disclosure.

FIG. 35 is a flowchart showing further details of "second stage bagger processing is performed" step 887 of FIG. 33, in accordance with at least one embodiment of the disclosure. Details are described below with reference to related FIGS. 42-44.

Figure 36:
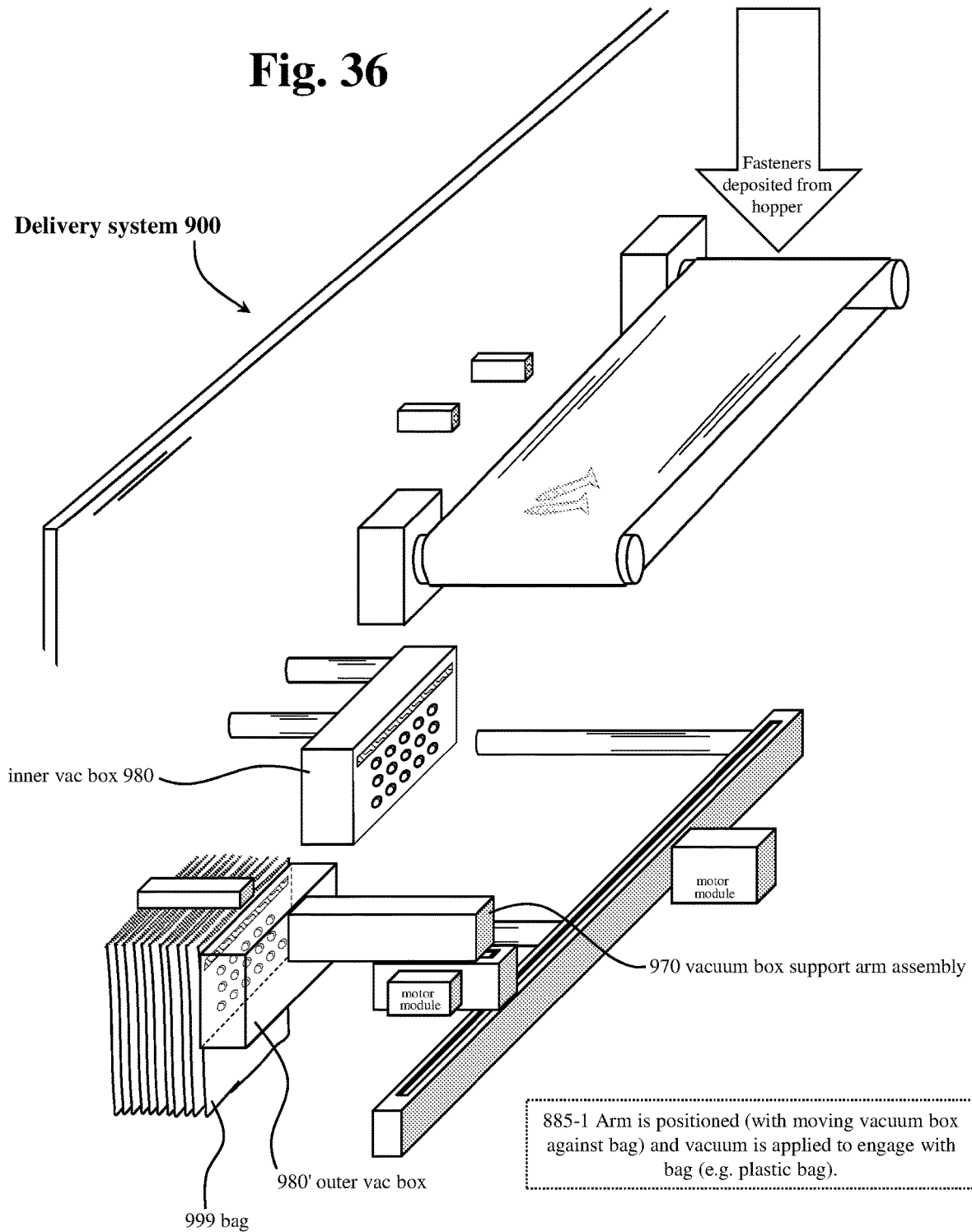
FIG. 36 is a diagram showing aspects of processing in a delivery system, in accordance with at least one embodiment of the disclosure

FIG. 36 is a diagram showing aspects of processing in a delivery system, in accordance with at least one embodiment of the disclosure. In particular, FIG. 36 illustrates a processing step of FIG. 34.

Figure 37:
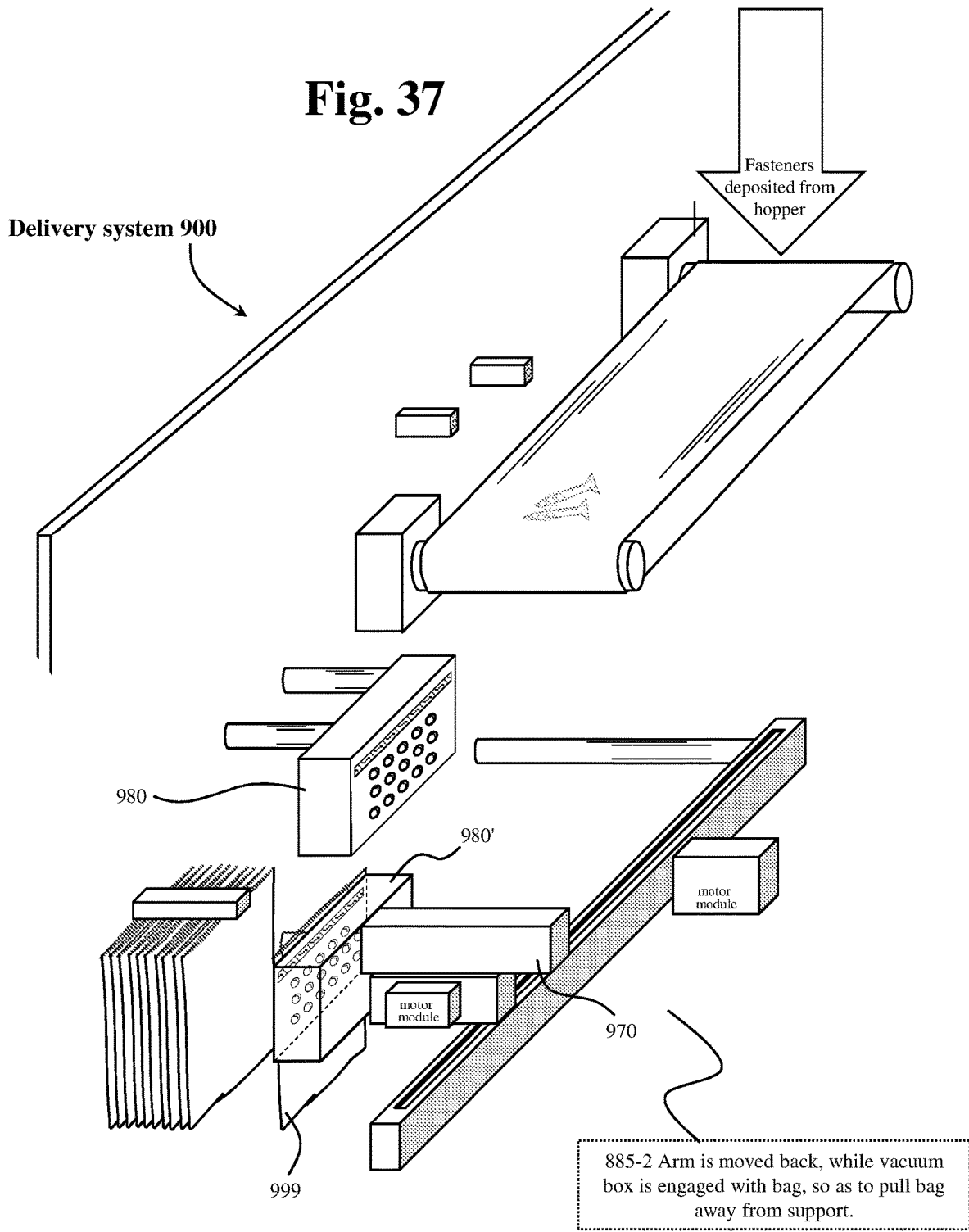
FIG. 37 is a further diagram showing aspects of a delivery system, at later time in processing, in accordance with at least one embodiment of the disclosure

FIG. 37 is a further diagram showing aspects of a delivery system, at later time in processing, in accordance with at least one embodiment of the disclosure. In particular, FIG. 37 illustrates a processing step of FIG. 34.

Figure 38:
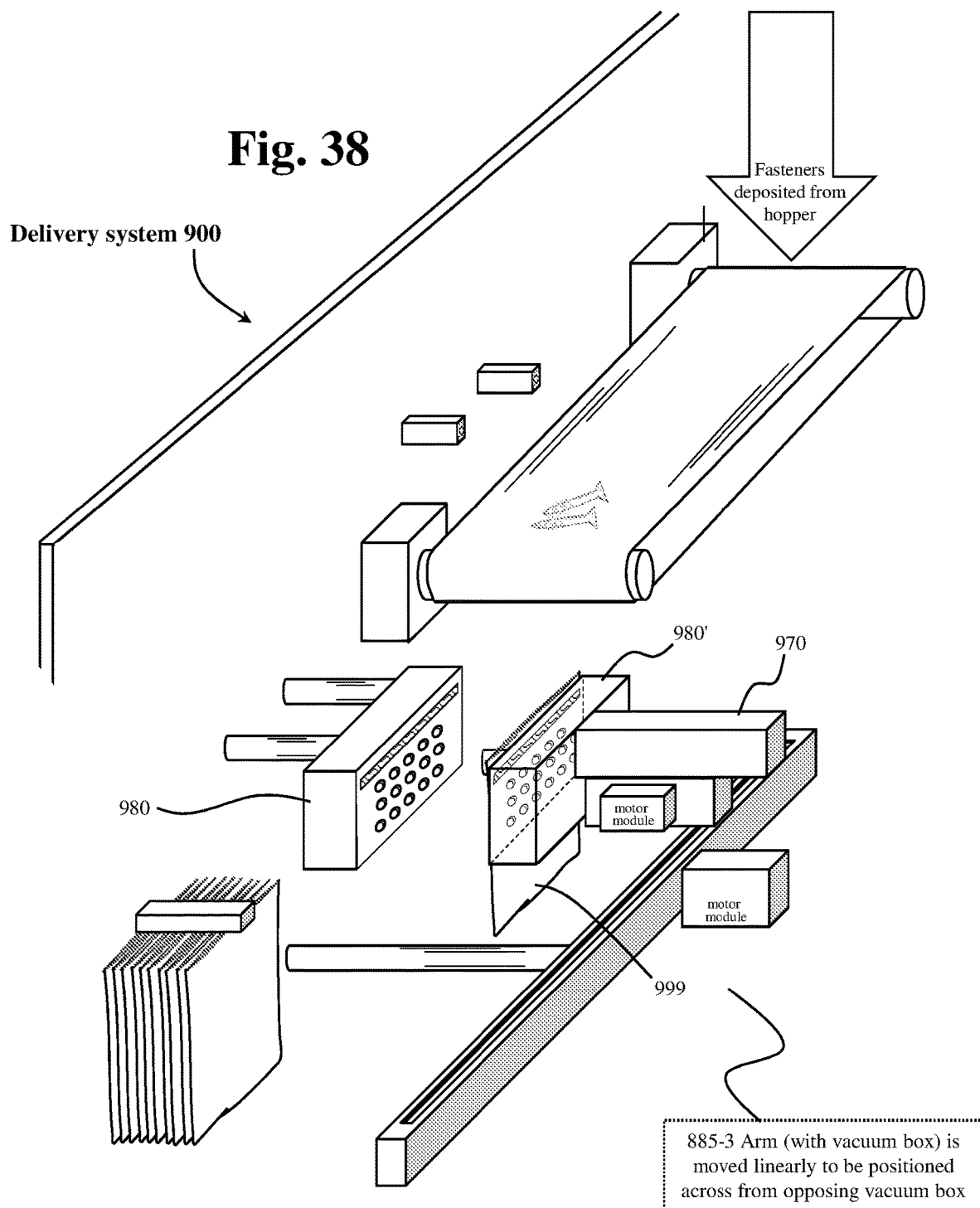
FIG. 38 is a further diagram showing aspects of a delivery system, at later time in processing, in accordance with at least one embodiment of the disclosure

FIG. 38 is a further diagram showing aspects of a delivery system, at later time in processing, in accordance with at least one embodiment of the disclosure. In particular, FIG. 38 illustrates a processing step of FIG. 34.

Figure 39:
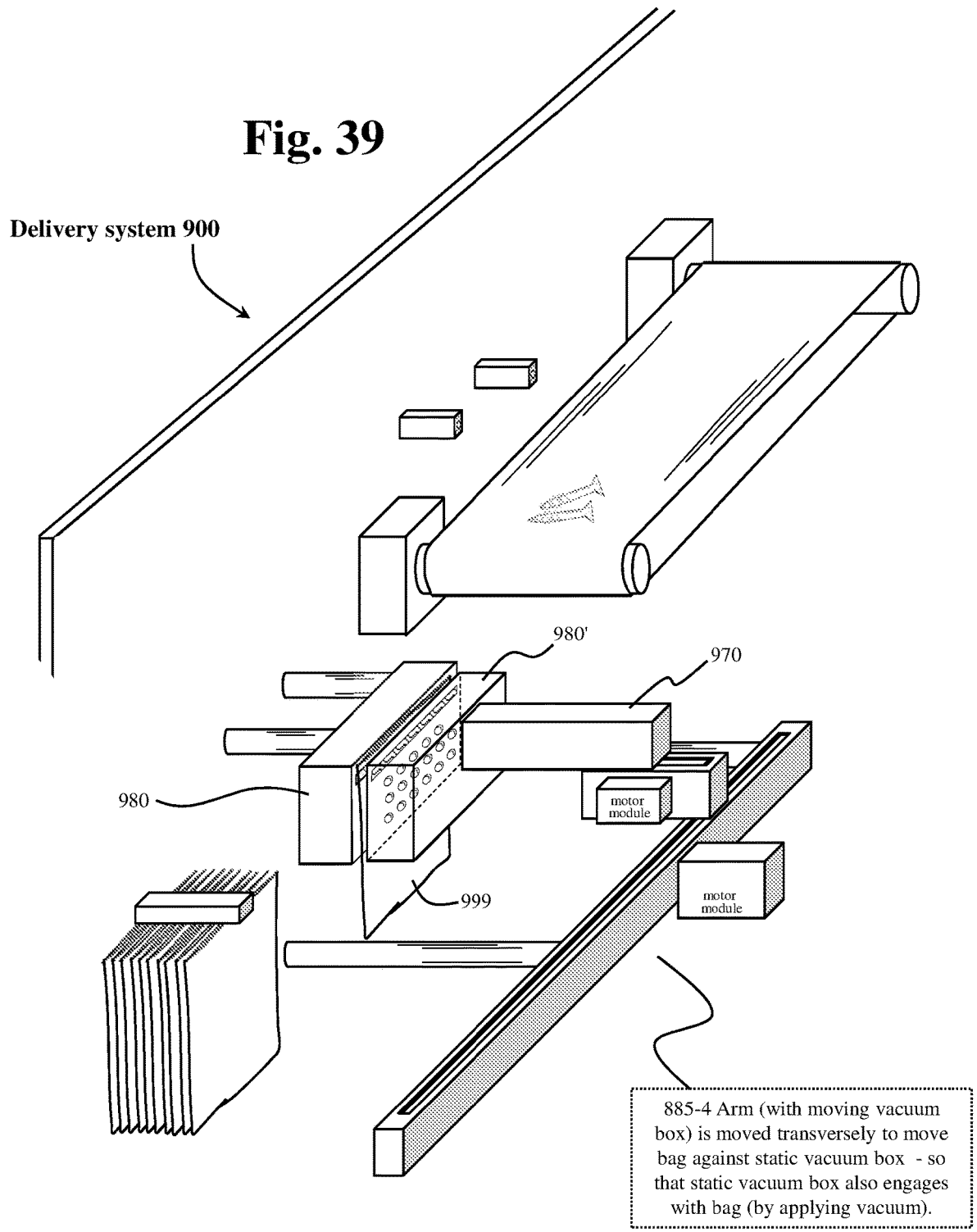
FIG. 39 is a further diagram showing aspects of a delivery system, at later time in processing, in accordance with at least one embodiment of the disclosure.

FIG. 39 is a further diagram showing aspects of a delivery system, at later time in processing, in accordance with at least one embodiment of the disclosure. In particular, FIG. 39 illustrates a processing step of FIG. 34.

FIG. 40 is a further diagram showing aspects of a delivery system, at later time in processing, in accordance with at least one embodiment of the disclosure. In particular, FIG. 40 illustrates a processing step of FIG. 34.

Figure 41:
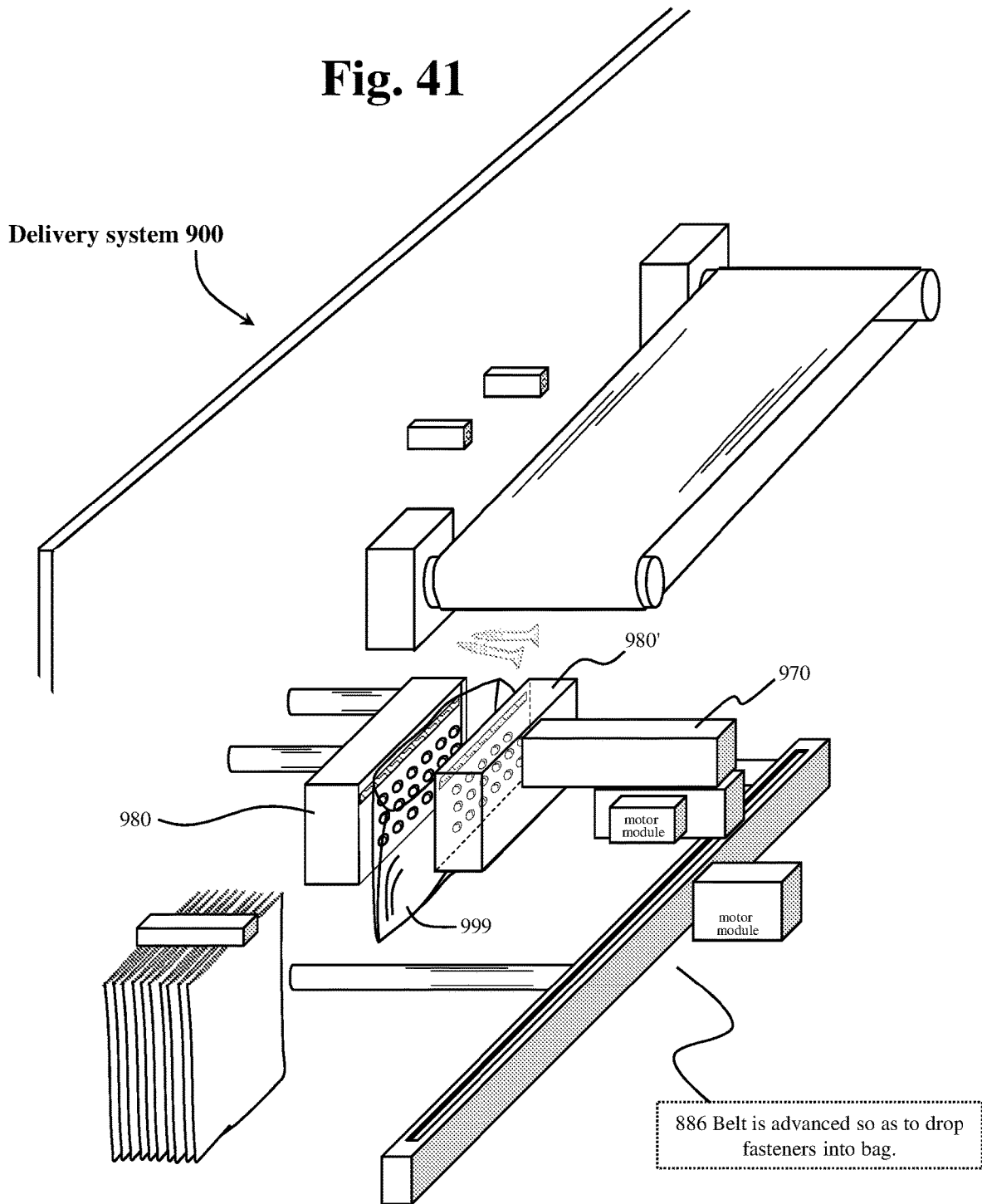
FIG. 41 is a further diagram showing aspects of a delivery system, at later time in processing, in accordance with at least one embodiment of the disclosure.

FIG. 41 is a further diagram showing aspects of a delivery system, at later time in processing, in accordance with at least one embodiment of the disclosure. In particular, FIG. 41 illustrates a processing step of FIG. 35.

Figure 42:
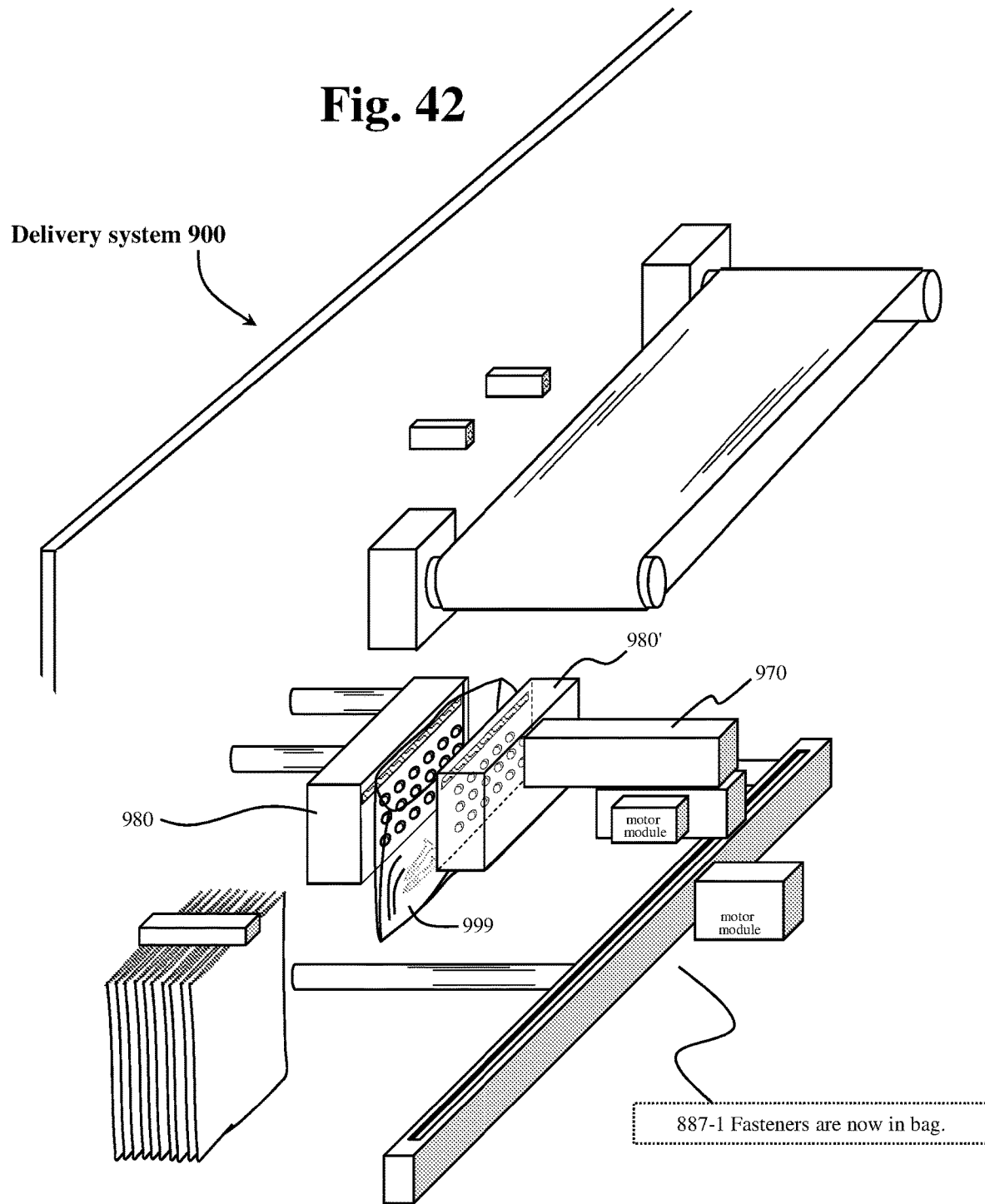
FIG. 42 is a further diagram showing aspects of a delivery system, at later time in processing, in accordance with at least one embodiment of the disclosure

FIG. 42 is a further diagram showing aspects of a delivery system, at later time in processing, in accordance with at least one embodiment of the disclosure. In particular, FIG. 42 illustrates a processing step of FIG. 35.

Figure 43:
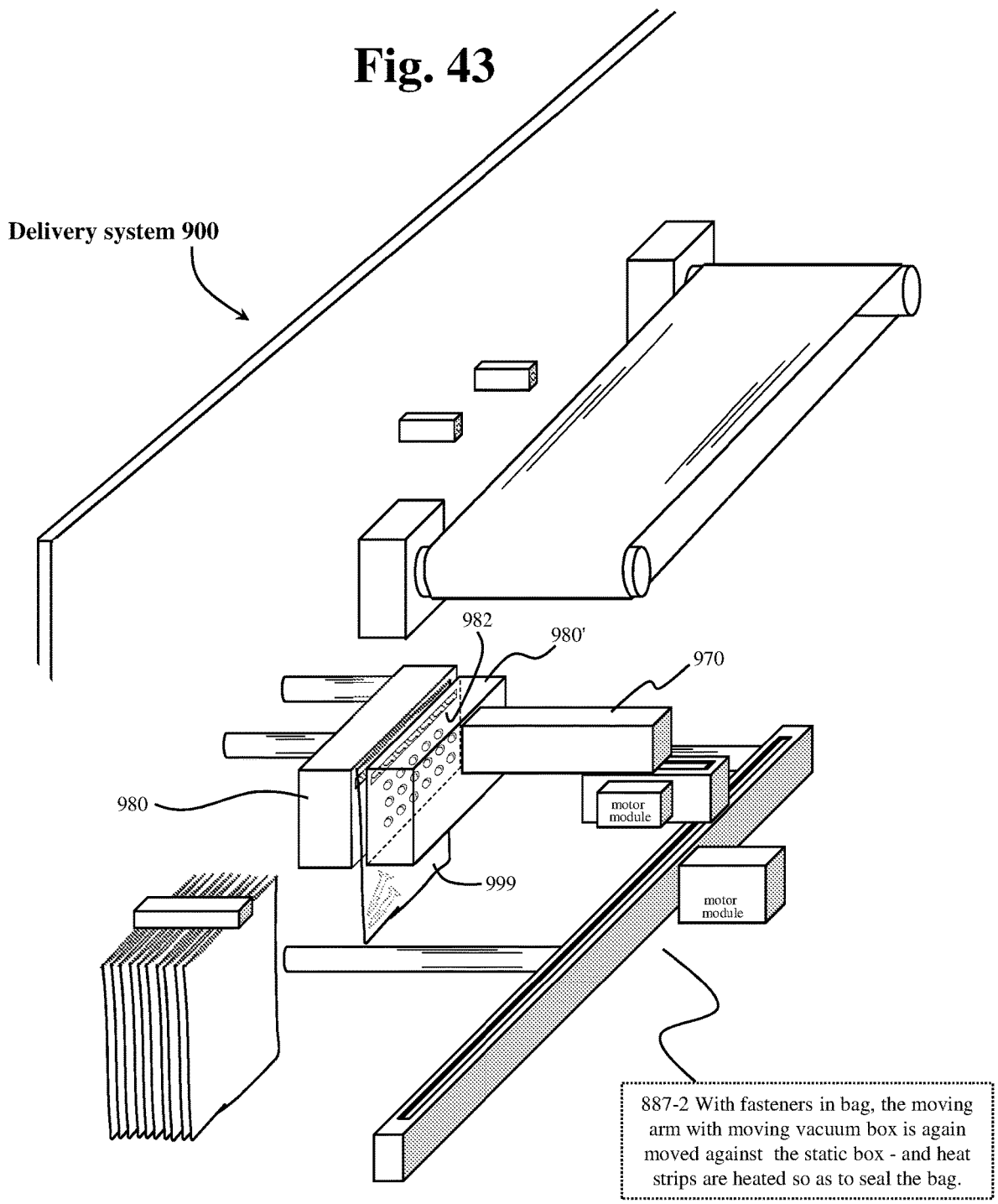
FIG. 43 is a further diagram showing aspects of a delivery system, at later time in processing, in accordance with at least one embodiment of the disclosure.

FIG. 43 is a further diagram showing aspects of a delivery system, at later time in processing, in accordance with at least one embodiment of the disclosure. In particular, FIG. 43 illustrates a processing step of FIG. 35.

Figure 44:
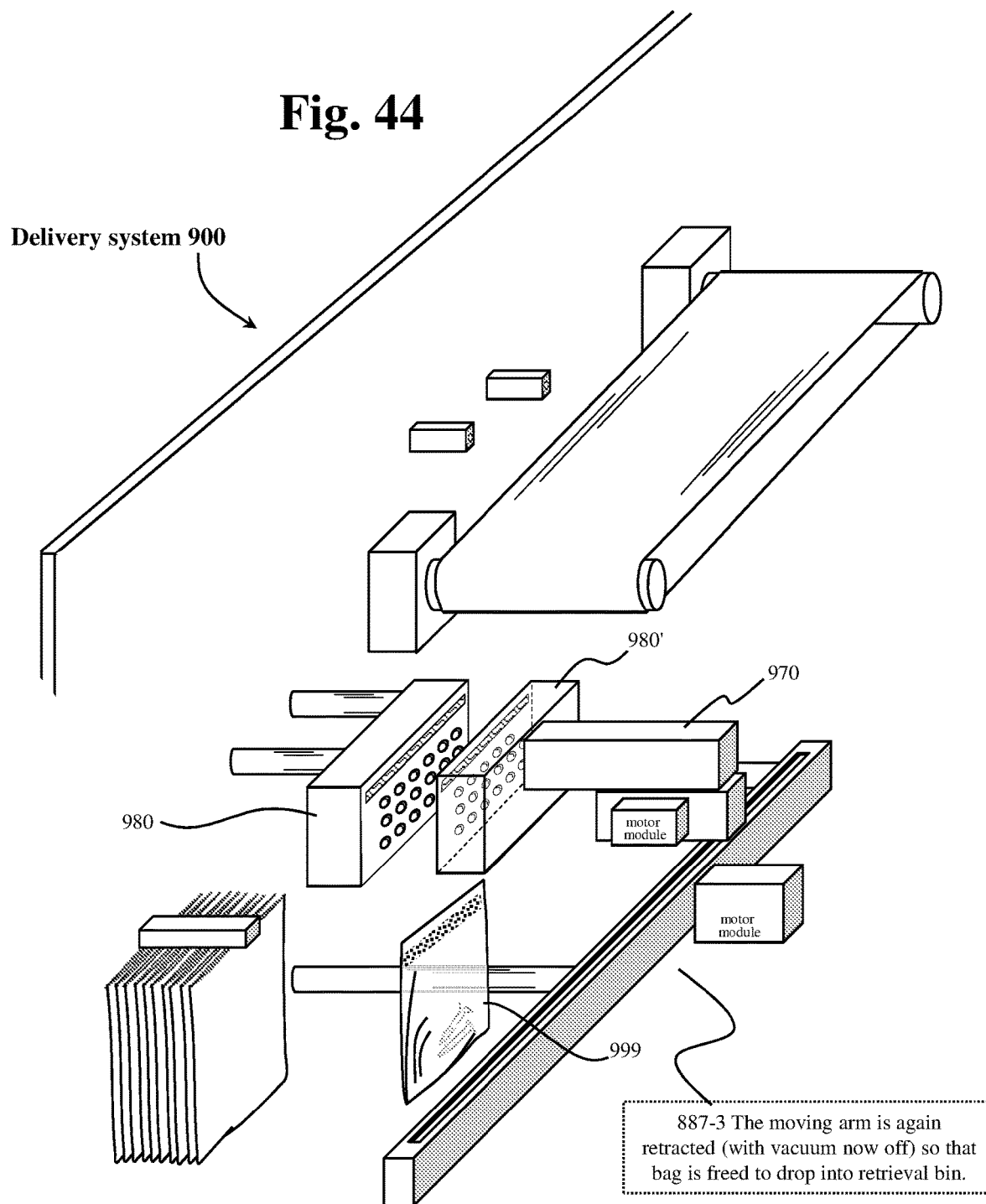
FIG. 44 is a further diagram showing aspects of a delivery system, at later time in processing, in accordance with at least one embodiment of the disclosure.

FIG. 44 is a further diagram showing aspects of a delivery system, at later time in processing, in accordance with at least one embodiment of the disclosure. In particular, FIG. 44 illustrates a processing step of FIG. 35.

As noted above, FIG. 34 is a flowchart showing further details of "first stage bagger processing is performed" step 885 of FIG. 33, in accordance with at least one embodiment of the disclosure. FIG. 34, as well as FIG. 35, illustrates a delivery system 900 the same as or similar to the delivery system 500 of FIG. 11.

The process of FIG. 34 starts in step 885 and passes to step 885-1. In step 885-1 (see FIG. 36), arm 970 is positioned (with moving vacuum box 980' against bag 999) and vacuum is applied to engage with bag 999 (e.g. a plastic bag). Then, in step 885-2 (see FIG. 37), arm 970 is moved back, while vacuum box 980' is engaged with bag, so as to pull bag away from a support that holds the bag 999. Then, in step 885-3 (see FIG. 38), arm 970 (with vacuum box 980') is moved linearly to be positioned across from opposing vacuum box 980. Then, in step 885-4 (see FIG. 39), arm 970 (with moving vacuum box 980') is moved transversely to move bag 999 against static vacuum box 980—so that static vacuum box 980 also engages with bag 999 (by applying a vacuum). Then, in step 885-5, arm 970 (with moving vacuum box 980') is moved transversely, away from the static vacuum box 980, so to open up the bag (see FIG. 40). Then, the process returns to FIG. 33 (step 886).

As noted above, FIG. 35 is a flowchart showing further details of "second stage bagger processing is performed" step 887 of FIG. 33, in accordance with at least one embodiment of the disclosure.

The process of FIG. 35 starts in step 887 and passes to step 887-1. Step 887-1 (see FIG. 42) reflects that the fasteners are now in bag 999. After step 887-1, in step 887-2 (see FIG. 43), with fasteners in bag, the moving arm 970 with moving vacuum box 980' is again moved against the static vacuum box 980—and heat strips 982 are heated so as to seal the bag 999. Then, in step 887-3 (see FIG. 44), the moving arm 970 is again retracted (with vacuum now off in both the moving vacuum box 980' and the static vacuum box 980) so that bag 999 is freed to drop into a retrieval bin. Then, the process returns to FIG. 33 (step 888).

Figure 45:
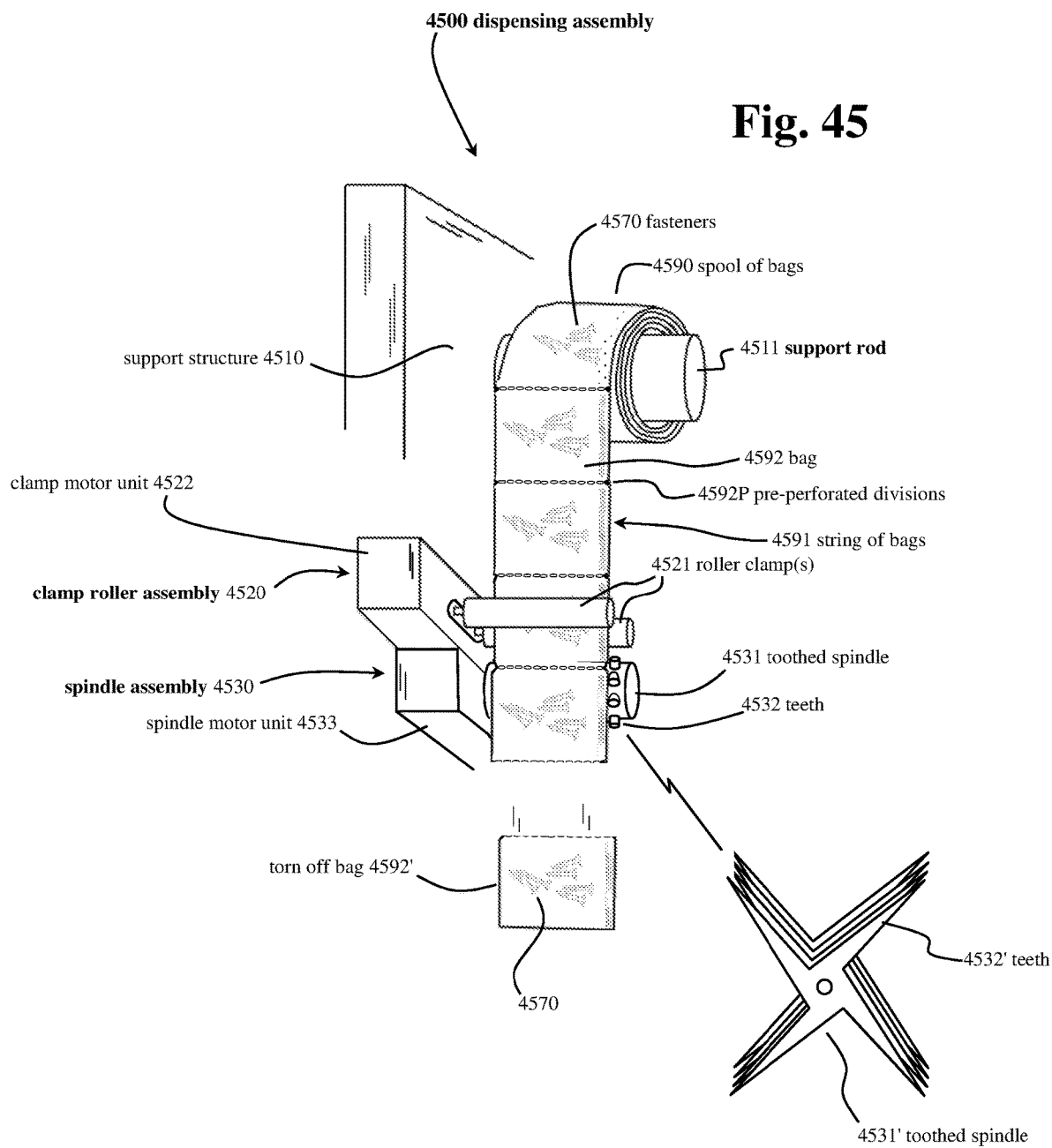
FIG. 45 is a diagram showing a further dispensing assembly in accordance with at least one embodiment of the disclosure.

As described herein, the systems and methods of the disclosure may include various fastener dispensing arrangements including mechanical dispensing arrangements, controllers and/or processors to control such mechanical dispensing arrangements. In accord with one aspect of the disclosure described throughout this disclosure, an apparatus of the disclosure may include a variety of fasteners in inventory. As selected or chosen by a user, such fasteners in inventory may be dispensed to the user. As described above, fasteners may be stored, in inventory, in a bin and selectively dispensed into a suitable container, such as a plastic bag or box, for example. FIG. 45 is a diagram showing a further dispensing assembly in accordance with at least one embodiment of the disclosure.

In the embodiment of FIG. 45, inventory of one or more fasteners may be in the form of a spool or roll of bags 4590. That is, as shown in FIG. 45, a particular type of fastener may be provided in a spool of bags 4590. The spool of bags 4590 may include a plurality of bags 4592 in a string, series, or sequence 4591. Each of the bags 4592 (in the string of bags 4591) may contain a number of fasteners 4570. Each bag 4592 may be demarcated from an adjacent bag (in the spool of bags 4590) by a pre-perforated division 4592P. The pre-perforated divisions 4592P may be in the form of a series of aligned holes or apertures extending across the string of bags 4591—so as to demarcate the respective bags and provide a weakened section, by which the bags may be separated. The pre-perforated divisions 4590P may be disposed at spaced intervals along the length of the string of bags 4591.

As shown, a number of fasteners may be contained in each individual bag 4592. For example, each bag 4592 may contain 5, 10, 20, or any other desired number of fasteners. Construction of the bags 4592 may include folded plastic, heat sealed seams and/or other physical separations between distinct bags.

A spool of bags 4590, with individual bags containing select fasteners, may be produced or pre-filled in mass at a manufacturing facility or factory. Different spools of bags may contain different fasteners. Various spools of bags may then be shipped to a retail store, such as HOME DEPOT, and provide inventory in an apparatus of the disclosure. The spools of bags may be color coded to reflect different fasteners in a particular spool, different types of fasteners in a particular spool, and/or different sizes of fastener in a particular spool, for example.

With further reference to FIG. 45, the fastener dispensing apparatus or assembly 4500 of the disclosure may include a support structure 4510. Attached to the support structure 4510 is a support rod 4511. A spool of bags 4590 may be disposed upon the support rod 4511. The spool of bags 4590 may include an inner structure 4592 (not shown) upon which the bags 4591 are wound about in manufacturing. The inner structure may be in the form of a paper or cardboard tube or roll, i.e. akin to the manner in which a roll of paper towels is wound about a cardboard tube. However, as is shown in FIG. 45, the spool of bags 4590 may not include an inner roll, i.e. the spool of bags may be rolled upon itself.

In the dispensing assembly 4500, the spool of bags 4590 is free to rotate around the support rod 4511. Such rotation may include or be provided with some degree of resistance or friction so as to prevent the spool from inadvertently unwinding.

The dispensing assembly 4500 further includes a clamp roller assembly 4520 and a spindle assembly 4530. The clamp roller assembly 4520 may include roller clamps or rollers 4521 that are disposed on opposing sides of the string of bags 4591. The rollers 4521 are imparted rotational movement, by a clamp motor unit 4522, so as to advance the string of bags 4591 downward. The rollers 4521 turn in opposing direction so as to advance the string of bags downward. That is, together, the two rollers 4521 serve to effectively clamp the string of bags in a static situation when the rollers 4521 are not rotating—and serve to effectively advance the string 4591 of bags 4592 downward, as shown in FIG. 45, when the rollers are rotating. The rollers 4521 effectively grab the string of bags 4591 and advance the string of bags against any frictional force provided to the spool of bags 4590 by the supporting support rod 4591. It is appreciated that other clamping and advancing mechanisms may be utilized in lieu of the clamp assembly 4530.

As noted above, the dispensing assembly 4500 also includes a spindle assembly 4530. The spindle assembly 4530 includes a toothed spindle 4531. The toothed spindle 4531 includes teeth 4532. In this embodiment, the clamp roller assembly 4520 advances the string of bags 4591 downward a desired distance. Utilizing suitable sensors and/or a predetermined advancement rotation as controlled by a controller, the clamp roller assembly 4522 positions or spaces the toothed spindle adjacent or near one of the pre-perforated divisions 4592P. The toothed spindle 4531 is powered or motorized to rotate by a spindle motor unit 4533. Upon rotation of the toothed spindle 4531, the teeth 4532 grab into or onto the particular pre-perforated division 4592P that is adjacent or near the toothed spindle 4531. As a result, the string of bags is torn apart, along the particular pre-perforated division 4592P, so as to effectively release a torn off bag 4592', or multiple bags if the string is so advanced Immediately after a bag 4592' is torn off, the clamp roller assembly 4520 may advance so as to position the next pre-perforated division 4592P adjacent to the spindle 4531 (which is the position/arrangement shown in FIG. 45).

The structure of the tooth spindle 4531 may be varied. In the arrangement shown in FIG. 45, the teeth 4532 may be disposed about the toothed spindle 4531 and be of varying sharpness, thickness, length and/or other attribute. However, in an alternative arrangement, toothed spindle 4531' may be utilized in lieu of the toothed spindle 4531. The toothed spindle 4531' may include more pronounced teeth 4532'. In general, it is appreciated that the shape or geometry of the toothed spindle 4531 and the teeth 4532 may be varied as desired depending on the shape or geometry of the pre-perforated divisions 4590P, the thickness of the material used in construction of the bags to hold the fasteners, and/or the extent that the pre-perforated divisions 4592P segregate or weaken the individual bags.

It is appreciated that one or more of a particular type of dispensing assembly or apparatus may be utilized in a dispensing apparatus of the disclosure, as may be desired. Further, different types of dispensing assemblies may be utilized in the same dispensing apparatus of the disclosure, as may be desired. Additionally, a dispensing assembly, package, mechanism, or process described herein as dispensing a particular or single type of fastener may indeed be utilized to dispense a collection of various fasteners as may be desired. For example, a collection of various fasteners (sold as a single unit) might be a particular diameter of screw, but of varying lengths. Such single unit could be provided as an option (in inventory) for the user to consider in making his or her selection of fasteners.

In related manner to FIG. 45, in a yet further arrangement, fasteners may be secured in a row upon a supporting substrate, such as a paper strip. Such supporting substrate with fasteners may be wound onto a spool. Upon a particular number of fasteners being selected by a user, an assembly (similar to dispensing assembly 4500) may advance the supporting substrate to provide the requested number of fasteners. The advanced portion of the strip may then be "cut" (with a suitable cutter in lieu of tooted spindle 4531) so as to dispense the requested number of fasteners. Alternatively, the toothed spindle 4531 may be used to tear off the requested number of fasteners. The supporting substrate may be provided with perforations or weakened portions to assist on such operation.

Figure 46:
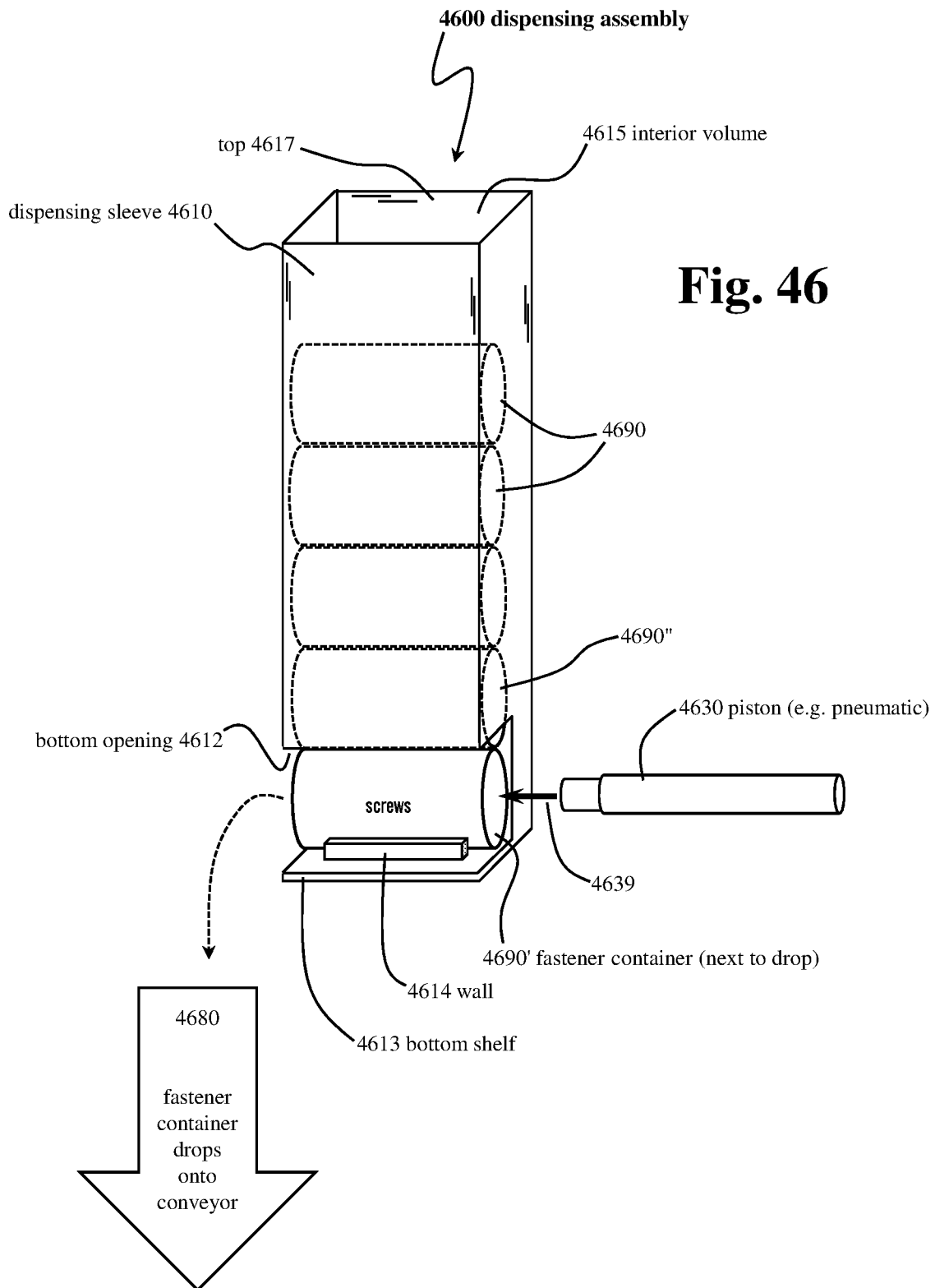
FIG. 46 is a diagram showing a further dispensing assembly in accordance with at least one embodiment of the disclosure.

FIG. 46 is a diagram showing a further dispensing assembly 4600, in accordance with at least one embodiment of the disclosure. The dispensing assembly 4600 may be utilized in one of the dispensing apparatus of the disclosure, such as the station 100 of FIG. 1 or the station 420 of FIG. 9, for example.

The dispensing assembly 4600, of FIG. 6, includes a dispensing sleeve 4610. The dispensing sleeve 4610 might be in the form of a tube, box, or other similar structure. As shown, the dispensing sleeve 4610 may include an open top 4617. The dispensing sleeve 4610 includes a bottom opening 4612. A bottom shelf 4613 is disposed below the bottom opening 4612.

In an embodiment, the dispensing assembly 4600 is constructed so as to dispense a plurality of fastener containers 4690. The fastener containers 4690 may be in the form of a jar, tube, canister, closed cylinder, box, other shape, or other arrangement. The fastener containers 4690 may contain a single particular fastener and/or may contain a variety of fasteners. A plurality of the containers 4690 may be inserted into the top 4617 of the dispensing sleeve 4610. As result, a plurality of the containers 4690 may be disposed within an interior volume 4615 of the dispensing sleeve 4610.

Structure may be provided so that a lowermost fastener container 4690', may be pushed out or injected from the dispensing assembly 4600. As reflected at 4680, the lowermost fastener container 4690' may be ejected from the dispensing sleeve 4610 so as to drop onto a conveyor or some other mechanism to transport the ejected fastener container 4690' to a retrieval location or bin (for retrieval by the user). Alternatively, the lowermost fastener container 4690' may be dropped directly into a location, for example bin, so as to be retrieved by a user.

In accord with one embodiment, a piston 4630 is provided so as to eject the container 4690' from the dispensing sleeve 4610. That is, the piston 4630 may be powered by gas, oil, air, or other fluid, so as to extend in a lateral direction 4639 as shown in FIG. 46. As a result, the fastener container 4690' is ejected in a leftward direction. Movement of the piston 4630 may be provided so as to effectively "pop" the fastener container 4690' out from the dispensing sleeve 4610. Due to the effect of gravity, a next fastener container 4690" then falls, so as to assume the position of the lowermost container. Accordingly, the next time a user requests (from inventory) the particular type of fastener disposed in the fastener container 4690—such container will be ejected from the dispensing sleeve 4610. It is appreciated that a wall or other retaining structure 4614 may be disposed upon the bottom shelf 4613 so as to stably retain the lowermost fastener container prior to injection from the dispensing sleeve 4610. Indeed, the dispensing sleeve 4610 may not be open on a front side (as shown in FIG. 46), but rather may only be open enough and sufficiently (1) to allow the piston 4630 to exert force on the fastener container (so as to pop out the fastener container), and (2) to allow the fastener container to exit the dispensing sleeve on the left side as shown in FIG. 46. It is of course appreciated the particular directionalities may be varied as desired, i.e., the piston 4630 might be disposed on the left side, or some other side, so as to eject a fastener container.

Further, the disclosure is not limited to the particular features of the piston 4630 described and shown in FIG. 46. Other mechanical arrangements might be utilized to eject the fastener container 4690' from the dispensing sleeve 4610. Such other mechanical arrangement might be an arm, rack and pinion driven rod, lever, rotating arms, rotating levers, magnet to repel a fastener container 4690' from the dispensing sleeve 4610 (in the case that the fastener container is metal), or some other mechanical arrangement.

FIG. 47 is a diagram showing a further dispensing assembly 4700, in accordance with at least one embodiment of the disclosure. The dispensing assembly 4700 may be utilized in one of the dispensing apparatus of the disclosure, such as the station 100 of FIG. 1 or the station 420 of FIG. 9, for example.

The dispensing assembly 4700 of FIG. 47 includes a plurality of bags of fasteners 4790 supported on a support rod or other elongated structure 4711. The support rod 4711, which supports the bags, is in turn supported by a support structure 4712. For example, the support rod 4711 might be in the form of a steel rod or shaft. Each bag 4790 may contain a desired number of fasteners with desired attributes. For example, each bag 4790 may contain 10 screws of a particular type.

As shown, each of the bags 4790 is supported via a support structure such as a hole 4791 disposed in the top portion of the bag, other type of aperture, tab (as described below), or other support structure. In the embodiment of FIG. 47 as shown at 4750', each of the bags 4790 may be structured to allow the bag to be pulled or torn off the support rod 4711. That is, if the support structure is a hole 4791, then such hole 4791 may be provided with a frangible or weakened portion—so that the bag may be pulled or torn off the support rod 4711.

On the other hand, each of the bags may be provided with a tab 4791'. The tab 4791' may be attached to the bag 4790' via a connecting portion 4791", such as via adhesive, heat bonding, or in some other manner. The tab 4791' may be splayable or spreadable. As a result, when a bag 4790' is disposed upon support rod 4711', and a predetermined amount of downward force is applied to the tab 4791', the tab 4791' distorts in shape. Such distortion in shape allows the tab 4791' to slip off the support rod 4711. Such distortion in shape of the tab 4791' may be provided by deformable or elastic nature of construct of the tab. In some embodiments, it may be preferred to use the tab versus a tearable hole 4791, i.e. in that tab 4791' will, for the most part, return to its original shape once disengaged from the support rod 4711.

It is appreciated that various mechanisms may be utilized to disengage or pull a particular bag 4790 off from the support rod 4711. With the arrangement of the dispensing assembly 4700, once the bag 4790 is pulled off the support rod 4711, the bag is freed to drop onto a conveyor, other transport device, or retrieval location. For example, a bag that is pulled off the support rod 4711 might drop onto a chute or slide so as to be routed or transported to a retrieval bin (e.g. retrieval tray assembly 140 of FIG. 1), for pickup by the user.

As noted above, it is appreciated that various mechanisms may be utilized to disengage or pull off a particular bag 4790 from the support rod 4711. Illustratively, FIG. 47 shows a mechanism that includes roller assembly 4720. The roller assembly 4720, as illustratively shown, includes a friction wheel 4721. The friction wheel is driven by a suitable motor 4722. The friction wheel 4721 may be constructed of sticky rubber or other friction providing material, for example. The bags 4790 include a next bag to drop 4790N.

In operation, the friction wheel 4721 is pressed up against the next bag 4790N to be pulled off the support structure 4711, i.e. the bag 4790N. The friction wheel 4721 is pressed up against the bag 4790N, a sufficient amount, such that when the friction wheel 4721 turns in a counterclockwise direction, as shown in FIG. 47, the friction wheel 4721 grabs onto bag 4790N. As a result, the bag 4790N is pulled off, or turn off, the support rod 4711. Specific attributes of such operation—such as pressure applied to press the friction wheel 4721 up against bag 4790N and the speed at which friction wheel 4721 turns—may be determined based on the particular attributes of the bags 4790 and friction wheel 4721, for example.

The roller assembly 4720 may include a mechanical arrangement to position friction wheel 4721 against the next bag 4790N. In the embodiment of FIG. 47, as reflected at 4720', the roller assembly 4720 includes an extendable and/or spring loaded arm 4725. The spring-loaded arm 4725 is provided with the friction wheel. A bracket 4726 may be provided to connect the arm 4725 to the friction wheel 4721 and/or the motor 4722. The arm 4725 may be constituted by a robotics arm with sensors and controllers, such that the position of arm 4725 may be controlled by a computer. As an additional next bag is torn off or pulled off, the arm 4725 is advanced to the left as shown in FIG. 47. Once the last bag is torn off, the arm 4725 may then retract to a far right position and a new set of bags be loaded upon the support rod 4711, i.e. a new set of bags may be loaded into inventory.

Figure 48:
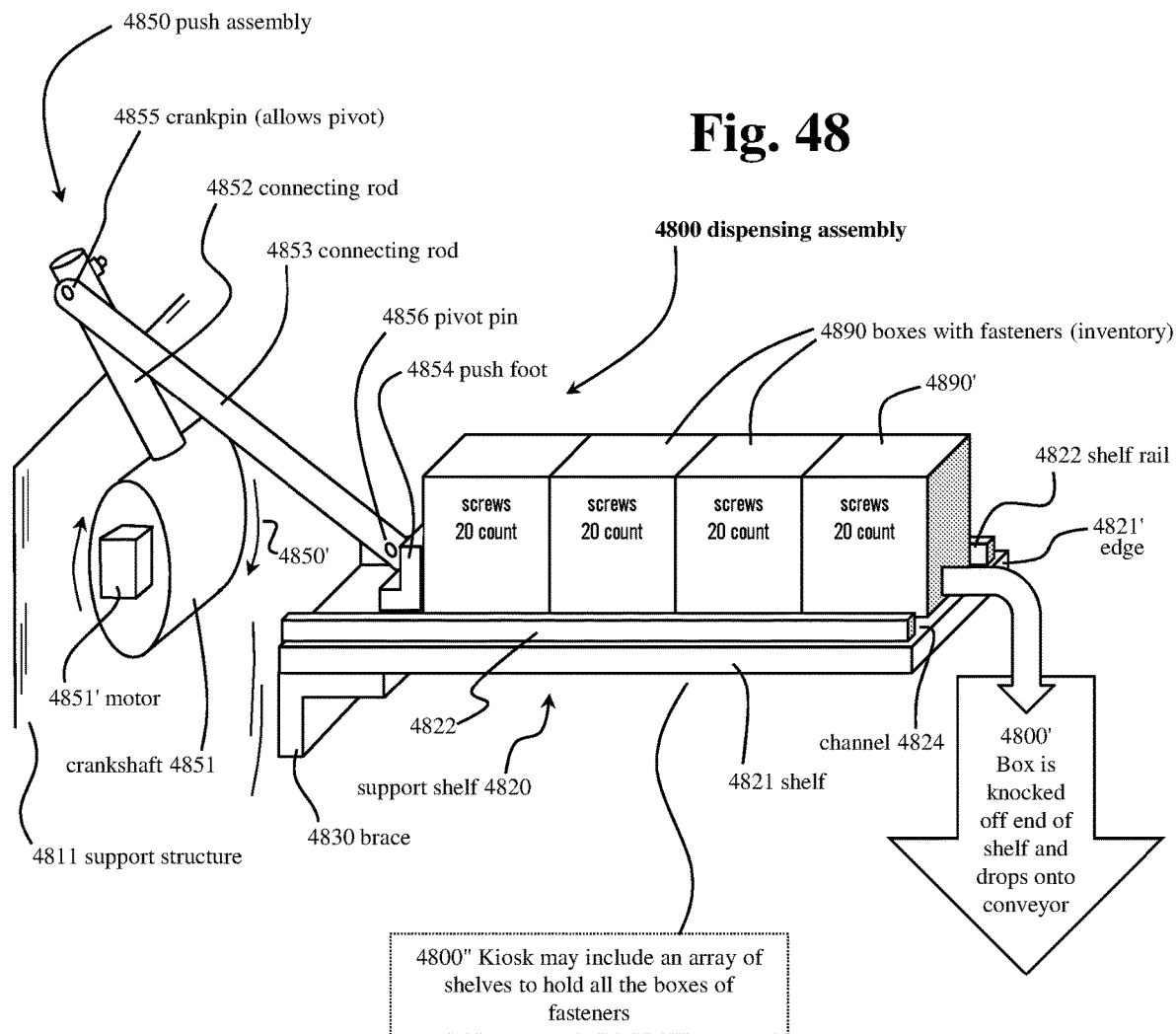
FIG. 48 is a diagram showing a further dispensing assembly, in accordance with at least one embodiment of the disclosure.

FIG. 48 is a diagram showing a further dispensing assembly 4800, in accordance with at least one embodiment of the disclosure. The dispensing assembly 4800 may be utilized in one of the dispensing apparatus of the disclosure, such as the station 100 of FIG. 1 or the station 420 of FIG. 9, for example.

The dispensing assembly 4800 of FIG. 47 includes a mechanism for supporting a plurality of boxes of fasteners 4980 upon a support shelf 4820. The boxes of fasteners constitute inventory in this example. For example, the boxes 4890 might be 20 count of screws. The boxes are physically disposed upon support shelf 4820. It is of course appreciated that the size, shape, width, length and other physical attributes of the support shelf 4820 may be varied based on the particular number of boxes 4890 and the particular shape of each box 4890, which is desired to be dispensed.

More specifically, the structure of shelf 4820 includes shelf 4821 upon which two shelf rails 4822 are disposed on opposing sides. In other words, the shelf rails 4822 may run along edges of the shelf 4821 so as to form a channel 4824 between the shelf rails 4822. It is within this channel 4824 that the boxes 4890, or other containers, are placed in a row in "stocking" inventory. The boxes 4890 are disposed in a row such that when a left hand side of the row is pushed rightward the right most box 4890' is pushed or knocked off an edge 4821' of the shelf 4821, i.e. knocked off the end of the shelf, as shown at 4800'. The container may then drop for retrieval. The support shelf 4820 may be supported by a suitable brace or support 4830.

With the arrangement of the dispensing assembly 4800, once the box 4890' is pushed off the edge 4821', the box is freed to drop onto a conveyor, other transport device, or retrieval location. For example, the box 4890' might drop into a chute or slide so as to be routed or transported to a retrieval bin (e.g. retrieval tray assembly 140 of FIG. 1), for pickup by the user.

The particular arrangement that is utilized to push the row of boxes may be varied as desired. For example, in one embodiment, a simple piston might be utilized to push the row of boxes 4890. In such embodiment, the extension or travel of such a piston should be sufficient so as to allow for a full shelf of boxes, i.e. inventory, hand-in-hand with extending so as to push the last box off the edge 4821'. Such a piston might be telescopic and utilize air, oil, hydraulic fluid, or some other type of fluid to extend the piston.

In lieu of a piston, the particular arrangement shown in FIG. 48 includes a push assembly 4850 with a push foot 4854. The push foot 4854 may be provided to directly apply pressure to a leftmost box 4890—so as to push rightmost box 4890' over edge 4821'.

The push assembly 4850 includes a crankshaft 4851. A connecting rod 4852 is rigidly connected to crankshaft 4851 so as to turn with the crankshaft 4851. In turn, a connecting rod 4853 is connected to the connecting rod 4852 by a crank pin 4855. Such arrangement allows pivoting between the connecting rod 4852 and the connecting rod 4853. The connecting rod 4853 is connected, at an end thereof, to the push foot 4854. The connecting rod 4853 is connected to the push foot 4854 in a manner so as to allow pivoting, such as utilizing a pivot pin 4856. In operation, the crankshaft 4851 is initially turned counterclockwise, to a first extent, so as to position push foot 4854 to the far left of the shelf 4821. Boxes of fasteners, i.e. inventory, may then be loaded upon shelf 4821. Then, as the crankshaft 4851 turns clockwise (per arrows 4850'), via the connecting rod 4852 and the connecting rod 4853, the push foot 4854 is pushed rightward. As a result, the right most box 4890' is pushed off the edge 4821', as described above. Movement of the push foot is then terminated till a further box is requested.

The crankshaft 4851 may be powered by a suitable motor 4851' or other mechanism. The crankshaft 4851 and/or the motor 4851' may be suitably supported upon a support structure 4811. Further, it should be appreciated that the crankshaft 4851, rod 4852, rod 4853, and/or push foot 4854 may be replaced, in some embodiments, with other linkages or mechanical arrangements to push or propel the containers or boxes 4890 on shelf 4821 or other supporting structure. Additional linkages or other mechanical structure may be used to amplify the travel distance of push foot 4854, such as providing connecting rod 4853 with a telescopic extension portion, for example.

Figure 49:
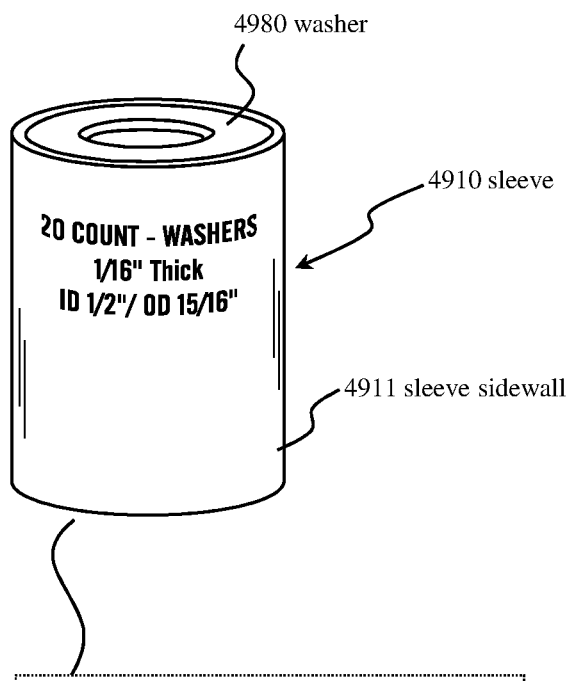
FIG. 49 is a diagram showing a further structure that may be utilized to hold fasteners, in accordance with at least one embodiment of the disclosure.

The containers utilized in the dispensing assembly 4800 are illustratively shown as boxes 4890 in FIG. 48. However, the invention is not limited to such containers. Other containers may be utilized as desired, including jars, other shaped boxes, or bags of fasteners, for example. Additionally, circular jars or other containers (such as shown in FIG. 49) may also be utilized given the shelf rails 4822. That is, containers having curvature may be utilized since shelf rails 4822 will prevent such containers from slipping past one another or becoming misaligned as pressure is exerted by foot 4854 or other mechanism.

Figure 50:
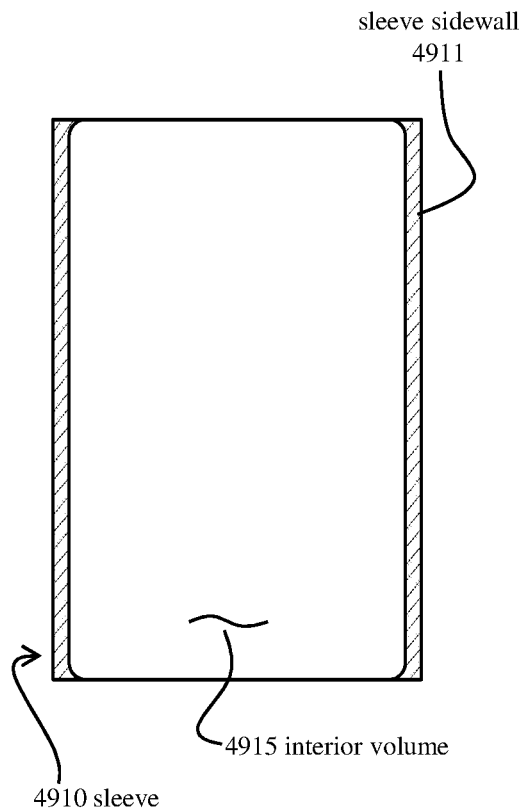
FIG. 50 is a cross-sectional view of the same or similar structure as that shown in FIG. 49 without washers, in accordance with at least one embodiment of the disclosure.
Figure 61:
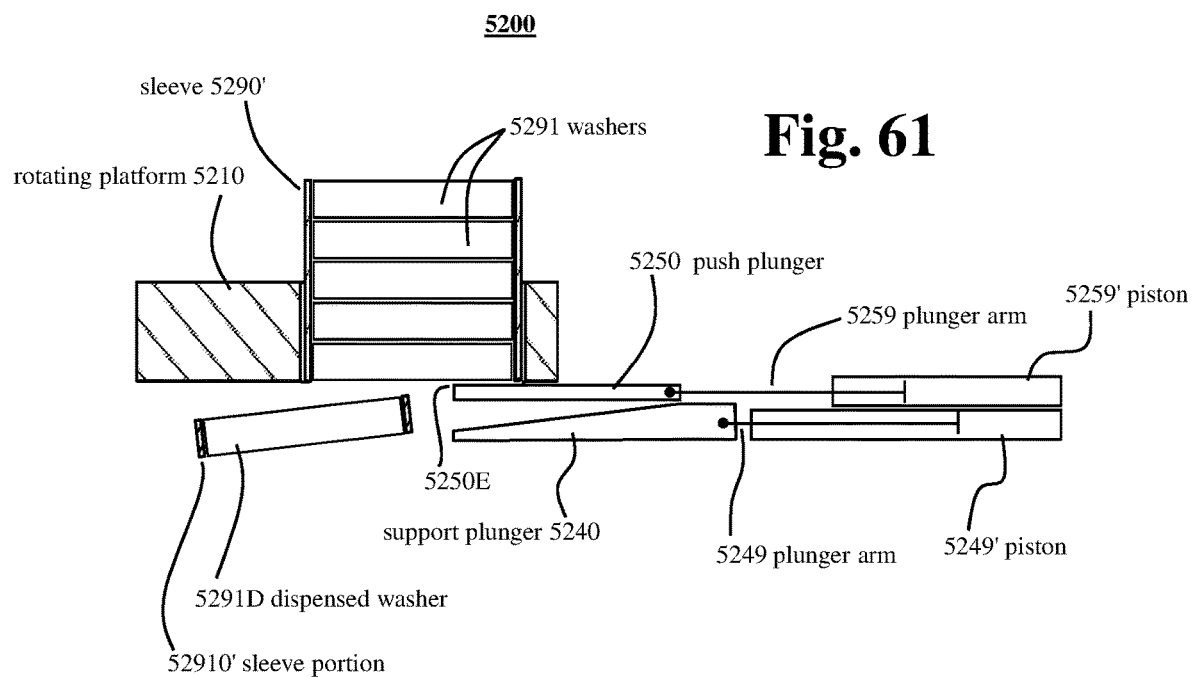
FIG. 61 is a diagram showing operation of a dispensing assembly, the same or similar to that of FIG. 54, in accordance with at least one embodiment of the disclosure.

FIG. 49 is a diagram showing a further structure that may be utilized to hold fasteners, in accordance with at least one embodiment of the disclosure. FIG. 50 is a cross-sectional view of the same or similar structure as that shown in FIG. 49, in accordance with at least one embodiment of the disclosure. For example, the structure of FIG. 49 may be characterized as a sleeve 4910. The sleeve 4910 includes a sleeve side wall 4911. The sleeve sidewall 4911 creates or defines an interior volume 4915. A plurality of fastener devices may be disposed within the interior volume 4915. In particular, the sleeve 4910 provides a structure to hold a plurality of washers 4980 or similar structure as shown in FIG. 49. The sleeve 4910 may be constructed of a plastic or polymer material disposed about the washer 4980 or other fastener. The sleeve 4910 may be heat-shrunk around the washers 4980 or other fasteners. The sleeve 4910 may be constructed of sufficiently thin material such that a segment of the sleeve may be "sliced" off (or otherwise frangible) along with a washer or other fastener, which such sliced-off sleeve segment covers. Such structure is shown in FIG. 61 with a dispensed washer 5291D and a sliced off sleeve portion 5291P. That is, the structural attributes of the sleeve 4910, including strength and thickness, may be provided so as to provide sufficient strength to hold the plurality of fasteners in a desired arrangement—hand-in-hand with being sufficiently frangible or sliceable such that the sleeve 4910 may be sliced off with a corresponding fastener disposed therein.

The structure 4911 of FIG. 49 and FIG. 50 is not limited to retaining washers. Other fastener structure may be retained in the sleeve 4910. For example, a plurality of screws may be aligned in sequence and retained in a sleeve of similar structure to that shown in FIGS. 49 and 50. One or more screws or other fasteners may then be cut off, using a suitable cutting arrangement, so as to be dispensed to a user. Further details are described below in accordance with at least one embodiment of the disclosure. As reflected in FIG. 49 at 4900', washers in a sleeve 4910 may be dispensed using carousel dispenser of FIG. 51 or FIG. 54, for example.

Figure 51:
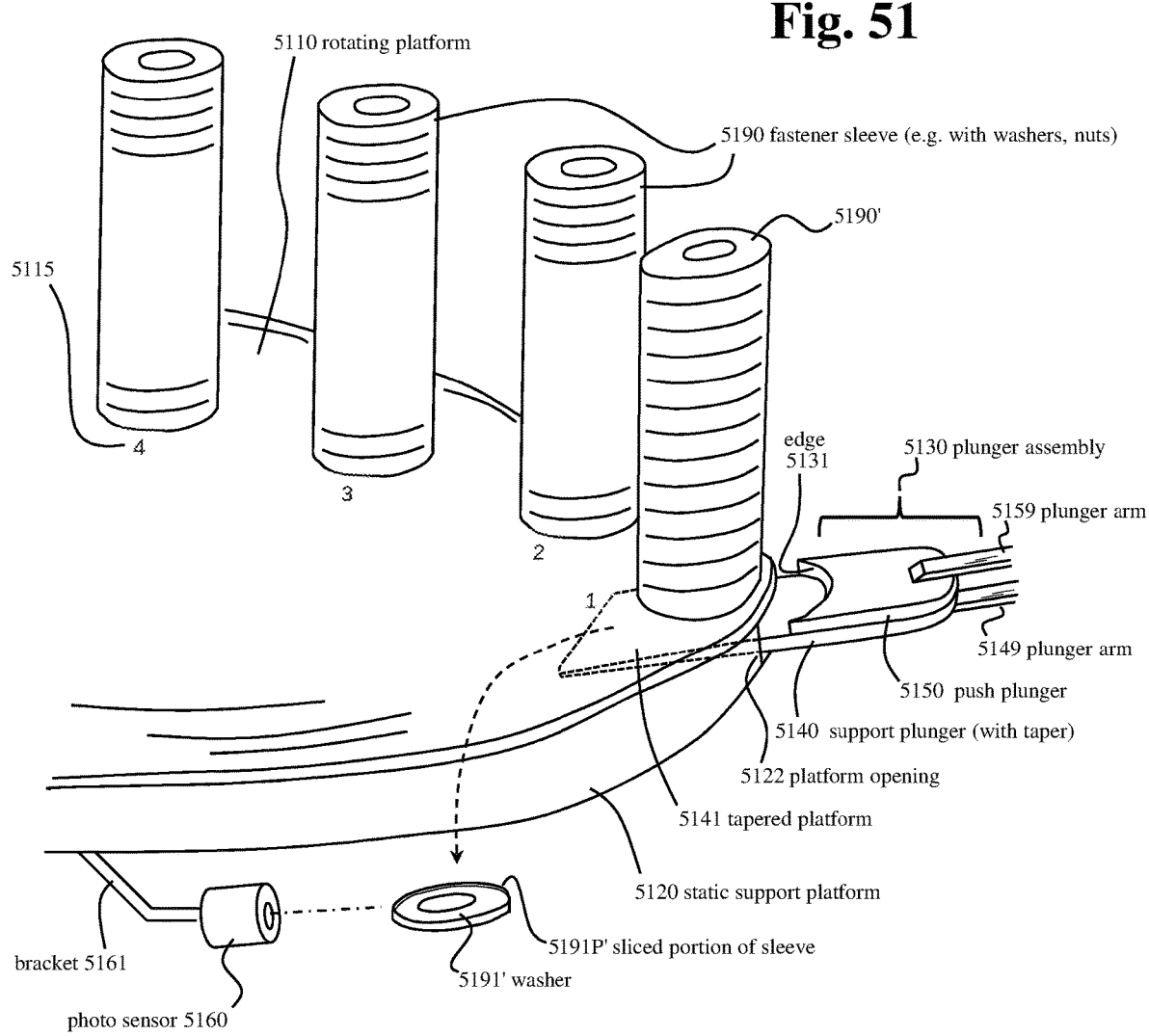
FIG. 51 is a perspective view of a dispensing assembly with plunger assembly, in accordance with at least one embodiment of the disclosure.
Figure 52:
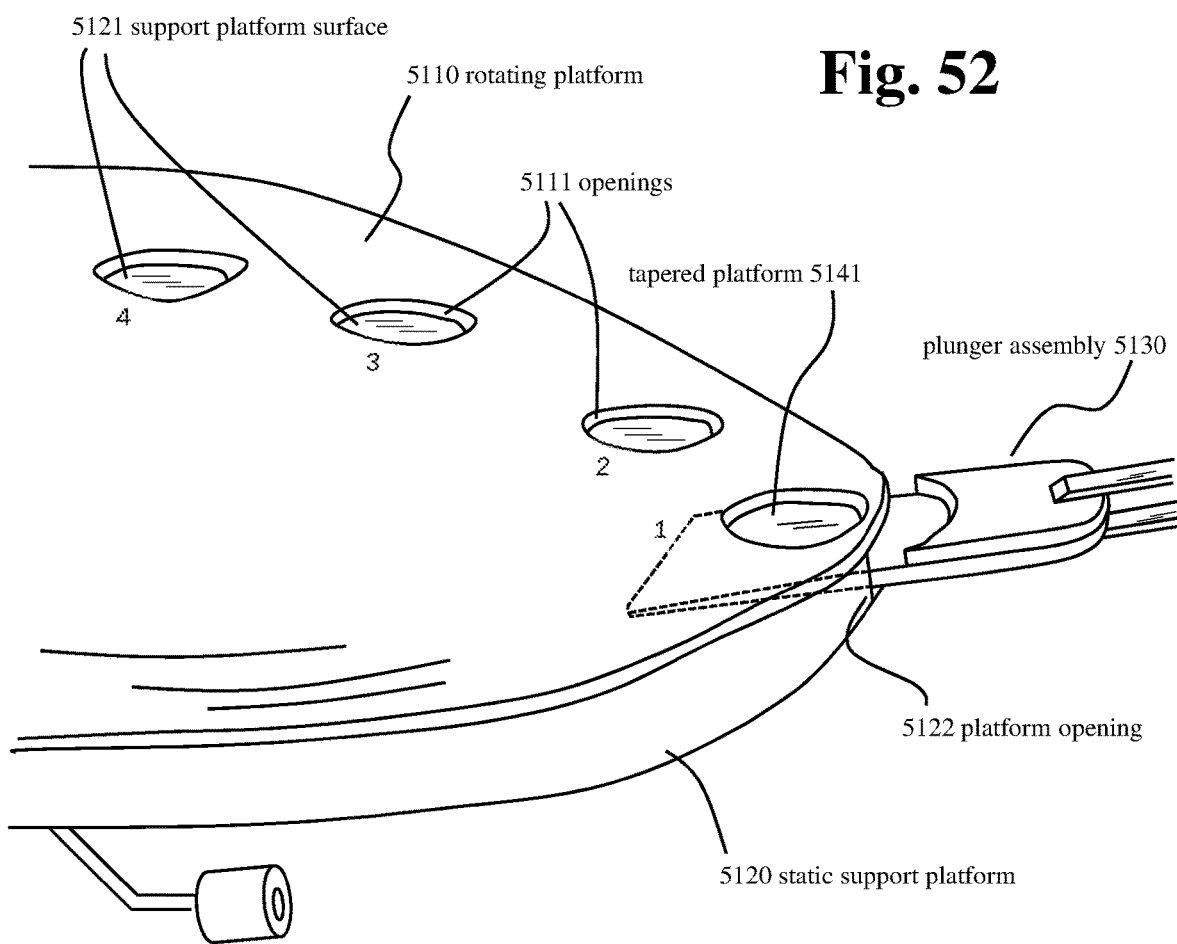
FIG. 52 is a perspective view of a dispensing assembly, without fasteners, the same or similar to that of FIG. 51, in accordance with at least one embodiment of the disclosure.
Figure 53:
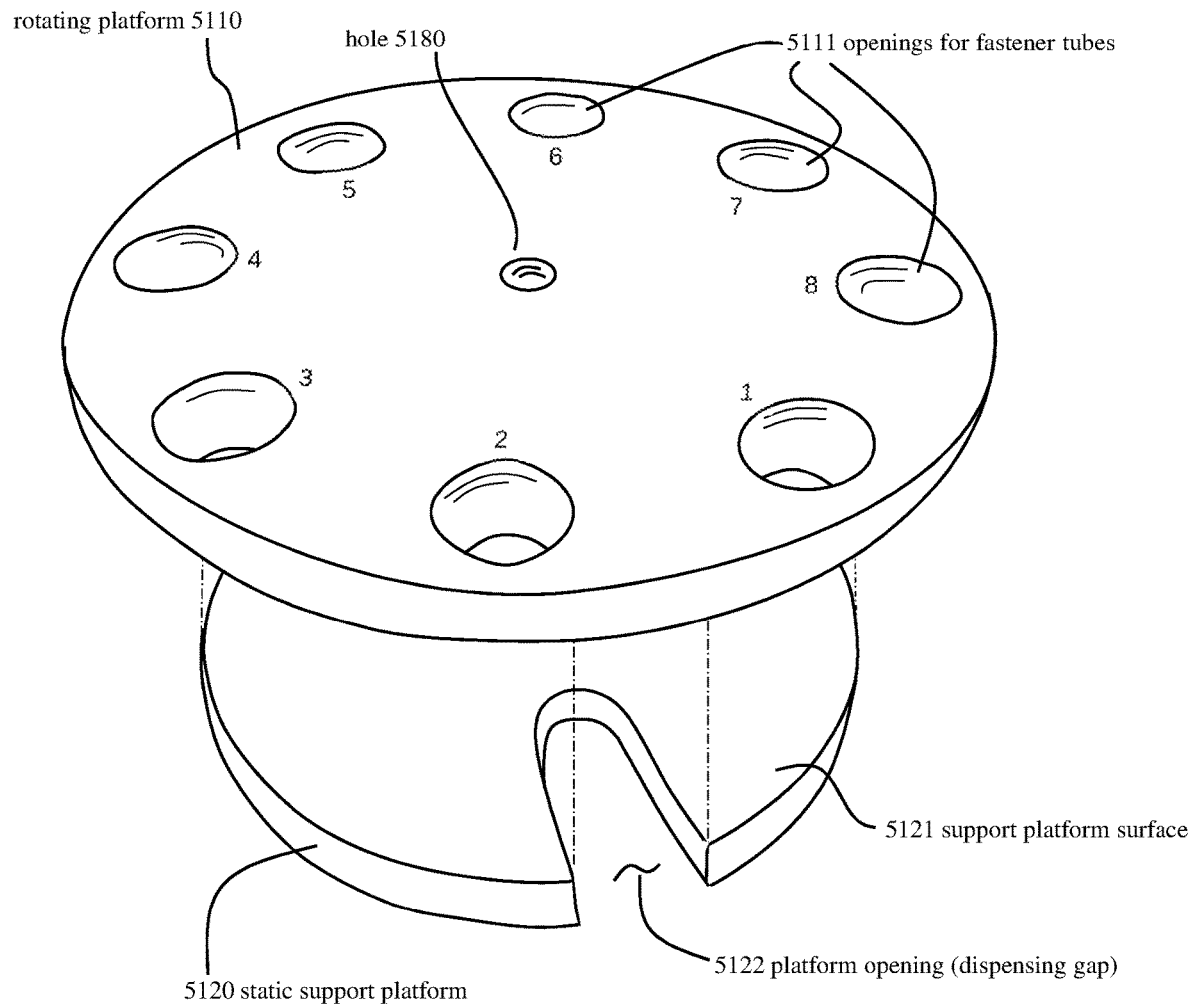
FIG. 53 is a perspective view of a dispensing assembly, without fasteners, the same or similar to that of FIG. 51, in accordance with at least one embodiment of the disclosure.

FIGS. 51-53 are diagrams showing features of a same or similar dispensing assembly 5100, in accordance with at least one embodiment of the disclosure. The dispensing assembly 5100 may be utilized in one of the dispensing apparatus of the disclosure, such as the station 100 of FIG. 1 or the station 420 of FIG. 9, for example.

The dispensing assembly 5100 of FIG. 51 includes an arrangement that dispenses fasteners from a fastener sleeve 5190. For example, the dispensing assembly 5100 may manipulate the sleeve 4910 of FIG. 49 so as to dispense fasteners from such sleeve 4910.

The dispensing assembly 5100 includes a rotating platform 5110, a static support platform 5120, and a plunger assembly 5130. With such structure, the dispensing assembly 5100 serves to support a plurality of fastener sleeves 5190 in conjunction with dispensing fasteners, for example washers, from such fastener sleeves 5190.

As shown, in particular, in FIG. 52, the rotating platform 5110 includes a plurality of openings 5111. Each opening 5111 serves to support and house a respective fastener sleeve 5190—in conjunction with a fastener sleeve 5190 (excepting fastener sleeve 5190') resting on a support platform surface 5121 (of platform 5120. The structural attributes of each opening 5111 may be constructed such that an opening 5111 is sufficiently tight or tolerance, and sufficiently high, such that a fastener sleeve 5190 is prevented from tipping hand-in-hand with allowing the fastener sleeve 5192 to slip through a respective opening 5111, as described below. Accordingly, the depth or thickness of the opening 5111 may be varied so as to prevent tipping of a fastener sleeve 5190 contained in such opening 5111.

As shown in FIG. 51, a plurality of fastener sleeves 5190 are disposed in the dispensing assembly 5100. Such plurality of fasteners constitutes inventory of the dispensing assembly 5100. Each of the fastener sleeves 5190 may contain a different fastener, for example a different sized washer.

As noted above, in general, each fastener sleeve 5190 is retained by rotating platform 5110 and rests upon a support platform surface 5121 of static support platform 5120. As rotating platform 5110 rotates, as powered by a suitable motor for example, each of the fastener sleeves 5190 retained in openings 5111 also rotate. Rotation of the rotating platform 5110 may be around or about hole 5180. Accordingly, a suitable rod or other support structure (not shown) may be provided to support the rotating platform 5110 so as to rotate about hole 5180. Rotation of the rotating platform 5110 is provided so as to dispose a particular fastener sleeve 5190, designated as 5190' in FIG. 51, above a platform opening 5122. It is this fastener sleeve 5190' from which a desired fastener will be dispensed by the dispensing assembly 5100. The support platform surface 5121 supports fastener sleeves 5190 when such fastener sleeves are not disposed over platform opening 5122. Platform opening 5122 may also be characterized as a dispensing gap, as shown in the exploded view of FIG. 53. Relatedly, a control system such as the fastener retrieval control portion 630, as shown in FIG. 20, may be provided so as to control rotation and positioning of the rotating platform 5110. Upon a desired fastener being requested by a user, the control portion 630 rotates the rotating platform 5110 such that the desired fastener (disposed in a fastener sleeve 5190) is disposed above the platform opening 5122. As shown in FIG. 51, position of the sleeves may be numbered 5115 so that the particular sleeve number may be correlated with control of the assembly. For example, a human replenishing the sleeves 5190 may interface with the control system (e.g. control portion 630—so as to input what fastener type was placed into what position 5115. Such data then allows the control system to appropriately position a sleeve of fasteners (for dispensing) to correlate with what fastener is requested by a user. It is appreciated that fastener sleeves 5190 may well be more densely packed, as compared to that shown in FIG. 51—so as to provide for a greater number of fastener in inventory.

The platform opening 5122, of the static support platform 5120, accommodates a plunger assembly 5130. That is, the plunger assembly 5130 is positioned adjacent platform opening 5122 so as to selectively extend into the platform opening 5122. The plunger assembly 5130 performs dispensing of one or more fasteners disposed in a fastener sleeve 5190', i.e., the particular fastener sleeve that is positioned adjacent the plunger assembly 5130 and positioned over platform opening 5122. The plunger assembly 5130 may be provided with a cutting edge 5131. The cutting edge 5131 may afford to shear or slice off a fastener, such as a washer or nut, as the fastener sleeve 5190' is lowered due to the tapered platform 5141 (and the movement of the support plunger 5140 in a rightward direction). Further details are described below.

The plunger assembly 5130 includes a push plunger 5150 and a support plunger 5140. The support plunger 5140 is provided with a taper as described above. The push plunger 5150 may be supported by a plunger arm 5159. In turn, the plunger arm 5159 may be controlled by a suitable controller 630 utilizing suitable motorization and/or robotics, for example. The support plunger 5140 may be supported by a plunger arm 5149. In turn, the plunger arm 5149 may be controlled by a suitable controller 630 utilizing suitable motorization and/or robotics, for example.

The plunger assembly 5130 dispenses fasteners from the dispensing sleeve 5190'. The support plunger 5140 includes the tapered platform 5141. The support plunger 5140, with tapered platform 5141, supports the sleeve 5190' at a variable height. That is, the variable left and right position of the tapered platform 5141 controls the height at which the fastener sleeve 5190' is supported. The left and right position may be controlled by control portion 630. In manner as described further below, once height of the fastener sleeve 5190' (as controlled by the support plunger 5140 with taper) is disposed at a desired height, plunger arm 5159/push plunger 5150 may be controlled so as to "slice" off one or more fasteners disposed in the fastener sleeve 5190'. For example, such sliced off washer 5191' with a portion 5191P' of sleeve is shown in FIG. 51. In other words, washer 5191' is dispensed from the fastener sleeve 5190'. Such dispensing of washer 5191' may be detected by a photo sensor 5160. Data regarding such detection may be output back to control portion 630 so as to control operation of the process, in accordance with at least one embodiment of the disclosure. For example, a counter may be used to count the number of fasteners dispensed. If count of the dispensed fasteners is not correct, adjustments may then be made—for example, a further washer may be dispensed. The photo sensor 5160 may be supported upon a static support platform utilizing a suitable bracket 5161.

FIGS. 54-63 are diagrams showing features of a same or similar dispensing assembly 5200, in accordance with at least one embodiment of the disclosure. The dispensing assembly 5200 may be utilized in one of the dispensing apparatus of the disclosure, such as the station 100 of FIG. 1 or the station 420 of FIG. 9, for example. The dispensing assembly 5200 is similar in structure to the dispensing assembly 5100 shown in FIGS. 51-53. In particular, FIGS. 54-63 are provided to show details of operation of the dispensing assembly.

In similar construct to that shown in FIGS. 51-53, the dispensing assembly 5200 (of FIG. 54) includes a rotating platform 5210 with openings 5211. The dispensing assembly 5200 further includes a static support platform 5220. In manner similar to FIG. 51, the rotating platform 5210 and the static support platform 5220 serve to support a plurality of fastener sleeves 5290 including sleeve 5290' (see FIG. 55).

Figure 54:
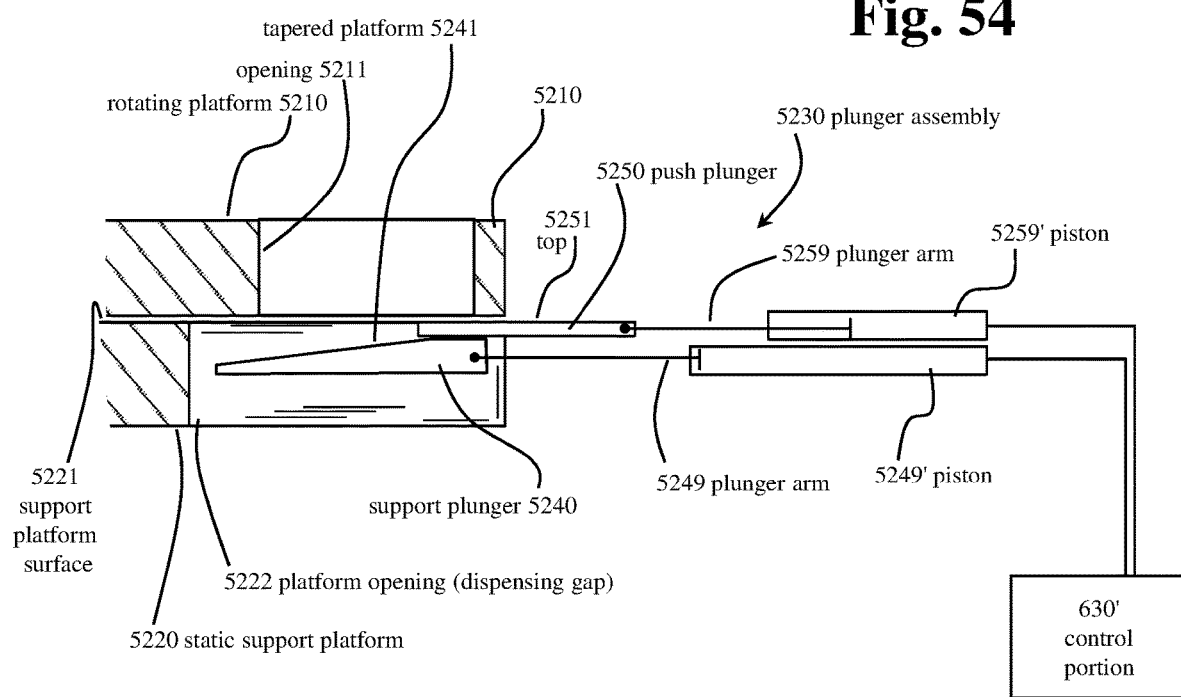
FIG. 54 is a diagram of a further dispensing assembly with plunger assembly, in accordance with at least one embodiment of the disclosure.

As shown in FIG. 54, the dispensing assembly 5200 further includes a plunger assembly 5230. The plunger assembly 5230 includes a support plunger 5240 and a push plunger 5250. The support plunger 5240 is provided with a tapered platform 5241, as described in further detail below. The support plunger 5240 may be supported by a plunger arm 5249 that is driven by piston 5249'. In turn, the plunger arm 5249 and piston 5249' may be controlled by a suitable controller 630' (akin to controller 630) utilizing suitable motorization and/or robotics, for example.

The push plunger 5250 may be supported by a plunger arm 5259 that is driven by piston 5259'. In turn, the plunger arm 5259 and piston 5259' may be controlled by the suitable controller 630' utilizing suitable motorization and/or robotics, for example. The plunger assembly 5230 dispenses fasteners from sleeve 5290', as shown in FIGS. 55-63 in particular, and described below.

As shown in FIG. 54, the push plunger 5250 includes a top surface 5251. Further, the static support platform 5220 includes a support platform surface 5221 (in similar manner as the static support platform 5120 of FIG. 53 includes support platform surface 5121). The top surface 5251 (of the push plunger 5250) may be vertically disposed so as to be flush, in a vertical direction, with the support platform surface 5221. As a result, as the rotating platform 5210 rotates, along with any sleeves 5290 disposed in the rotating platform 5210, the bottom of each sleeve may smoothly traverse over the platform opening 5222 (i.e. over the dispensing gap). In this manner, the rotating platform 5210 may rotate to a desired position (along with any sleeves 5290 disposed in the rotation platform). Additionally, edges of the support platform surface 5221 (about the platform opening 5222) and side edges of the top surface 5251 of the push plunger 5250 may be rounded to some degree—so as to assist with the bottom of each sleeve 5290 smoothly traversing over the platform opening 5222. However, an end edge 5250E (as shown in FIG. 61) may indeed be sharpened so as to assist in slicing or shearing of a fastener, e.g. washer, off the sleeve 5290'.

It is appreciated that support of the fastener sleeves 5190 is not limited to the particular arrangement shown in FIG. 51, which includes rotating platform 5110. Other arrangements may be utilized, such as a central spindle with spoke arms, which serve to support fastener sleeves 5190. That is, a support structure (e.g. tube) may be provided at the end of each spoke arm. Each support structure (e.g. tube) supports each respective fastener sleeve 5190—and provides for rotation and positioning of the fastener sleeves 5190.

Figure 55:
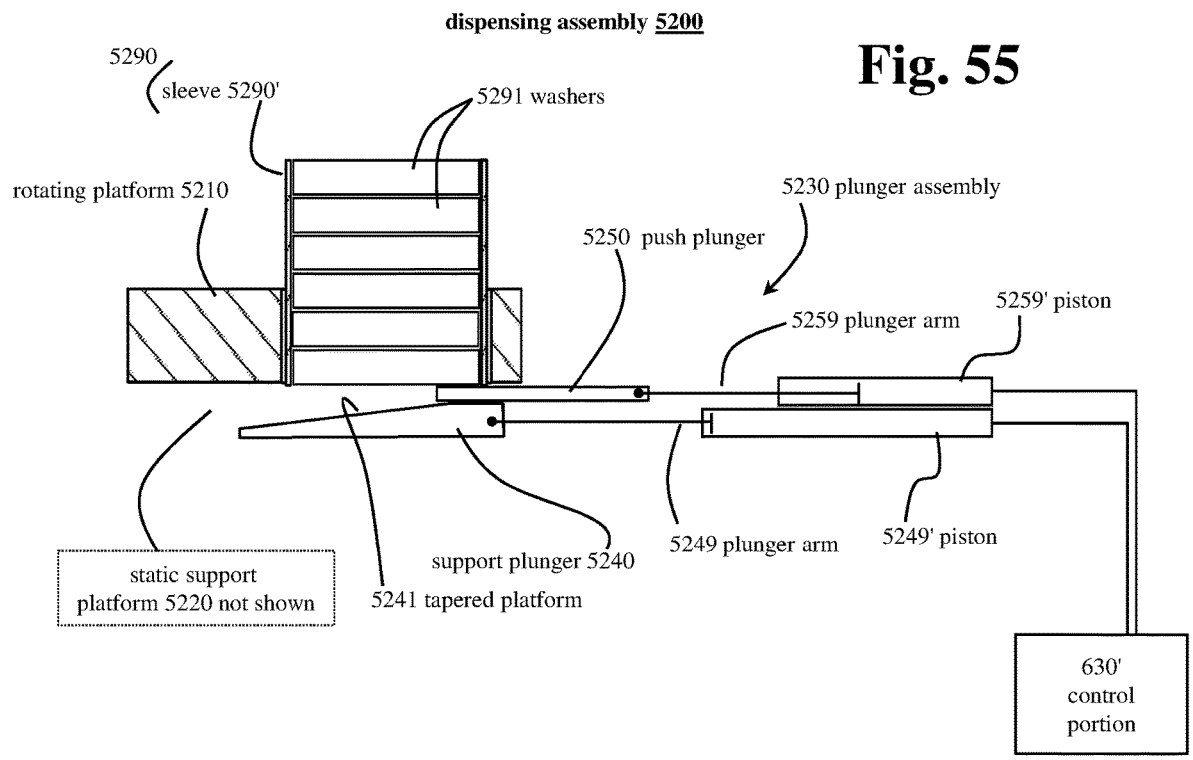
FIG. 55 is a diagram showing operation of a dispensing assembly, the same or similar to that of FIG. 54, in accordance with at least one embodiment of the disclosure.

As described above, the rotating platform 5210 is rotated until a particular sleeve, with the desired fastener therein, is disposed over the platform opening 5222. Rotation of the rotating platform 5210 is then stopped, such that the desired fastener may be dispensed. FIG. 55 shows the arrangement in such disposition, with sleeve 5290'.

Accordingly, in the arrangement of FIG. 55, the push plunger 5250 is disposed under the sleeve 5290'. As a next step in the process, the push plunger 5250 is retracted or in other words moved to the right as shown in FIG. 55. This movement may be performed by the plunger arm 5259 being retracted into the piston 5259'. At a point, the push plunger 5250 will move sufficiently to the right so as to allow the sleeve 5290' to slip downwardly, unto the support plunger 5240. This results in the arrangement shown in FIG. 56.

Figure 56:
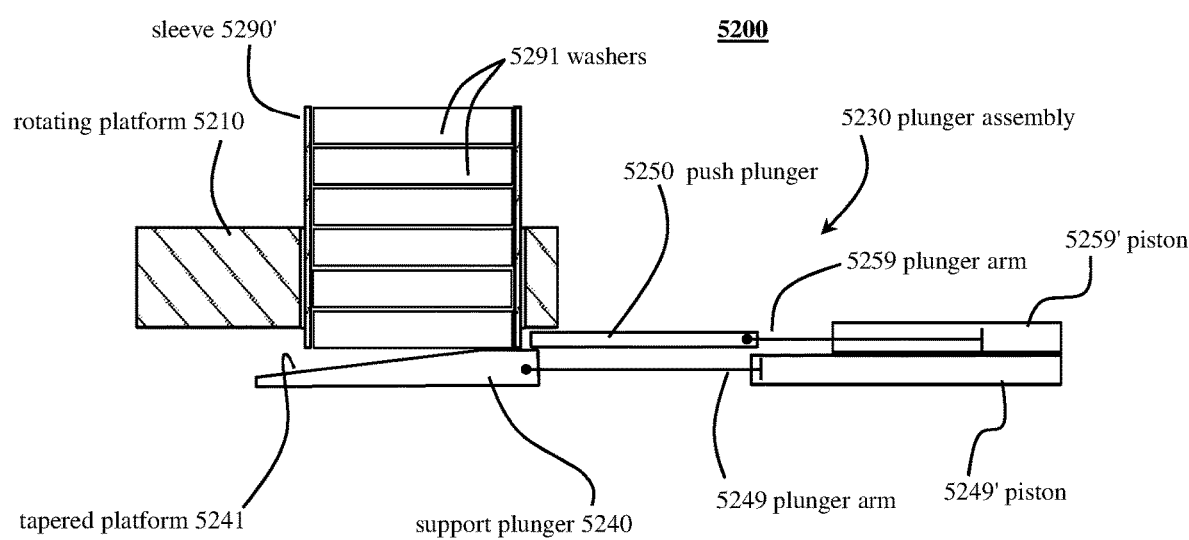
FIG. 56 is a diagram showing operation of a dispensing assembly, the same or similar to that of FIG. 54, in accordance with at least one embodiment of the disclosure.
Figure 59:
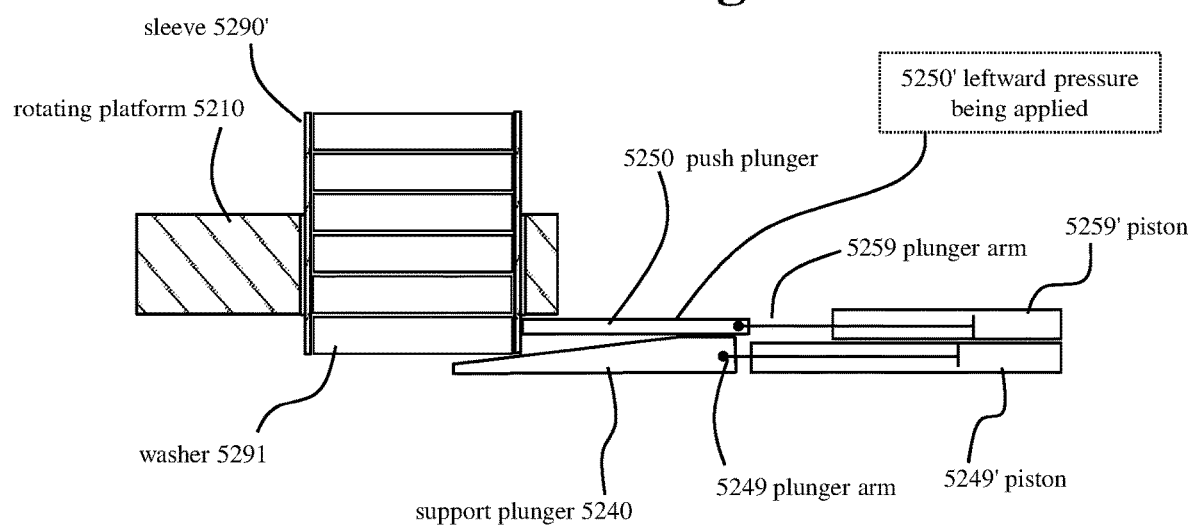
FIG. 59 is a diagram showing operation of a dispensing assembly, the same or similar to that of FIG. 54, in accordance with at least one embodiment of the disclosure.

With reference to FIG. 54 and FIG. 56 in particular, the support plunger 5240 includes tapered platform 5241, as described above. In the arrangement of FIG. 56, the support plunger 5240 (with tapered platform 5241) supports the sleeve 5290' at a variable height. Such variable height, of the sleeve 5290', is controlled by the left and right position of the tapered platform 5241. As the tapered platform 5241 is positioned more to the left, as shown in FIG. 56, for example, the sleeve 5290' is supported in a high position. On the other hand, as the tapered platform 5241 is positioned more to the right, as shown in FIG. 59, for example, the sleeve 5290' is supported in a lowered position. In other words, as the tapered platform 5241 is retracted to the left, the gap provided by the tapered platform 5241 gets larger. Retraction may be correlated with the width of the particular washer being dispensed In operation of the support plunger 5240, the left and right position may be controlled by control portion 630'. In manner as described further below, once height of the fastener sleeve 5290' is disposed at a desired height, push plunger 5250 may be controlled so as to "slice" off one or more fasteners disposed in the fastener sleeve 5290.

Hereinafter, further details of operation of the dispensing assembly 5200 will be described, in accordance with at least one embodiment of the disclosure. In FIGS. 55-53, the static support platform 5220 is omitted.

Figure 57:
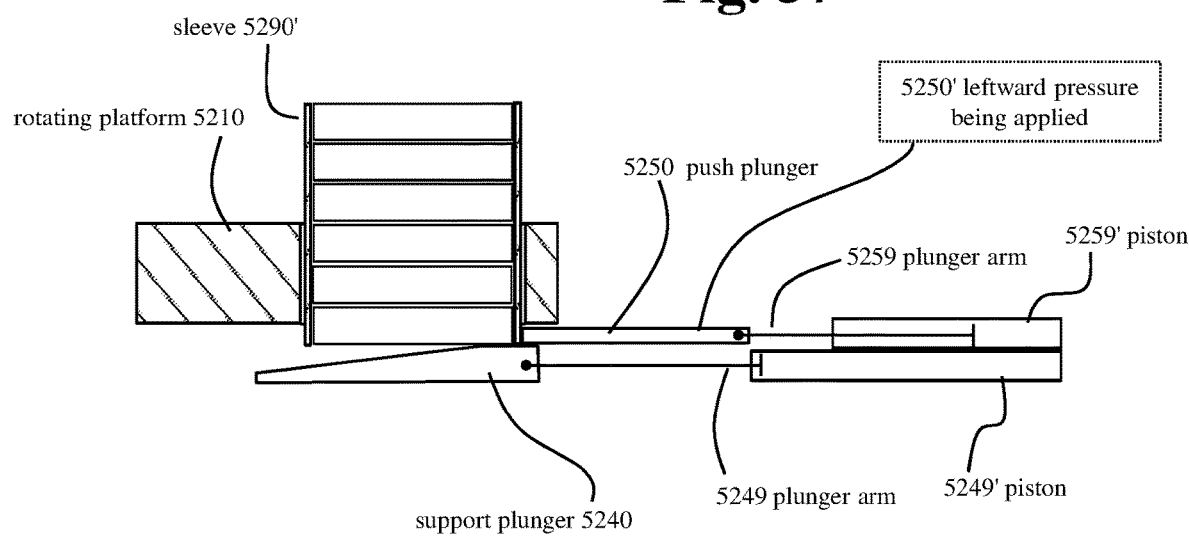
FIG. 57 is a diagram showing operation of a dispensing assembly, the same or similar to that of FIG. 54, in accordance with at least one embodiment of the disclosure.

In the arrangement of FIG. 56, the sleeve 5290' is disposed upon the support plunger 5240. As is shown in FIG. 57, as a next step, push plunger 5250 is then moved to the left. As reflected at 5250', leftward pressure is then applied to the sleeve 5290'. For example, such leftward pressure may result from maintaining pressure exerted in piston 5259' so as to maintain leftward pressure on plunger arm 5259. Alternatively, push plunger 5250 may maintain a distance from the sleeve 5290' until the sleeve 5290' achieves a desired position—for a fastener to be sliced off. By so maintaining a distance, no frictional force or resistance is exerted on the sleeve 5290'—so as to allow the sleeve 5290' to freely drop in concert with movement of the support plunger 5240.

Figure 58:
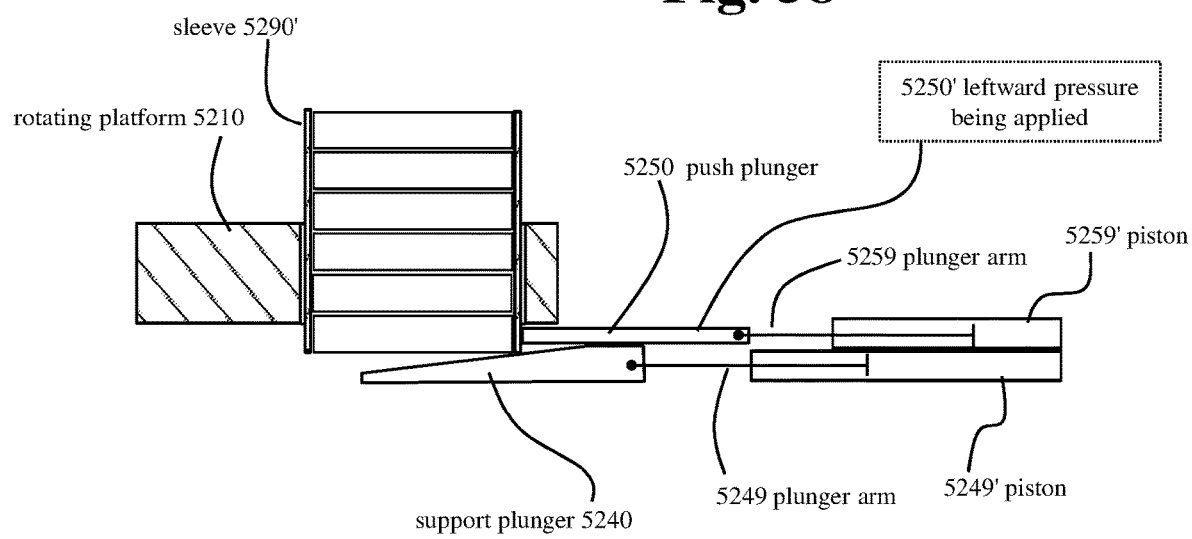
FIG. 58 is a diagram showing operation of a dispensing assembly, the same or similar to that of FIG. 54, in accordance with at least one embodiment of the disclosure.

As shown in FIG. 58, as a next step, support plunger 5240 is retracted in a rightward direction, as shown in FIG. 58. This allows sleeve 5290' to further drop in a vertical direction. Relatedly, in some embodiments, it may well be desirable for the push plunger 5250 to exert limited leftward pressure on the sleeve 5290'—so as to not preclude sleeve 5290' from slipping past push plunger 5250 downward. In other words, the pressure applied by push plunger 5250 on sleeve 5290' should not preclude sleeve 5290' from falling downward upon support plunger 5240, as support plunger 5240 is moved to the right.

As is shown in FIG. 59, as a next step, the plunger arm 5249 is yet further retracted—so as to further move support plunger 5240 in a rightward direction. And, as described above, pressure is maintained on the sleeve 5290' by the push plunger 5250, as reflected at 5250'.

Figure 60:
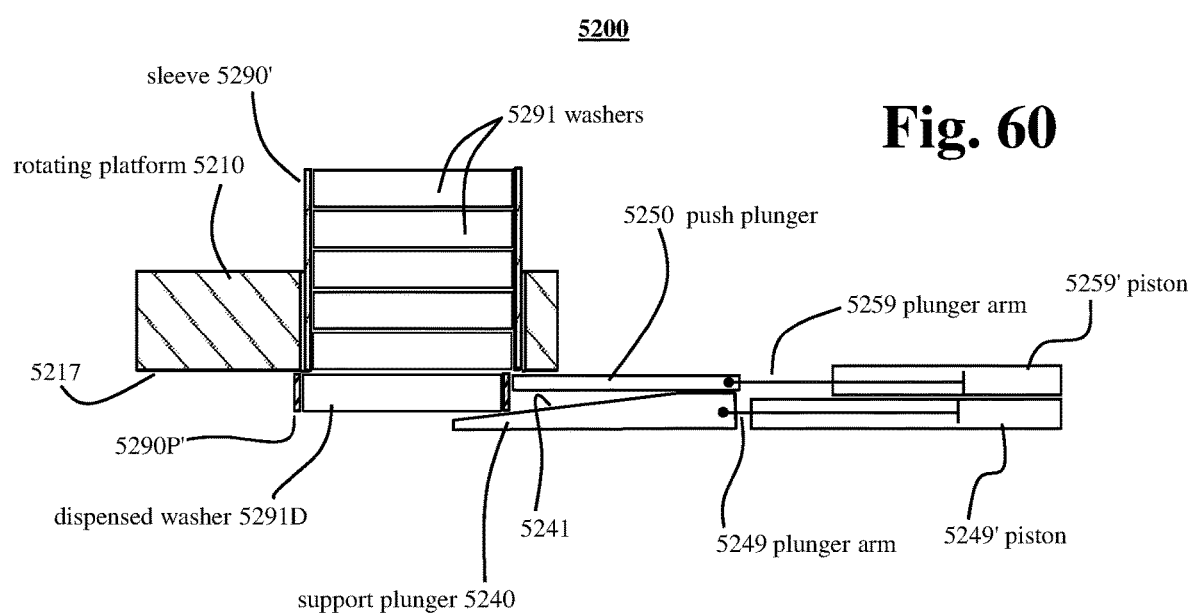
FIG. 60 is a diagram showing operation of a dispensing assembly, the same or similar to that of FIG. 54, in accordance with at least one embodiment of the disclosure.

As is shown in FIG. 60, as a next step, the sleeve 5290' has further dropped to a lower level due to the movement of the support plunger 5240 in a rightward direction, as a result of the tapered platform 5241 of the support plunger 5240. As is shown in FIG. 60, the sleeve 5290' has dropped a sufficient amount such that a top surface of the lowermost washer 5291D (of the washers 5291) "clears" a lower surface 5217 (see FIG. 60) of the rotating platform 5210. Relatedly, as described above, the push plunger 5250 has continued to apply leftward pressure as the sleeve 5290' has been dropped. Accordingly, once the top surface of the lower most washer 5291D clears the lower surface 5217, the strength and construct of the sleeve 5290' is insufficient to withstand the pressure of push plunger 5250. As a result, the washer 5291D along with a portion 5290P' (of the sleeve 5290') is effectively sliced, sheared or severed off the sleeve 5290'. This results in a dispensed washer 5291D.

Figure 62:
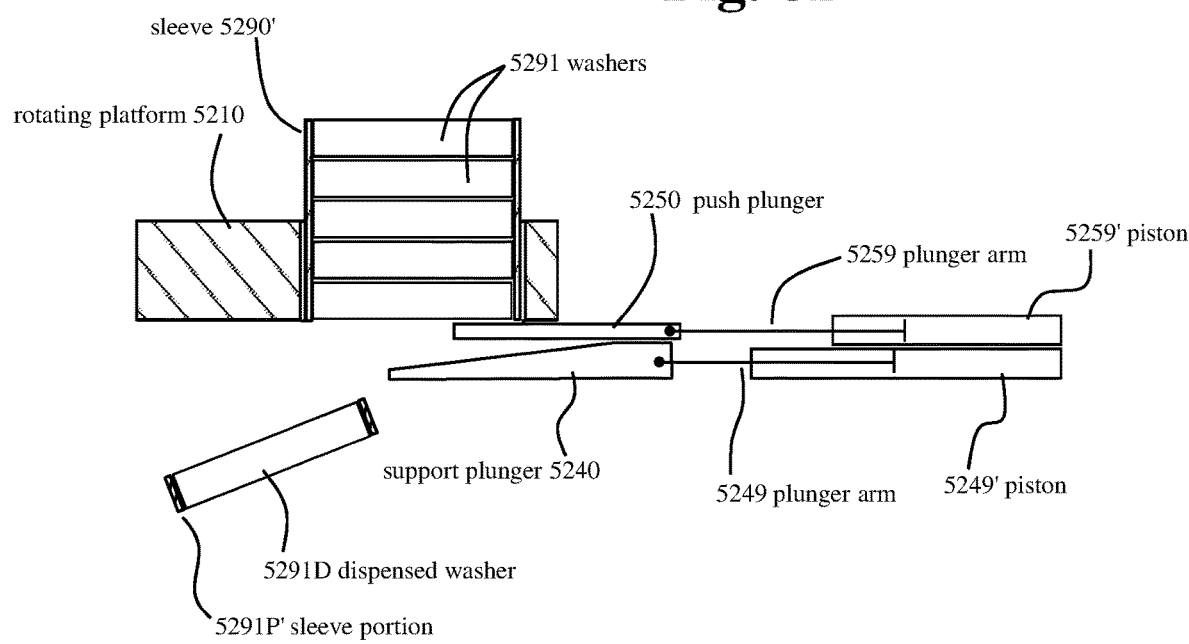
FIG. 62 is a diagram showing operation of a dispensing assembly, the same or similar to that of FIG. 54, in accordance with at least one embodiment of the disclosure.

As is shown in FIG. 61, as a next step, the dispensed washer 5291D is fully severed from the sleeve 5290'. As a result, the dispensed washer 5291D is free to drop, along with sliced off sleeve portion 5291P', as described above. As shown in FIG. 62, the dispensed washer 5291D may be provided to further drop onto a suitable transport mechanism for transport to a user retrieval location, such as a retrieval bin. Alternatively, the dispensed washer 5291D might drop directly into a retrieval bin; and/or be routed to a retrieval bin via a chute or channel, for example.

Figure 63:
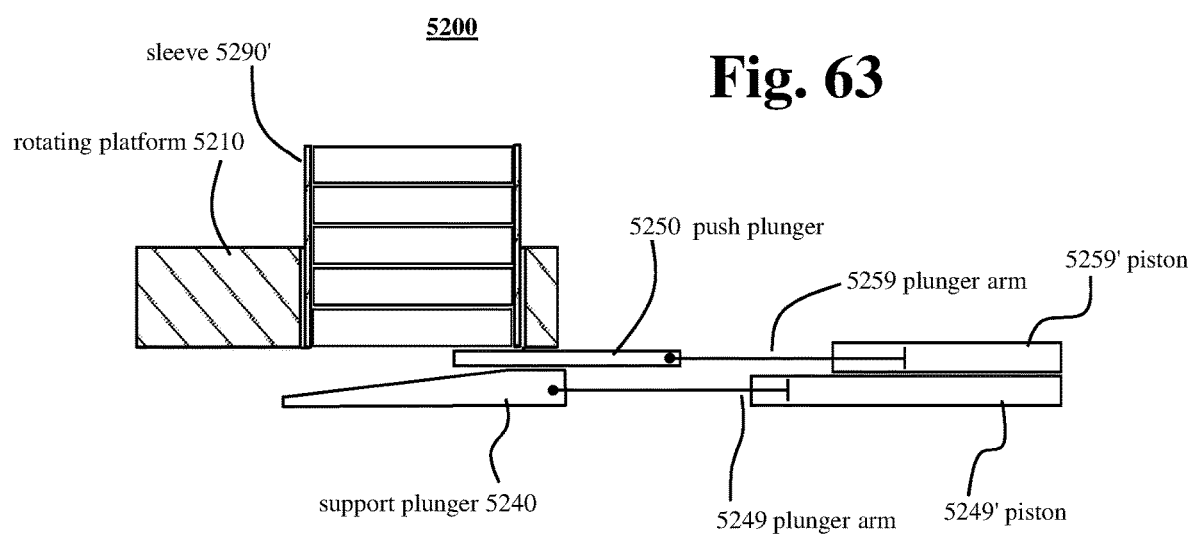
FIG. 63 is a diagram showing operation of a dispensing assembly, the same or similar to that of FIG. 54, in accordance with at least one embodiment of the disclosure.

As is shown in FIG. 63, upon the dispensed washer 5291D being dispensed, the arrangement as shown in FIG. 63 is achieved. Such arrangement is akin to the arrangement shown in FIG. 55 and described above. The push plunger 5250 can again be retracted to the right, without rotation of the rotating platform 5210, so as to again provide the arrangement shown in FIG. 56. The progression of steps as shown in FIGS. 56-63 can then be performed so as to yield an additional dispensed washer of the particular type of washer. On the other hand, the arrangement shown in FIG. 63, akin to the arrangement shown in FIG. 55, allows for rotation of the rotating platform 5210 if desired, i.e., so as to dispense a different type of fastener.

The above description with reference to FIGS. 54-63 are described in the context of manipulating a sleeve of washers or nuts. However, the invention is not limited to such particular fastener. Rather, other fasteners maybe dispensed utilizing the dispensing assembly 5200. In accordance with at least one embodiment of the disclosure, as an alternative to the arrangement shown in FIG. 55, the sleeve 5290' may be attached or fixed to the rotating platform 5210. Accordingly, as fasteners are dispensed from such sleeve by the plunger assembly 5230, only the contained fasteners drop down—so as to be "popped" out by the push plunger 5250. Such arrangement may be less likely to "jam" as compared to the arrangement shown in FIG. 55—i.e. in that the push plunger 5250 would not need to "slice" the sleeve. In order to load such a sleeve, which remains attached to the rotating platform 5210, a human might load the fasteners (e.g. washers) individually or in batch manner into sleeve the sleeve. Yet alternatively, a pre-loaded sleeve may be used, which "snaps" into the rotating platform 5210. Once all fasteners are dispensed from a particular pre-loaded sleeve, that particular sleeve may be switched out with a new sleeve that is "loaded" with fasteners.

The structure of this disclosure, in accordance with the various embodiments, may be made from any of a wide variety of materials and/or dimensions, as is desired. The structure might be made of plastic, polymer, polyplastic, metal, composite, wood, or ceramic, for example, or any other material as desired. Further, a variety of production techniques may be used to make the structure as described herein. For example, suitable molding techniques might be utilized. Also, the various components of the structure described herein may be integrally formed, as may be desired, in particular when using molding construction techniques. Also, physical size of the respective arrangements may be adjusted to accommodate fasteners of varying sizes.

As used herein, any term in the singular may be interpreted to be in the plural, and alternatively, any term in the plural may be interpreted to be in the singular.

It is appreciated that a feature of one embodiment of the disclosure as described herein may be used in conjunction with features of one or more other embodiments as may be desired.

As used herein, "data" and "information" have been used interchangeably.

Any motorized structure as described herein may utilize gears, linkages, sprocket with chain, or other known mechanical arrangement so as to transfer requisite motion and/or energy.

Hereinafter, further aspects of implementation of the systems and methods of the invention will be described.

As described herein, at least some embodiments of the system of the disclosure and various processes, of embodiments, are described as being performed by one or more computer processors. Such one or more computer processors may be in the form of a "processing machine," i.e. a tangibly embodied machine. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, code or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the machine used to implement the invention may be in the form of a processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the disclosure may include a processing machine running the Windows 10 operating system, the Windows 8 operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner Additionally, the memory may include two or more portions of memory in two or more physical locations.

To explain further, processing as described above is performed by various components and various memories. However, it is appreciated that the processing performed by two distinct components as described above may, in accordance with a further embodiment of the disclosure, be performed by a single component. Further, the processing performed by one distinct component as described above may be performed by two distinct components. In a similar manner, the memory storage performed by two distinct memory portions as described above may, in accordance with a further embodiment of the disclosure, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the disclosure to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention on the processing machine, for example. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

A suitable programming language may be used in accordance with the various embodiments of the disclosure. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the systems and methods of the disclosure. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the systems and methods of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the systems and methods of the invention may interact partially with another processing machine or processing machines, while also interacting partially with a human user.

It will be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper", "top", "bottom", "left", "right" and the like, may be used herein for ease of description to describe the relationship of one element or feature to another element(s) or feature(s) as illustrated in the figures. It will be understood that spatially relative terms are intended to encompass different orientations of structures in use or operation, in addition to the orientation depicted in the figures. For example, if a device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein should be interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to diagrams and/or cross-section illustrations, for example, that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of components illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect and/or use such feature, structure, or characteristic in connection with other ones of the embodiments.

It will be readily understood by those persons skilled in the art that the present disclosure is susceptible to broad utility and application. Many embodiments and adaptations of the present disclosure other than those herein described, as well as many variations, modifications and equivalent arrangements, will be apparent from or reasonably suggested by the present disclosure and foregoing description thereof, without departing from the substance or scope of the disclosure.

Accordingly, while the present disclosure has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. An apparatus that performs automated selection of a fastener, the apparatus including:
    a system structure that includes at least one physical support structure;
    a fastener attribute assembly that inputs desired fastener attribute data (DFA data) regarding a desired fastener;
    a computer system that controls operations of the apparatus, the computer system including a computer processor and a memory portion, the computer system including instructions on a non-transitory computer medium disposed in the memory portion, and the computer processor performs processing, based on the instructions, including:
        interfaces with the fastener attribute assembly to input the DFA data from the fastener attribute assembly;
        maps the DFA data to at least one fastener candidate; and
        determines a fastener selection amongst the at least one fastener candidate; and
    a tray assembly disposed in the system structure, and the tray assembly affording a resting place in which to position a tangible fastener that constitutes the desired fastener, the tray assembly including a stable support to position the tangible fastener, and the stable support including surfaces that are provided to position the tangible fastener for input of the DFA data.

2. The apparatus of claim 1, the surfaces collectively forming a compartment floor, and the surfaces including two angled surfaces forming a V-shaped channel, of the compartment floor, into which the desired fastener may be received and stably positioned.

3. The apparatus of claim 2, the tray assembly further including a fastener stop flange disposed in the V-shaped channel, the fastener stop flange constituted by a structure spanning across a segment of the V-shaped channel, such that the desired fastener may be abutted up against the fastener stop flange, while disposed in the V-shaped channel so as to control position of the desired fastener.

4. The apparatus of claim 1, the surfaces including two angled surfaces forming a V-shaped channel, of the stable support, to receive the tangible fastener.

5. The apparatus of claim 4, the tray assembly further including a fastener stop flange disposed in the V-shaped channel.

6. The apparatus of claim 5, the fastener stop flange constituted by structure spanning across the V-shaped channel, such that the desired fastener may be abutted up against the fastener stop flange to control position of the desired fastener.

7. The apparatus of claim 6, the fastener attribute assembly including at least one camera, and
    the DFA data is image data obtained from an image that is input, by the at least one camera, of the desired fastener; and
    the determines the fastener selection amongst the at least one fastener candidate includes interfacing with a user to input additional DFA data.

8. The apparatus of claim 7, the tray assembly disposed to position the tangible fastener such that an image of the tangible fastener is inputtable by the at least one camera.

9. The apparatus of claim 7, the at least one camera includes two cameras, and
    the tray assembly disposed so as to position the tangible fastener such that a respective image, of at least a part of the tangible fastener, is inputtable by each of the two cameras.

10. The apparatus of claim 1, the fastener attribute assembly constituted by a camera and a weight sensor:
    the DFA data includes image data obtained from an image that is input, by the camera, of the desired fastener, and
    the DFA data includes weight data obtained from a weight attribute of the desired fastener.

11. The apparatus of claim 10, the weight sensor supporting the tray assembly, to detect weight of the tangible fastener on the tray assembly.

12. The apparatus of claim 1, the fastener attribute assembly constituted by a weight sensor, and
    the DFA data includes weight data obtained from a weight attribute of the desired fastener, and the weight attribute input by the weight sensor.

13. The apparatus of claim 12, the weight sensor supporting the tray assembly, to detect the weight attribute of the tangible fastener on the tray assembly.

14. The apparatus of claim 13, further including an electromagnet, and the computer system controlling the electromagnet in conjunction with inputting the DFA data.

15. The apparatus of claim 1, the fastener attribute assembly including a GUI (graphical user interface) for interfacing with a user to input at least a portion of the DFA data.

16. The apparatus of claim 1, further including:
    a fastener inventory portion, the fastener inventory portion retaining a plurality of fasteners;
    a user delivery portion to provide user delivery;
    a transfer assembly disposed within the system structure, the transfer assembly constituted by a physical structure that affords physical transport of fastener selection from the fastener inventory portion to the user delivery portion; and
    the computer system controls the transfer assembly to retrieve the fastener selection from the fastener inventory portion and physically transport the fastener selection to the user delivery portion.

17. The apparatus of claim 16, the fastener inventory portion constituted by a plurality of individualized storage portions that each serve to respectively store a particular type of the plurality of fasteners, such that each particular type is selectively accessible, on demand, by the transfer assembly.

18. The apparatus of claim 1, further including a range finder to determine position of the tangible fastener; and the fastener attribute assembly including a camera, and the camera disposed in a fixed position and distance calibrated, by the computer system, based on such fixed position of the camera.

19. An apparatus that performs automated selection of a fastener, the apparatus including:
- a system structure that includes at least one physical support structure;
- a fastener attribute assembly that inputs desired fastener attribute data (DFA data) regarding a desired fastener;
- a computer system that controls operations of the apparatus, the computer system including a computer processor and a memory portion, the computer system including instructions on a non-transitory computer medium disposed in the memory portion, and the computer processor performs processing, based on the instructions, including:
  - interfaces with the fastener attribute assembly to input the DFA data from the fastener attribute assembly;
  - maps the DFA data to at least one fastener candidate; and
  - determines a fastener selection amongst the at least one fastener candidate; and
- a tray assembly disposed in the system structure, and the tray assembly affording a resting place in which to position a tangible fastener that constitutes the desired fastener, the tray assembly including a stable support to position the tangible fastener, and the stable support including surfaces that are provided to position the tangible fastener for input of the DFA data; and
- the surfaces collectively forming a compartment floor, and the surfaces including two angled surfaces forming a V-shaped channel into which the desired fastener may be received and stably positioned.

20. An apparatus that performs automated selection of a fastener, the apparatus including:
- a system structure that includes at least one physical support structure;
- a fastener attribute assembly that inputs desired fastener attribute data (DFA data) regarding a desired fastener;
- a computer system that controls operations of the apparatus, the computer system including a computer processor and a memory portion, the computer system including instructions on a non-transitory computer medium disposed in the memory portion, and the computer processor performs processing, based on the instructions, including:
  - interfaces with the fastener attribute assembly to input the DFA data from the fastener attribute assembly;
  - maps the DFA data to at least one fastener candidate; and
  - determines a fastener selection amongst the at least one fastener candidate; and
- a tray assembly disposed in the system structure, and the tray assembly affording a resting place in which to position a tangible fastener that constitutes the desired fastener, the tray assembly including a stable support to position the tangible fastener, and the stable support including surfaces that are provided to position the tangible fastener for input of the DFA data; and
- the surfaces including two angled surfaces forming a V-shaped channel to receive the tangible fastener.

\* \* \* \* \*